United States Patent [19]

Iwamoto et al.

[11] Patent Number: 5,717,905
[45] Date of Patent: Feb. 10, 1998

[54] CAD SYSTEM AND BEZIER-CURVE DATA CONVERTING APPARATUS AND METHOD THEREOF IN SAID CAD SYSTEM

[75] Inventors: Hiroshi Iwamoto; Naohide Nishimine, both of Tochigi, Japan

[73] Assignee: Kao Corporation, Tokyo, Japan

[21] Appl. No.: 571,998

[22] Filed: Dec. 14, 1995

[30] Foreign Application Priority Data

Dec. 15, 1994 [JP] Japan .................... 6-332820

[51] Int. Cl.⁶ .................... G06F 17/10; G06F 17/50
[52] U.S. Cl. .................... 395/500; 395/142; 345/136
[58] Field of Search .................... 395/500, 142, 395/141, 124, 125, 143, 120, 919; 345/135, 136; 364/474.29

[56] References Cited

U.S. PATENT DOCUMENTS

| | | | |
|---|---|---|---|
| 5,038,302 | 8/1991 | Kaufman | 395/124 |
| 5,241,654 | 8/1993 | Kai et al. | 395/142 |
| 5,253,336 | 10/1993 | Yamada | 395/142 |
| 5,390,292 | 2/1995 | Takamura et al. | 395/120 |
| 5,539,868 | 7/1996 | Hosoya et al. | 395/141 |

FOREIGN PATENT DOCUMENTS

| | | | |
|---|---|---|---|
| 0393680 | 4/1989 | European Pat. Off. | G06F 15/353 |
| 0745945 | 5/1995 | European Pat. Off. | G06F 17/17 |

OTHER PUBLICATIONS

Lizhuang et al., "Advanced Curve & Surface Design in CAD System using Step" IEEE Tencon '93, pp. 581–584.
Sederberg, "Techniques for Cubic Algebraic Surfaces", IEEE Computer Graphics & Applications 1990, vol. 5, Iss. 5 pp. 12–21.
Sederberg et al., "Approximation by Interval Bezier Curves", IEEE Comp. Graphics & Appl. 1992, vol. 12, Iss. 5 pp. 87–95.
Piegl, "Infinite Control Points—A Method for Representing Surfaces of Revolution Using Boundary Data", IEEE Comp. Graphics & Appl. 1987 vol. 7, No. 3, pp. 45–55.
"Fundamentals: C Language Edition", Handbook of Scientific and Technical Calculation by UNIX Work Stations, pp. 148–151 Science Company.

Primary Examiner—Kevin J. Teska
Assistant Examiner—Tyrone V. Walker
Attorney, Agent, or Firm—Birch, Stewart, Kolasch & Birch, LLP

[57] ABSTRACT

A cubic Bézier curve is converted to a fifth Bézier curve so as to preserve the gradients at the initial and final points of the cubic Bézier curve and in such a manner that the fifth Bézier curve will assume a shape substantially the same as that of the cubic Bézier curve. Parameters giving points on the cubic Bézier curve are calculated at equal intervals. Points on the cubic Bézier curve are calculated using the calculated parameters and control points defining the cubic Bézier curve. Unit tangent vectors at the initial and final points of the cubic Bézier curve are calculated. Control points defining the fifth Bézier curve are calculated using the calculated parameters, the calculated points on the cubic Bézier curve and the calculated unit tangent vectors at the initial and final points of the cubic Bézier curve.

18 Claims, 35 Drawing Sheets

Fig. 5

EPSF DATA FILE

```
%!PS-*d*b*-3.0
%%Creator: *d*b* *ll*str*t*r(TM) 3.2
%%For: (\201@) (\211\324\211\244....\206\217\212)
%%Title: (sample.epsf)
%%CreationDate: (94.03.22) (11:21)
%%BoundingBox: 175 84.5 388 766.5
%%DocumentProcessColors: Black
%%DocumentNeededResources: procset *d*b*_packedarray 2.0 0
%%+ procset *d*b*_cmykcolor 1.1 0
%%+ procset *d*b*_cshow 2.0 8
%%+ procset *d*b*_customcolor 1.0 0
%%+ procset *d*b* *ll*str*t*rA_AI3 1.2 11
%AI3_ColorUsage: Color
%%DocumentCustomColors: (POWDER)
%%CMYKCustomColor: 0.1 0 0.1 0 (POWDER)
%AI3_TemplateBox: 297 420.5 297 420.5
%AI3_TileBox: 28 30 566 811
%AI3_DocumentPreview: None
%%EndComments
%%BeginProlog
*d*b*_packedarray /initialize get exec
%%IncludeResource: procset *d*b*_packedarray 2.0 0
%%IncludeResource: procset *d*b*_cmykcolor 1.1 0
%%IncludeResource: procset *d*b*_cshow 2.0 8
%%IncludeResource: procset *d*b*_customcolor 1.0 0
%%IncludeResource: procset *d*b* *ll*str*t*rA_AI3 1.2 11
%%EndProlog
```

Fig. 6

```
%%BeginSetup
*d*b*_cmykcolor /initialize get exec
*d*b*_cshow /initialize get exec
*d*b*_customcolor /initialize get exec
*d*b*_*ll*str*t*rA_AI3 /initialize get exec
%%EndSetup
0 A
0 0
0.1 0 0.1 0 (POWDER) 0 x
0 R
0 G
0 i 0 J 0 j 0.269 w 4 M [] 0 d
%AI3_Note:
0 D     m
385.8838 703.0283 352.0001 764.3751 283.1161 764.3751 c
385.8838 703.0283 736.9088 180.3486 180.9088 283.3486 703.0283 c
2113.5001 764.3751 215.1477 736.9088 180.1477 283.1161 641.6814 c
180.3486 669.1477 385.8838 669.1477 385.1477 385.1477 703.0283 c
350.5001 641.6814                                             ....
```

Fig. 7

```
....
211.1161 519.0283 m
352.8785 519.0283 l
384.1161 404.3747 385.1161 248.8747 y
384.2324 142.6245 378.3747 103.3747 v
375.0001 86.6249 358.6161 89.6247 v
202.6161 86.6247 186.6247 103.3747 Y
186.6161 89.6247 179.6245 248.8747 Y
179.2324 178.3747 211.1161 519.0283 v
177.1161 398.3747 l
....
%%PageTrailer
gsave annotatepage grestore showpage
%%Trailer
*d*b*_*ll-*str*t*rA_AI3_/terminate get exec
*d*b*_customcolor_/terminate get exec
*d*b*_cshow_/terminate get exec
*d*b*_cmykcolor_/terminate get exec
*d*b*_packedarray_/terminate get exec
%%EOF
```

Fig. 9

IGES DATA FILE

| | | | | | | 73RD COLUMN | NUMBER OF LINES |
|---|---|---|---|---|---|---|---|
| THIS IGES FILE WAS WRITTEN BY EPSF2IGES VERSION 0.1 | | | | | | S | 1 |
| 1H,,1H;,7HDRAWING,9HMERIT.IGS,6HJH4XSY,3H0.1,32,8,24,8,53,7HDRAWING, | | | | | | G | 1 |
| 1.0,2,2HMM,10000,0.09489722,13H940322.131300,1.0E-6,450.150452, | | | | | | G | 2 |
| 7H*W*M*T*,3HK*0.6; | | | | | | G | 3 |
| 126 | 1 | 1 | 1 | 222 | 0 | 0D | 1 |
| 126 | 4 | 0 | 3 | 0 | 0 | 0 BSPLINE 00000000000 | 0D | 2 |
| 126 | 1 | 1 | 1 | 222 | 0 | 0D | 3 |
| 126 | 7 | 0 | 3 | 0 | 0 | 0 BSPLINE 00000000000 | 0D | 4 |
| 126 | 1 | 1 | 1 | 222 | 0 | 0D | 5 |
| 126 | 10 | 0 | 3 | 0 | 0 | 0 BSPLINE 00000000000 | 0D | 6 |
| 126 | 1 | 1 | 1 | 222 | 0 | 0D | 7 |
| 126 | 1 | 0 | 3 | 0 | 0 | 0 BSPLINE 00000000000 | 0D | 8 |
| .... | | | | | | .... | .... |
| 110 | 51 | 1 | 1 | 222 | 0 | 0D | 41 |
| 110 | 1 | 0 | 1 | 0 | 0 | 0 LINE 00000000000 | 0D | 42 |
| 126 | 52 | 1 | 1 | 222 | 0 | 0D | 43 |
| 126 | 55 | 0 | 3 | 0 | 0 | 0 BSPLINE 00000000000 | 0D | 44 |
| 126 | 1 | 1 | 1 | 222 | 0 | 0D | 45 |
| 126 | 58 | 0 | 3 | 0 | 0 | 0 BSPLINE 00000000000 | 0D | 46 |
| 126 | 1 | 1 | 1 | 222 | 0 | 0D | 47 |
| 126 | 61 | 0 | 3 | 0 | 0 | 0 BSPLINE 00000000000 | 0D | 48 |
| 110 | 62 | 1 | 1 | 222 | 0 | 0D | 49 |
| 110 | 1 | 0 | 1 | 0 | 0 | 0 LINE 00000000000 | 0D | 50 |
| 126 | 1 | 1 | 1 | 222 | 0 | 0D | 51 |
| 126 | 1 | 0 | 3 | 0 | 0 | 0 BSPLINE 00000000000 | 0D | 52 |

Fig. 10

```
126   1   0   1   222   0   0   BSPLINE  0000000000  53   ....   1   1P
126   1   0   3   222   0   0   BSPLINE  0000000000  54          2   1P
126   1   0   1   222   0   0            0000000000  55          3   1P
126   1   0   3                          0000000000  56   ....   4   3P
 65                                                        ....  5   3P
  1                                                              6   3P
 68                                                              7   5P
  1                                                              8   5P
                                                                 9   5P
                                                                10   7P
                                                                11   7P
                                                                12   7P
                                                               .... ....
```

CAD DATA FILE

*Fig. 13*

| ELEMENT NUMBER | TYPE | COORDINATE DATA |
|---|---|---|
| 1 | CRVE | 136. 1315, 248. 0133, 0. 0, 136. 1315, 259. 9656, 0. 0, 124. 1781, 269. 6551, 0. 0, 99. 8773, 269. 6551, 0. 0 |
| 2 | CRVE | 99. 8773, 269. 6551, 0. 0, 75. 3182, 269. 6551, 0. 0, 63. 6231, 259. 9656, 0. 0, 63. 6231, 248. 0133, 0. 0 |
| 3 | CRVE | 63. 6231, 248. 0133, 0. 0, 63. 6231, 236. 0609, 0. 0, 76. 0238, 226. 3714, 0. 0, 99. 8773, 226. 3714, 0. 0 |
| 4 | CRVE | 99. 8773, 226. 3714, 0. 0, 123. 6489, 226. 3714, 0. 0, 136. 1315, 236. 0609, 0. 0, 136. 1315, 248. 0133, 0. 0 |
| ⋮ | ⋮ | ⋮ |
| 21 | LINE | 74. 4772, 183. 1020, 0. 0, 124. 4878, 183. 1020, 0. 0 |
| 22 | CRVE | 124. 4878, 183. 1020, 0. 0, 124. 4878, 183. 1020, 0. 0, 135. 5079, 142. 6547, 0. 0, 135. 8607, 87. 7976, 0. 0 |
| 23 | CRVE | 135. 8607, 87. 7976, 0. 0, 135. 8607, 87. 7976, 0. 0, 135. 5489, 50. 3149, 0. 0, 133. 3912, 36. 4684, 0. 0 |
| 24 | CRVE | 133. 3912, 36. 4684, 0. 0, 132. 2920, 30. 5594, 0. 0, 126. 5120, 31. 6177, 0. 0, 126. 5120, 31. 6177, 0. 0 |
| 25 | LINE | 126. 5120, 31. 6177, 0. 0, 71. 4786, 31. 6177, 0. 0 |
| 26 | CRVE | 65. 6578, 36. 4684, 0. 0, 63. 2293, 63. 0149, 0. 0, 63. 1883, 87. 7976, 0. 0, 63. 1883, 87. 7976, 0. 0 |
| 27 | CRVE | 71. 4786, 31. 6177, 0. 0, 65. 8341, 31. 6177, 0. 0, 65. 6578, 36. 4684, 0. 0, 65. 6578, 36. 4684, 0. 0 |
| 28 | CRVE | 63. 1883, 87. 7976, 0. 0, 63. 1883, 87. 7976, 0. 0, 62. 4827, 140. 5380, 0. 0, 74. 4772, 183. 1020, 0. 0 |
| ⋮ | ⋮ | ⋮ |

CAD DATA FILE  *Fig.20*

| ELEMENT NUMBER | TYPE | COORDINATE DATA |
|---|---|---|
| 1 | CRVE | 136. 1315, 248. 0133, 0. 0, 136. 1315, 255. 1847, 0. 0, 132. 5455, 261. 6772, 0. 0, 125. 334 , 266. 7482, 0. 0, 114. 4578, 269. 6551, 0. 0, 99. 8773, 269. 6551, 0. 0 |
| ⋮ | ⋮ | ⋮ |
| 21 | LINE | 74. 4772, 183. 1020, 0. 0, 124. 4878, 183. 1020, 0. 0 |
| 22 | CRVE | 124. 4878, 183. 1020, 0. 0, 124. 4878, 183. 1020, 0. 0, 135. 5079, 142. 6547, 0. 0, 135. 8607, 87. 7976, 0. 0 |
| ⋮ | ⋮ | ⋮ |

CAD DATA FILE

*Fig.24*

| ELEMENT NUMBER | TYPE | COORDINATE DATA |
|---|---|---|
| 1 | CRVE | 136. 1315, 248. 0133, 0. 0, 136. 1315, 255. 1847, 0. 0, 132. 5455, 261. 6772, 0. 0, 125. 334 , 266. 7482, 0. 0, 114. 4578, 269. 6551, 0. 0, 99. 8773, 269. 6551, 0. 0 |
| ⋮ | ⋮ | ⋮ |
| 21 | LINE | 74. 4772, 183. 1020, 0. 0, 124. 4878, 183. 1020, 0. 0 |
| 22 | CRVE | 124. 4878, 183. 102 , 0. 0, 124. 4878, 183. 102 , 0. 0, 127. 7938, 170. 9678, 0. 0, 132. 2372, 149. 3032, 0. 0, 135. 649 , 120. 7119, 0. 0, 135. 8607, 87. 7976, 0. 0 |
| ⋮ | ⋮ | ⋮ |

CAD DATA FILE

| ELEMENT NUMBER | TYPE | COORDINATE DATA |
|---|---|---|
| 1 | CRVE | 136. 1315, 248. 0133, 0. 0, 136. 1315, 257. 3959, 0. 0, 129. 0745, 266. 662 , 0. 0, 117. 4764, 268. 6526, 0. 0, 109. 691 , 269. 6551, 0. 0, 99. 8779, 269. 6551, 0. 0 |
| ⋮ | ⋮ | ⋮ |
| 21 | LINE | 74. 4772, 183. 1020, 0. 0, 124. 4878, 183. 1020, 0. 0 |
| 22 | CRVE | 124. 4878, 183. 102 , 0. 0, 129. 5357, 164. 5745, 0. 0, 131. 6402, 145. 1008, 0. 0, 134. 8311, 126. 541 , 0. 0, 135. 7377, 106. 9287, 0. 0, 135. 8607, 87. 7976, 0. 0 |
| ⋮ | ⋮ | ⋮ |

Fig. 35
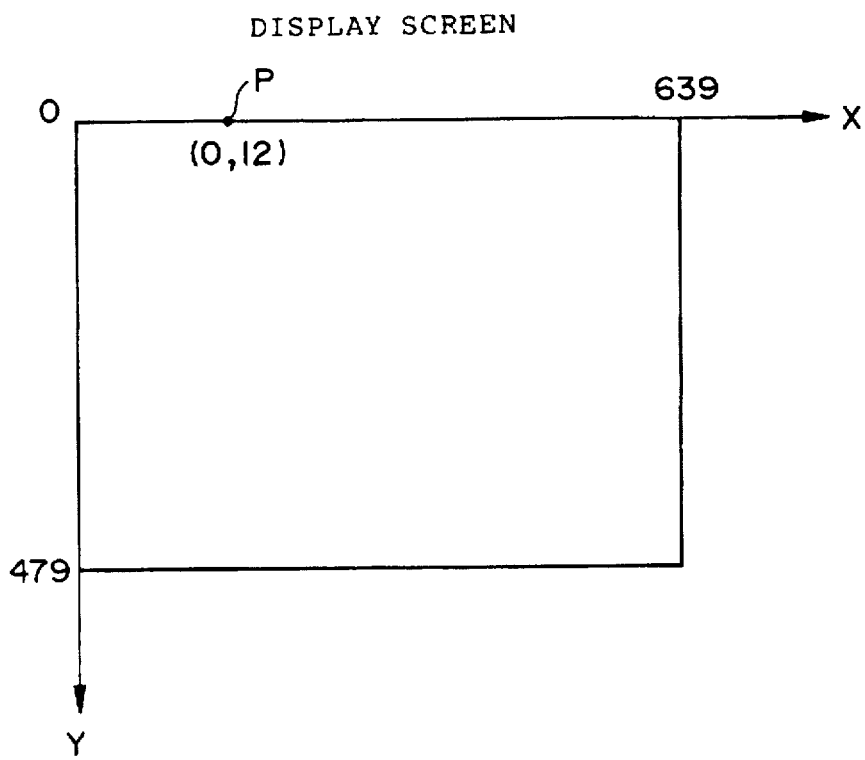
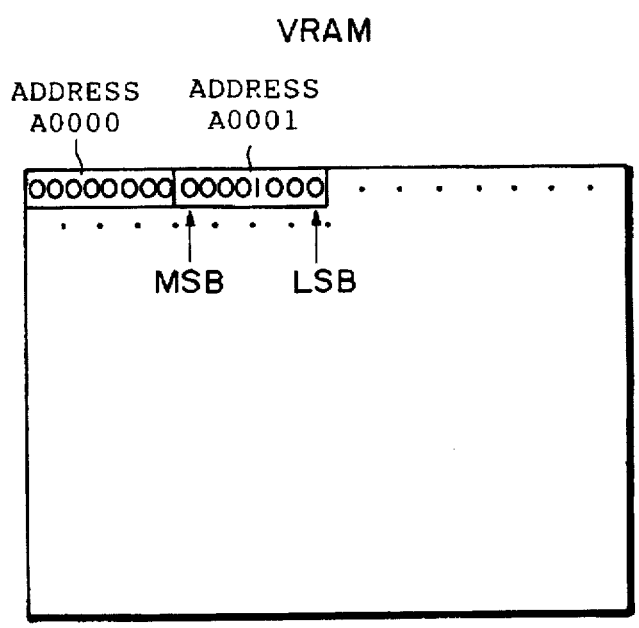

CAD SYSTEM AND BEZIER-CURVE DATA CONVERTING APPARATUS AND METHOD THEREOF IN SAID CAD SYSTEM

BACKGROUND OF THE INVENTION

1. Field of the Invention

This invention relates to a CAD (Computer Aided Design) system and to an apparatus and method for converting Bézier-curve data in a CAD system.

2. Description of the Related Art

There are cases where a designer (or illustrator) and an engineer cooperate when designing a new article or product. The designer creates an illustration of the new shape of the article, and the engineer executes detailed design (called product design) from the technical standpoint based upon the illustration.

When the designer creates the illustration of the article, a CAD system (hereinafter referred to as a "simple CAD system") suited to the creation of illustrations (namely a CAD system incorporating a program for illustrations) is used. In a simple CAD system, illustrations of various articles can be created using geometric elements (referred to as segments or parts) such as points, lines (segments) and free-form curves (cubic Bézier curves). With a simple CAD system, data relating to the created illustration of an article is described by an EPSF (Encapsulated PostScript Format).

When the engineer designs the article, a CAD system for supporting design is used. The shapes of various articles can be designed using geometric elements such as points, lines (segments) and free-form curves (for example, Bézier curves of degree five, referred to as "fifth Bézier curves" below) in a CAD system for supporting design as well. With such a design-supporting CAD system, data relating to the designed shape of an article is described by a format unique to this system.

Since data is described in the simple CAD system and design-supporting CAD system using different formats, a data file cannot be transferred from one CAD system to the other. Specifications for data exchange have been prepared for the purpose of converting data format. One example of such specifications for data exchange is the IGES (Initial Graphics Exchange Specification). If a conversion of data format is performed by this data exchange specification, data can be sent and received between the two different systems.

In the simple CAD system, free-form curves are represented by cubic Bézier curves. In the design-supporting CAD system, free-form curves are represented by higher (e.g., fifth) Bézier curves because a high precision is required. Data representing a cubic Bézier curve cannot be converted to data representing a fifth Bézier curve by a data exchange specification. As a consequence, article-related illustration data which includes free-form curve data created by the simple CAD system cannot be utilized intact in a design-supporting CAD system. In the prior art, a shape identical with the shape of an article represented by an illustration created by the designer using the simple CAD system must be created from the start by the engineer using a design-supporting CAD system separate from the simple CAD system used by the designer. In other words, the illustration data created by a simple CAD system cannot be utilized in a design-supporting CAD system.

SUMMARY OF THE INVENTION

The present invention makes it possible to utilize data relating to an illustration created by a simple CAD system (a first CAD system) in a design-supporting CAD system (second CAD system). In particular, the data relating to a Bézier curve requires a change of degree so that the data of the simple CAD system can be utilized by a design-supporting CAD system.

An object of the present invention is to provide an apparatus and method for converting Bézier-curve data in a CAD system, wherein a Bézier curve of degree n is converted to a Bézier curve of degree m, which is a higher degree, lower degree or identical degree. The present invention further provides a CAD system which includes this apparatus for converting data. It should be noted that n and m are integers of 3 or greater.

A CAD system according to the present invention is equipped with a CAD data base for storing a data file that includes control-point data defining an n-th degree Bézier curve representing the curve of an article, wherein the CAD data file is a file of basic data necessary in order to generate data, which represents an image of the article, in a bitmap memory for the purpose of displaying the image.

A data converting apparatus according to the present invention for converting control-point data defining an n-th degree Bézier curve to control-point data defining an m-th degree Bézier curve comprises Bézier-curve extracting means for extracting data representing the n-th degree Bézier curve from the CAD data file that has been stored in the CAD data base, first parameter determining means for determining (m+1)-number of parameters, which give respective (m+1)-number of points on the n-th degree Bézier curve, at equal intervals within a predetermined range over which the parameters take on values, coordinate determining means for determining coordinate data, which represents the (m+1)-number of points on the n-th degree Bézier curve, using the (m+1)-number of parameters determined by the first parameter determining means and the control-point data defining the n-th degree Bézier curve, tangent-vector determining means for determining two unit tangent vectors, which respectively represent gradients of the n-th degree Bézier curve at an initial (starting) point and a final point thereof, using the control-point data defining the n-th degree Bézier curve, and control-point determining means for determining control-point data, which defines an m-th degree Bézier curve, so as to preserve the gradients of the n-th degree Bézier curve at the initial point and final point thereof and in such a manner that the m-th degree Bézier curve will pass through points, or in the vicinity thereof, on the n-th degree Bézier curve based upon the (m+1)-number of parameters giving the respective (m+1)-number of points on the n-th degree Bézier curve, the coordinate data representing the (m+1)-number of points on the n-th degree Bézier curve and the two unit tangent vectors at the initial point and final point, respectively, of the n-th degree Bézier curve.

A method of converting Bézier-curve data in a CAD system according to the present invention comprises the steps of extracting data representing the n-th degree Bézier curve from the CAD data file that has been stored in the CAD data base, determining (m+1)-number of parameters, which give respective (m+1)-number of points on the n-th degree Bézier curve, at equal intervals within a predetermined range over which the parameters take on values, determining coordinate data, which represents the (m+1)-number of points on the n-th degree Bézier curve, using the (m+1)-number of parameters and the control-point data defining the n-th degree Bézier curve, determining two unit tangent vectors, which respectively represent gradients of the n-th degree Bézier curve at a initial point and a final point thereof, using the control-point data defining the n-th degree Bézier curve, and determining control-point data, which defines an m-th degree Bézier curve, so as to preserve gradients of the n-th degree Bézier curve at the initial point and final point thereof and in such a manner that the m-th degree Bézier curve will pass through points, or in the vicinity thereof, on the n-th degree Bézier curve based upon the (m+1)-number of parameters giving the respective (m+1)-number of points on the n-th degree Bézier curve, the coordinate data representing the (m+1)-number of points on the n-th degree Bézier curve and the two unit tangent vectors respectively representing the initial point and final point of the n-th degree Bézier curve.

In an embodiment of the present invention, control-point data defining a cubic Bézier curve is converted to control-point data defining a fifth Bézier curve. In other words, n=3 and m=5.

The present invention is not limited to a conversion from a lower degree to a higher degree (n<m) but can also be applied to a conversion from a higher degree to a lower degree (n>m). Conversion to an identical degree (n=m) is also possible. This is particularly useful when eliminating degeneration of control points.

The CAD system, the data converting apparatus and the data converting method according to the present invention are especially useful in a design system of the following kind:

the design system comprises a first CAD system and a second CAD system;

the first CAD system has a first data file and first converting means. The first data file is a collection of data representing an illustration of an article having a curve and includes control-point data defining an n-th degree Bézier curve representing the curve. The first converting means converts the first data file to a common data file having a data format common to CAD systems of a plurality of types; and the second CAD system comprises second converting means and a CAD data base. The second converting means converts the common data, which has been transferred from the first CAD system, to a CAD data file having a data format unique to the second CAD system. The CAD data base stores the converted CAD data file, which includes control-point data defining an n-th degree Bézier curve.

The CAD system according to this invention corresponds to the second CAD system in the above-described design system.

In terms of the example cited above, the simple CAD system corresponds to the first CAD system and the CAD system for supporting design corresponds to the second CAD system.

Data representing an illustration created in the simple CAD system is output upon being converted to an IGES data file, which is the common data file. In the CAD system for supporting design, the IGES data file is converted to a CAD data file by the CAD data converting means and the CAD data file is stored in the CAD data base. Since free-form curves contained in the IGES data file are represented by n-th degree Bézier curves, free-form curves contained in the CAD data file that has been stored in the CAD data base also are represented by n-th degree Bézier curves.

In accordance with this invention, (m+1)-number of parameters, which give respective (m+1)-number of points on the n-th degree Bézier curve, are determined at equal intervals within a predetermined range over which the parameters take on values. Coordinate data, which represents the (m+1)-number of points on the n-th degree Bézier curve, is determined using the (m+1)-number of parameters and the control-point data defining the n-th degree Bézier curve. Two unit tangent vectors, which respectively represent gradients of the n-th degree Bézier curve at an initial point and a final point thereof, are determined using the control-point data defining the n-th degree Bézier curve. On the basis of the (m+1)-number of parameters, the coordinate data representing the (m+1)-number of points and the two unit tangent vectors, control-point data, which defines an m-th degree Bézier curve, is determined so as to preserve the gradients of the n-th degree Bézier curve at the initial point and final point thereof and in such a manner that the m-th degree Bézier curve will pass through points, or in the vicinity thereof, on the n-th degree Bézier curve.

In other words, control-point data defining an n-th degree Bézier curve contained in a CAD data file, which is obtained by converting an IGES data file relating to the illustration of an article created in a simple CAD system, is converted to control-point data defining an m-th degree Bézier curve required in a CAD system for supporting design. The shape of the article can be formed in the design-supporting CAD system on the basis of the illustration (drawing) represented by the CAD data file after the conversion.

Thus, data representing an illustration created by the simple CAD system can be utilized as CAD data in the CAD system for supporting design. In the latter CAD system, an engineer is capable of designing the article using the CAD data.

Accordingly, the shape of an article identical to the illustration of the article created in a simple CAD system need not be entirely re-created from the beginning by an engineer in the design-supporting CAD system. The labor that would be involved is thus eliminated. Further, since the m-th degree Bézier curve is converted so as to preserve the gradients of the n-th degree Bézier curve at its initial and final points and in such a manner that the m-th degree Bézier curve passes through the points on the n-th degree Bézier curve or in the vicinity of these points, the shape of the article will be identical with or very close to the illustration of the article created in the simple CAD system.

The CAD system according to the present invention has display control means for displaying, on a display device, an image representing an article based upon the CAD data thus obtained.

The display control means has means for creating display data, which is for displaying the article, based upon the CAD data which includes the control-point data defining the m-th degree Bézier curve and converted by the data converting means, and means for generating this display data in a bitmap memory. The image of the article reflected by the data generated in the bitmap memory is displayed on the display device of the CAD system.

There are cases where control points defining the n-th degree Bézier curve degenerate. Degeneration means that two control points overlap at the initial or final point of the Bézier curve. A tangent vector cannot be defined at an initial point or final point where control points degenerate.

According to this invention, control-point data defining an m-th degree Bézier curve can be determined even in a case where control points degenerate at an initial point or final point.

In a preferred embodiment of the invention, a unit tangent vector is determined by approximation when control points have degenerated at the initial point or final point of an n-th degree Bézier curve.

Thus, even if control points degenerate at an initial point or final point, a unit tangent vector at the degenerated end point can be determined. As a result, control-point data defining an m-th degree Bézier curve can be obtained.

When control points have degenerated at the initial point or final point of an n-th degree Bézier curve, there are cases where control points defining an m-th degree Bézier curve after the change of degree also degenerate.

In such cases, the present invention is so adapted that the control points defining an m-th degree Bézier curve can be determined in such a manner that these control points will not degenerate.

In a preferred embodiment of the present invention, second parameter determining means is provided for determining (m+1)-number of parameters, which conform to lengths of an n-th degree Bézier curve from the initial point to each point on the n-th degree Bézier curve, using the coordinate data representing the (m+1)-number of points on the n-th degree Bézier curve and determined by the coordinate determining means. The control-point determining means determines the above-mentioned control-point data using the parameters determined in conformity with the lengths of the n-th degree Bézier curve by the second parameter determining means instead of the parameters determined at equal intervals by the first parameter determining means. This method of determining the control-point data can be utilized even in a case where control points have not degenerated.

In accordance with this embodiment, (m+1)-number of parameters conforming to lengths of an n-th degree Bézier curve from the initial point to each point of the n-th degree Bézier curve are determined using the coordinate data representing the (m+1)-number of points on the n-th degree Bézier curve. Control-point data defining the m-th degree Bézier curve is determined based upon the (m+1)-number of parameters conforming to the lengths of the n-th degree Bézier curve, the coordinates representing the (m+1)-number of points on the n-th degree Bézier curve and the two unit tangent vectors at respective ones of the initial and final points of the n-th degree Bézier curve.

Accordingly, even if control points have degenerated at the initial point or final point of an n-th degree Bézier curve, it is possible to obtain control-point data defining an m-th degree Bézier curve on which control points have not degenerated.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

FIGS. 2a through 2d are diagrams for describing how to draw a cubic Bézier curve on which control points have not degenerated in a simple CAD system, in which FIG. 2a shows the manner in which an initial point is designated, FIG. 2b the manner in which a tangent to the initial point is designated, FIG. 2c the manner in which a final point is designated, and FIG. 2d the manner in which a tangent to the final point is designated;

FIGS. 3a through 3c are diagrams for describing how to draw a cubic Bézier curve on which control points have degenerated in a simple CAD system, in which FIG. 3a shows the manner in which an initial point is designated, FIG. 3b the manner in which a final point is designated and FIG. 3c the manner in which a tangent to the final point is designated;

FIGS. 5 through 7 show an example of an EPSF data file;

FIGS. 9 through 11 show an example of an IGES data file;

FIG. 13 shows an example of a CAD data file;

FIGS. 17a through 17c are for describing change of degree from a cubic Bézier curve to a fifth Bézier curve, in which FIG. 17a shows four control points defining a cubic Bézier curve and six points on the cubic Bézier curve, FIG. 17b two unit tangent vectors at initial and final points and FIG. 17c six control points defining a fifth Bézier curve after a change of degree;

FIG. 20 shows an example of a CAD data file obtained by changing the degree of a cubic Bézier curve which does not degenerate;

FIG. 24 shows an example of CAD data file obtained by changing the degree of a cubic Bézier curve which exhibits degeneration;

FIG. 35 shows the relationship between coordinates on a display screen and data in the storage locations of a bitmap memory.

DESCRIPTION OF THE PREFERRED EMBODIMENTS

Figure 1:
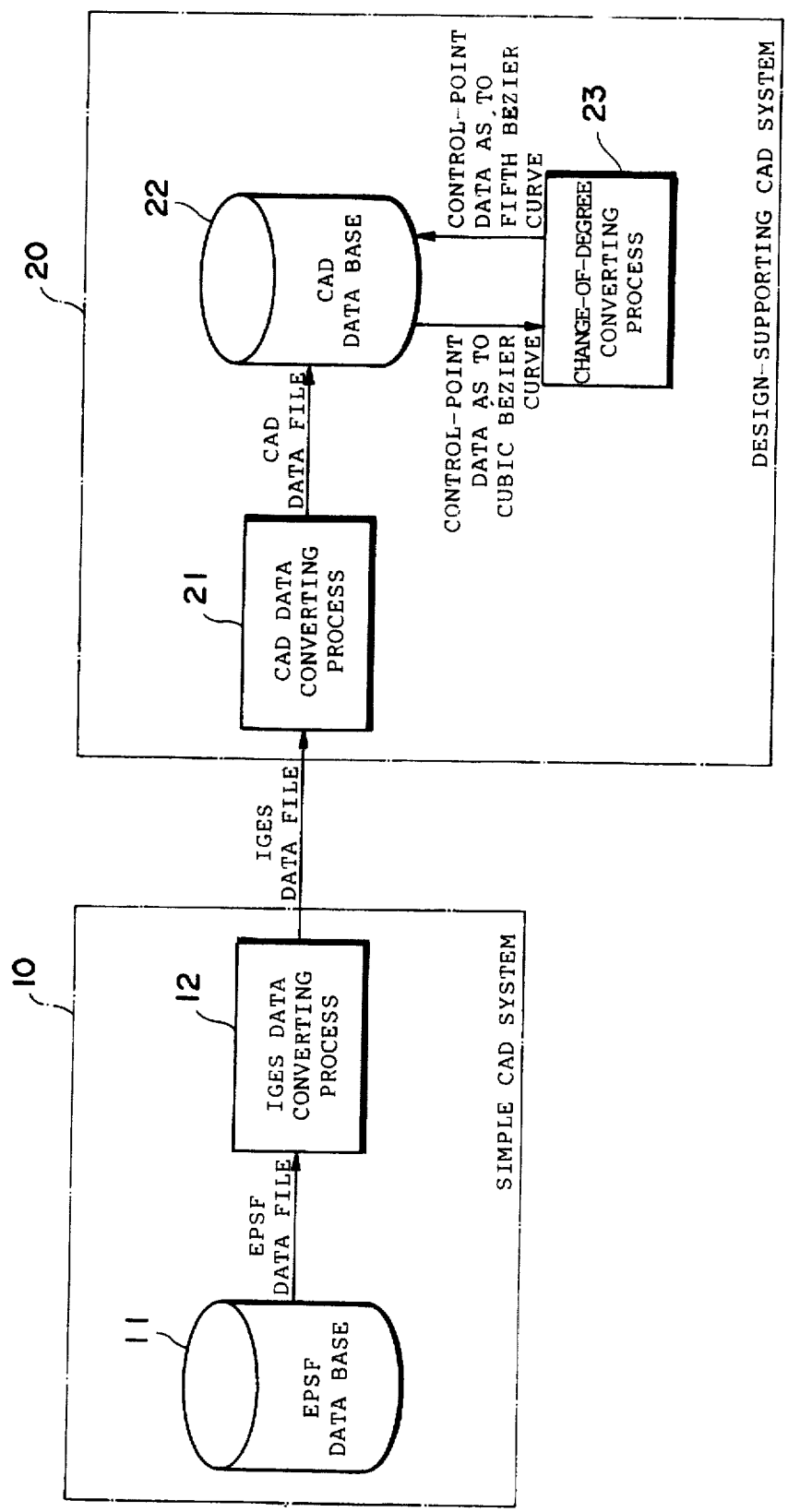
FIG. 1 is a functional block diagram illustrating the software configuration of a simple CAD system and design-supporting CAD system.

Contents
1. Overview
2. Bézier curves
3. Simple CAD system
   3.1 Drawing of geometric elements
   3.2 EPSF data file
   3.3 IGES data file
4. Design-supporting CAD system
   4.1 CAD data file
   4.2 Change of degree from cubic Bézier curve to fifth Bézier curve (without degeneration)
      4.2.1 Calculation of parameters
      4.2.2 Calculation of points on cubic Bézier curve
      4.2.3 Calculation of unit tangent vectors at initial and final points
      4.2.4 Calculation of control points of fifth Bézier curve
   4.3. Change of degree from cubic Bézier curve to fifth Bézier curve (with degeneration; part 1)
      4.3.1 Approximate calculation of unit tangent vectors at initial and final points
   4.4 Change of degree from cubic Bézier curve to fifth Bézier curve (with degeneration; part 2)
      4.4.1 Recalculation of parameters
   4.5 Change of degree from n-th degree Bézier curve to m-th degree Bézier curve
5. Drawing of Bézier curves
   5.1 Hardware configuration
   5.2 Processing for displaying Bézier curves 1. Overview FIG. 1 is a block diagram showing the essentials of the software configuration of a simple CAD system and CAD system for supporting design.

A simple CAD system 10 and a design-supporting CAD system 20 are respectively implemented by programmed computer systems. The simple CAD system 10 and the design-supporting CAD system 20 are interconnected by a communication cable or network. In a case where the two CAD systems are not interconnected, data files and the like are communicated from the simple CAD system 10 to the design-supporting CAD system 20 using a storage medium such as a floppy disk. The simple CAD system 10 and design-supporting CAD system 20 can also be implemented by a single computer system.

The simple CAD system 10 is a well-known system with which a designer is capable drawing an illustration of an article using a mouse or the like.

The simple CAD system 10 has an EPSF (Encapsulated PostScript Format) data base 11 and an IGES (Initial Graphic Exchange Specification) data converting process 12.

An EPSF data file relating to the illustration of an article created in the simple CAD system 10 is stored in the EPSF data base 11. The EPSF data file, the details of which will be described later, is described by the page description language PostScript.

The IGES data converting process 12, which converts the EPSF data file to an IGES data file (the details of which will be described later), is already known in the art.

The design-supporting CAD system 20 allows an engineer to create data representing the shape of an article using a mouse or the like.

The design-supporting CAD system 20 has a CAD data converting process 21, a CAD data base 22 and a change-of-degree process 23.

The CAD data converting process 21, which converts the IGES data file to CAD data file (the details of which will be described later), is already known in the art.

A CAD data file representing the shape of an article designed in the design-supporting CAD system 20, a CAD data file converted by the CAD data converting process 21 or a CAD data file converted by the change-of-degree process 23, described later, is stored in the CAD data base 22.

The change-of-degree process 23 converts control-point data, which defines a cubic Bézier curve, to control-point data defining a fifth Bézier curve.

The data bases 11, 22 are implemented by memory devices. The memory devices include semiconductor memories, magnetic disks and optical disks and may be internal memories of the computer systems or external memories. The processes 12, 21, 23 each signify a collection of a systematic series of operations or functions which the computer system executes in accordance with a program in order to attain the respective objective. Accordingly, each type of process is implemented by the combination of the computer system and the program which causes the computer to execute the process.

In the simple CAD system 10 and design-supporting CAD system 20, the illustration and the shape of an article are created by combining a plurality of geometric elements such as points, lines, free-form curves and free-form surfaces. In general, a free-form curve is represented by a Bézier curve, a rational B-spline curve, etc.. A free-form curve is represented by a cubic Bézier curve in the simple CAD system 10, and a free-form curve is represented by a fifth Bézier curve in the design-supporting CAD system 20.

In the simple CAD system 10 and design-supporting CAD system 20, the geometric elements are described mathematically in order to objectively describe the geometric elements and subject them to processing and analysis. The geometric elements are described in each system in a data file using a format in which processing and other operations are easy to perform in the system. Data files are described by EPSF in the simple CAD system 10. In the design-supporting CAD system 20, data files are described using a format specific to the system.

Since the CAD systems thus have data files in different formats, data files cannot be transferred between different types of CAD systems. Data exchange specifications have been prepared for converting data formats, and IGES is one example of such a data exchange specification.

The simple CAD system 10 has the IGES data converting process 12 for exchanging between EPSF data files and IGES data files, so that IGES data files can be inputted and outputted.

The design-supporting CAD system 20 has the CAD data converting process 21 for exchanging between CAD data files, which are unique to this system, and IGES data files, so that IGES data files can be inputted and outputted.

In order to design the shape of an article in the design-supporting CAD system 20 utilizing, as basic data, data representing the illustration of the article created by a designer in the simple CAD system 10, it will suffice to perform the following operation:

An EPSF data file relating to the illustration of an article created in the simple CAD system 10 is read out of the EPSF data base 11 and the EPSF data file is converted to an IGES data file by the IGES data converting process 12. The IGES data file is supplied from the simple CAD system 10 to the design-supporting CAD system 20 via data transfer or a recording medium.

In the design-supporting CAD system 20, the IGES data file provided is converted to a CAD data file by the CAD data converting process 21 and the CAD data file is stored in the CAD data base 22.

As described above, a free-form curve is represented by a cubic Bézier curve in the simple CAD system 10 and a free-form curve is represented by a fifth Bézier curve in the design-supporting CAD system 20. A cubic Bézier curve is extracted from the CAD data file converted from the IGES data file, and control-point data relating to the cubic Bézier curve is converted to control-point data relating to a fifth Bézier curve by the change-of-degree process 23.

An engineer designs an article in the design-supporting CAD system 20 on the basis of the shape represented by the CAD data file which includes the converted control-point data relating to the fifth Bézier curve.

As a result, the engineer is capable of performing design utilizing illustration data indicative of the article created by the designer. Data representing a shape identical with the illustration of the article created by the designer need not be created from the beginning by the engineer.

2. Bézier curves

Bézier curves used to represent free-form curves in the simple CAD system 10 and design-supporting CAD system 20 will now be described.

In general, an n-th degree Bézier curve P(t) is represented by the following vector equations, where P(t)=(x(t), y(t), z(t)) holds.

$$P(t) = \sum_{i=0}^{n} \{B_{i,n}(t)Q_i\} \quad (0 \leq t \leq 1) \quad (1)$$

$$B_{i,n}(t) = \binom{n}{i} (1-t)^{n-i} t^i \quad (2)$$

In Equation (1), $Q_i$ represents a control point defining the n-th degree Bézier curve. The control point $Q_i$ is represented by $Q_i=(Q_{i,x}, Q_{i,y}, Q_{i,z})$ using an XYZ orthogonal coordinate system. In the case of an n-th degree Bézier curve, there are (n+1)-number of control points, namely $Q_0, Q_1, Q_2, \ldots, Q_n$. In Equation (1), t represents a parameter giving a point on the n-th degree Bézier curve.

In Equation (2), $B_{i,n}(t)$ is a Bernstein basic function.

The cubic Bézier curve P(t) is expressed by the following equation by making the substitution n=3 in Equation (1):

$$P(t) = \sum_{i=0}^{3} \{B_{i,3}(t)Q_i\} \quad (3)$$

A cubic Bézier curve is defined by four control points $Q_0$, $Q_1$, $Q_2$ and $Q_3$.

When the substitution n=3 is made in Equation (2), the result is substituted into Equation (3) and the latter is arranged, the cubic Bézier curve is represented by the following equation:

$$\begin{aligned} P(t) = & (-t^3 + 3t^2 - 3t + 1)Q_0 + \\ & 3(t^3 - 2t^2 + t)Q_1 + \\ & 3(-t^3 + t^2)Q_2 + \\ & t^3 Q_3 \end{aligned} \quad (4)$$

When Equation (4) is arranged with regard to t, $t^2$ and $t^3$, the equation expressing the cubic Bézier curve P(t) becomes as follows:

$$\begin{aligned} P(t) = & (-Q_0 + 3Q_1 - 3Q_2 + Q_3)t^3 + \\ & 3(Q_0 - 2Q_1 + Q_2)t^2 + \\ & 3(-Q_0 + Q_1)t + \\ & Q_0 \end{aligned} \quad (5)$$

The initial point of the cubic Bézier curve is given by the following equation by making the substitution t=0 in Equation (5):

$$P(0) = Q_0 \quad (6)$$

The final point of the cubic Bézier curve is given by the following equation by making the substitution t=1 in Equation (5):

$$P(1) = Q_3 \quad (7)$$

The initial point P(0) of the cubic Bézier curve coincides with the control point $Q_0$ and the final point P(1) of the cubic Bézier curve coincides with the control point $Q_3$, as will be understood from Equations (6) and (7). This property holds true generally even for an n-th degree Bézier curve.

A tangent vector at point P(t) on the cubic Bézier curve is obtained by differentiating the cubic Bézier function P(t) of Equation (5) with respect to the parameter t and is represented by the following equation:

$$\begin{aligned} \frac{P(t)}{dt} = & 3(-Q_0 + 3Q_1 - 3Q_2 + Q_3)t^2 + \\ & 6(Q_0 - 2Q_1 + Q_2)t + \\ & 3(-Q_0 + Q_1) \end{aligned} \quad (8)$$

A tangent vector at the initial point P(0) of the cubic Bézier curve is obtained if the substitution t=0 is made in Equation (8). This tangent vector is given by the following equation:

$$\frac{P(0)}{dt} = 3(Q_1 - Q_0) \quad (9)$$

Further, a tangent vector at the final point P(1) of the cubic Bézier curve is obtained by making the substitution t=1 in Equation (8) and reducing terms. This tangent vector is given by the following equation:

$$\frac{P(1)}{dt} = 3(Q_3 - Q_2) \quad (10)$$

As will be understood from Equations (9) and (10), the tangent vector at the initial point P(0) of the cubic Bézier curve is represented using the control points $Q_0$ and $Q_1$, and the tangent vector at the final point P(1) of the cubic Bézier curve is represented using the control points $Q_2$ and $Q_3$. This property holds true generally even with regard to an n-th degree Bézier curve.

3. Simple CAD system 3.1 Drawing of geometric elements

The creation of an illustration in the simple CAD system 10 will now be described in simple terms. The illustration is drawn by combining a plurality of lines and cubic Bézier curves, as mentioned above.

Methods by which a designer draws a cubic Bézier curve in the simple CAD system 10 are illustrated in FIGS. 2a–2d and FIGS. 3a–3c. The arrows in these diagrams indicate the position of a cursor on the display screen of the simple CAD system 10.

Figure 2A:
Figure 2B:
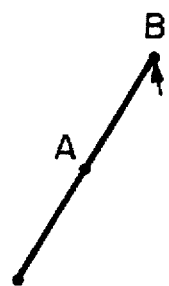
Figure 2C:
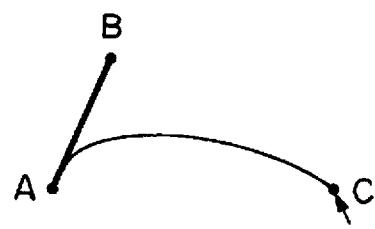
Figure 2D:
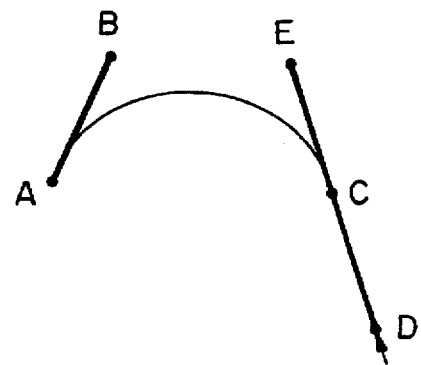

As shown in FIGS. 2a–2d, the designer manipulates a mouse to move the cursor to the desired position (point A) and then presses a button on the mouse to designate the initial point A (FIG. 2a). Next, the designer drags the mouse to move the cursor from the initial point A to a desired position (point B), thereby deciding the direction of the tangent (a tangent vector) at the initial point, and releases the button on the mouse (step 2b). As will be understood from the direction of the tangent at the initial point A, a straight line is displayed connecting the point B and a position having point symmetry with respect to the point B about the point A. Next, the designer manipulates the mouse to move the cursor to a desired position (point C) and presses the button on the mouse to designate the final point C (FIG. 2c). Finally, the designer drags the mouse to move the cursor from the final point C to a desired position (point D), thereby deciding the direction of the tangent at the final point, and releases the button on the mouse. When this is done, a point E is designated at a position having point symmetry with respect to the point D about the point C (step 2d). The curve from point A to point C is a cubic Bézier curve and the four points A, B, E and C are the control points $Q_0$, $Q_1$, $Q_2$ and $Q_3$, respectively.

The EPSF data relating to the cubic Bézier curve thus drawn is as follows:

$Q_{0,x}$ $Q_{0,y}$ m
$Q_{1,x}$ $Q_{1,y}$ $Q_{2,x}$ $Q_{2,y}$ $Q_{3,x}$ $Q_{3,y}$ c

Where, "m (moveto)" is a graphics command which indicates that the point described in front of the command "m" is an initial point, and "c (curveto)" is a graphics command which indicates that a cubic Bézier curve is to be drawn with the point described in front of the command "c" serving as a control point. Since the simple CAD system 10 draws a two-dimensional illustration, the coordinate data of a control point is solely an x coordinate and a y coordinate. A cubic Bézier curve is defined by two graphics commands and four sets of control-point data.

When another cubic Bézier curve or line is drawn following a cubic Bézier curve represented by the above-mentioned EPSF data, the EPSF data representing this other cubic Bézier curve or line is described following the above-mentioned EPSF data using $Q_{3,x}$, $Q_{3,y}$ as the initial point.

After the point C is designated by pressing the button on the mouse (FIG. 2c), a cubic Bézier curve from point A to point C will be drawn even if the mouse button is released without designating the tangent direction (point D) at the final point C. In such case the point E will not be defined and, hence, the control point $Q_2$ will not be defined.

The data relating to the cubic Bézier curve thus drawn is described as follows:

$Q_{0,x}$ $Q_{0,y}$ m
$Q_{1,x}$ $Q_{1,y}$ $Q_{3,x}$ $Q_{3,y}$ y

Here "y" also is a graphics command indicating that a cubic Bézier curve is to be drawn. When a graphics command is "y", the coordinate data of the control point $Q_2$ is non-existent and therefore the control point $Q_2$ is forced to take on coordinate data identical with that of the control point $Q_3$. In other words, the control points $Q_2$ and $Q_3$ coincide. Such coincidence between two control points is referred to as degeneration. The coincidence between the final point (control point $Q_3$) and the control point $Q_2$ means that the final point has degenerated.

Figure 3A:
Figure 3B:
Figure 3C:
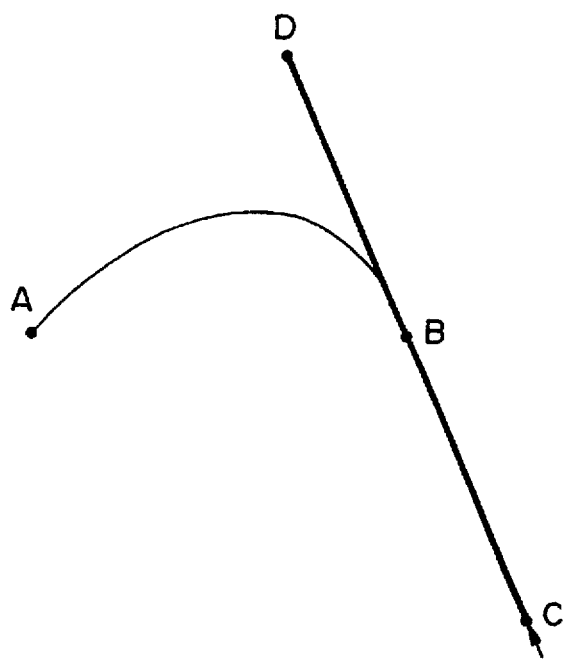

A cubic Bézier curve can be drawn in the following manner as well:

This description will be rendered with reference to FIGS. 3a–3c. The designer manipulates the mouse to move the cursor to the desired position (point A) and then clicks the mouse to designate the initial point A (FIG. 3a). Next, the designer drags the mouse to move the cursor to a desired position (point B) and presses the button on the mouse to designate the final point B (FIG. 3b). Finally, the designer drags the mouse to move the cursor from the final point B to a desired position (point C), thereby deciding the direction of the tangent, and releases the button on the mouse to designate the point C (FIG. 3c). At this time a point D is designated at a position having point symmetry with respect to the point C about the point B. The curve from point A to point B is a cubic Bézier curve. The three points A, D and B are the control points $Q_0$, $Q_2$ and $Q_3$, respectively. The control point $Q_1$ is not defined.

The data relating to the cubic Bézier curve thus drawn is as follows:

$Q_{0,x}$ $Q_{0,y}$ m
$Q_{2,x}$ $Q_{2,y}$ $Q_{3,x}$ $Q_{3,y}$ v

Here "v" is a graphics command indicating that a cubic Bézier curve is to be drawn. When a graphics command is "v", the coordinate data of the control point $Q_1$ is non-existent and therefore the control point $Q_1$ is forced to take on coordinate data identical with that of the control point $Q_0$. In other words, the control points $Q_0$ and $Q_1$ coincide. The coincidence between the initial point (control point $Q_0$) and the control point $Q_1$ means that the initial point has degenerated.

A line is drawn in the following manner:

As shown in FIGS. 3a and 3b, the designer manipulates the mouse to move the cursor to the desired position (point A) and then clicks the mouse to designate the initial point A (FIG. 3a). The designer then clicks the mouse at another desired position (point B) to designate the final point B (FIG. 3b). A straight line is drawn from the initial point A to the final point B.

The EPSF data relating to the line thus drawn is represented by the following:

$x_0$ $y_0$ m
$x_1$ $y_1$ l

Here $x_0$, $y_1$ represent the coordinates of the initial point A, and $x_1$, $y_1$ represent the coordinates of the final point B. Further, "l (lineto)" is a graphics command indicating that a line is to be drawn.

Thus, geometric elements are drawn in the simple CAD system in the manner described above.

3.2 EPSF data file

Figure 4A:
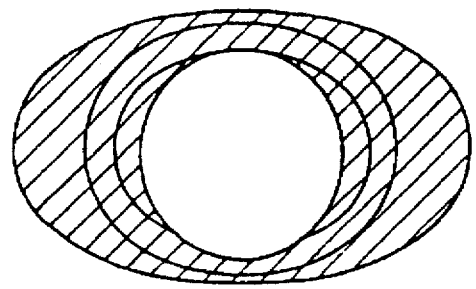
FIGS. 4a and 4b show an example of an illustration of an article drawn by a simple CAD system.
Figure 4B:
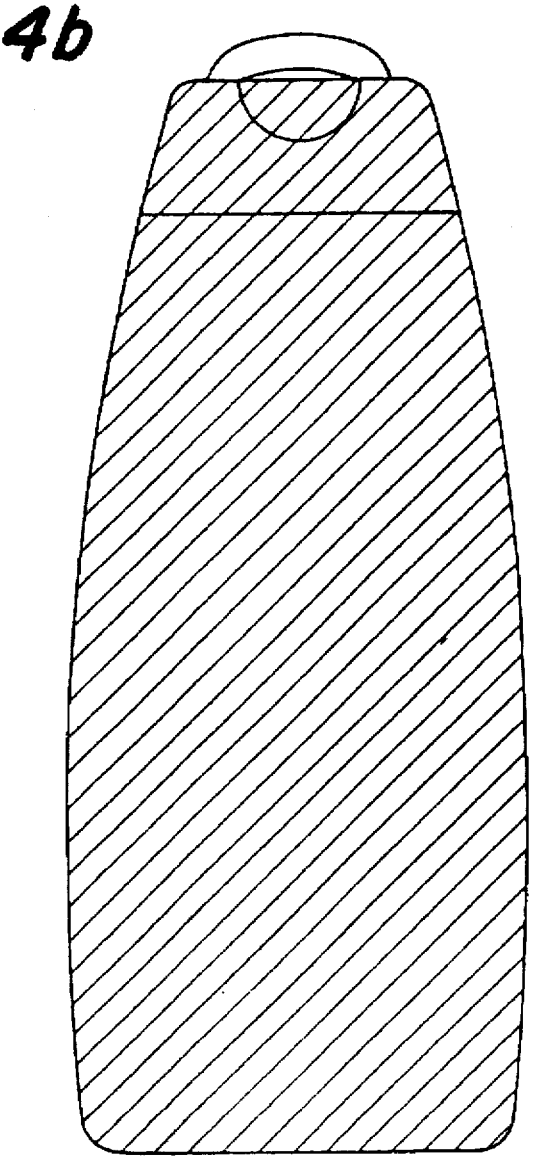

FIGS. 4a and 4b show an example of an illustration of an article drawn in a simple CAD system. The illustration of this article represents a bottle and shows top and front views of the bottle. The hatched areas actually appear in color on the display screen.

FIGS. 5, 6 and 7 show an example of an EPSF data file, which contains EPSF data representing part of the illustration of the bottle depicted in FIGS. 4a and 4b. The EPSF data file is stored in the EPSF data base 11 of the simple CAD system 10.

Comments such as the name of the creating system (software), the name of the creator, the file name and the date of creation, as well as set parameters such as color, are described in the starting section "%!PS-*d*b*-3.0 . . . %%Endsetup" (FIG. 5, first line to FIG. 6, sixth line) in the EPSF data file. The end of the set parameters is described in the termination section "%%PageTrailer . . . %%EOF" (FIG. 7, ninth line from the bottom to the last line). The data relating to the geometric elements is described between these sections.

Figure 8A:
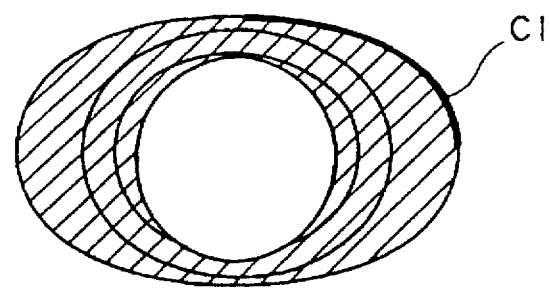
FIGS. 8a and 8b show the illustration of FIGS. 4a and 4b, in which geometric elements of a part thereof are emphasized.
Figure 8B:
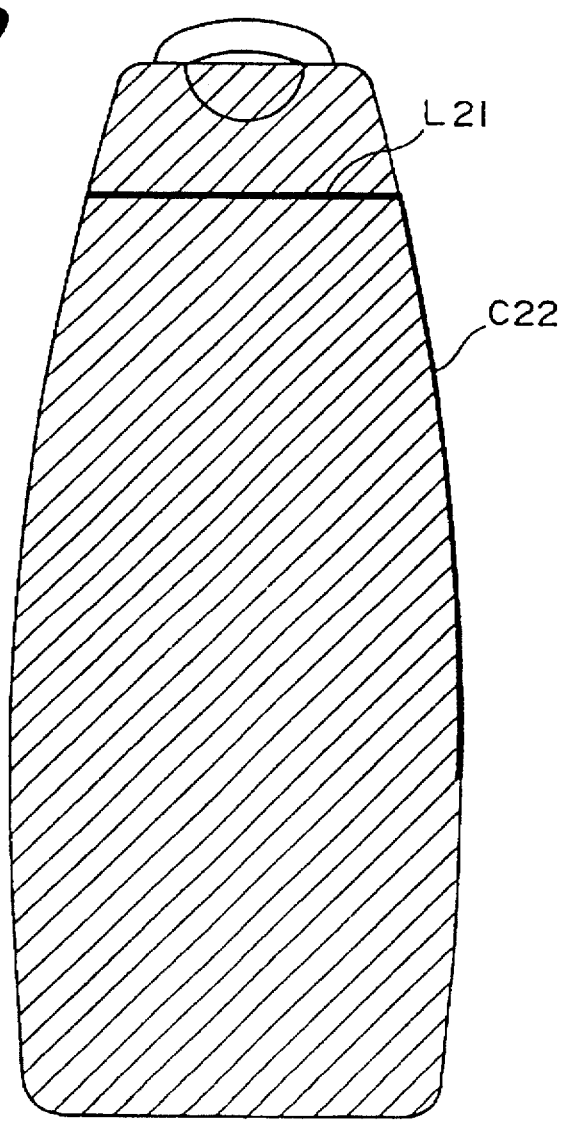

By way of example, in this EPSF data file, data (the 15th to 16th lines in FIG. 6) relating to the initial geometric element [cubic Bézier curve (with no degeneration)] relates to an element C1 shown in FIG. 8a. The first and second lines in FIG. 7 are data relating to a line representing an element L21, and the immediately following third line in FIG. 7 is data relating to a geometric element [cubic Bézier curve (the initial point is degenerated)] representing an element C22.

3.3 IGES data file

The EPSF data file stored in the EPSF data base 11 is converted to an IGES data file by the IGES data converting process 12, as described above.

Figure 10:
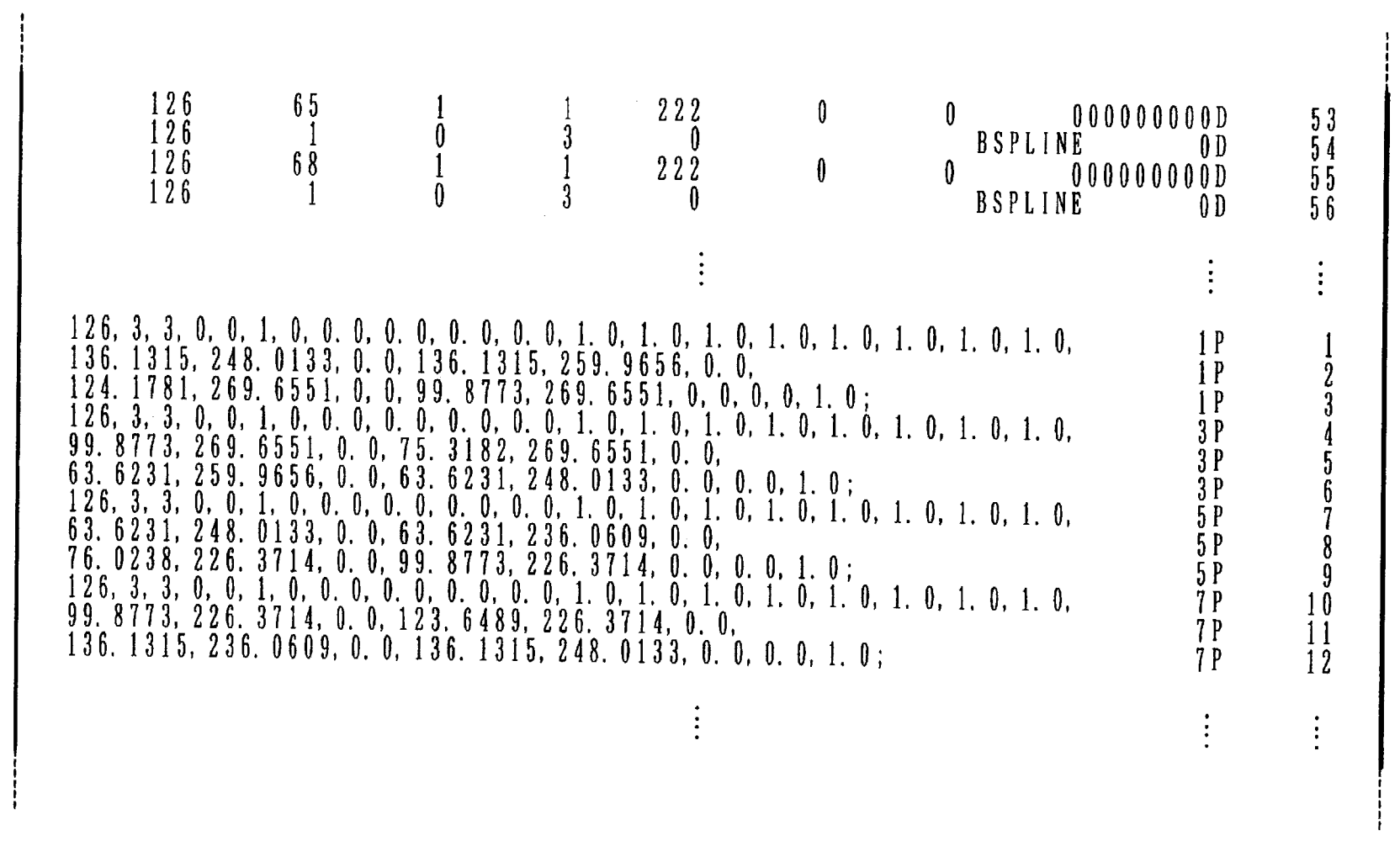
Figure 11:
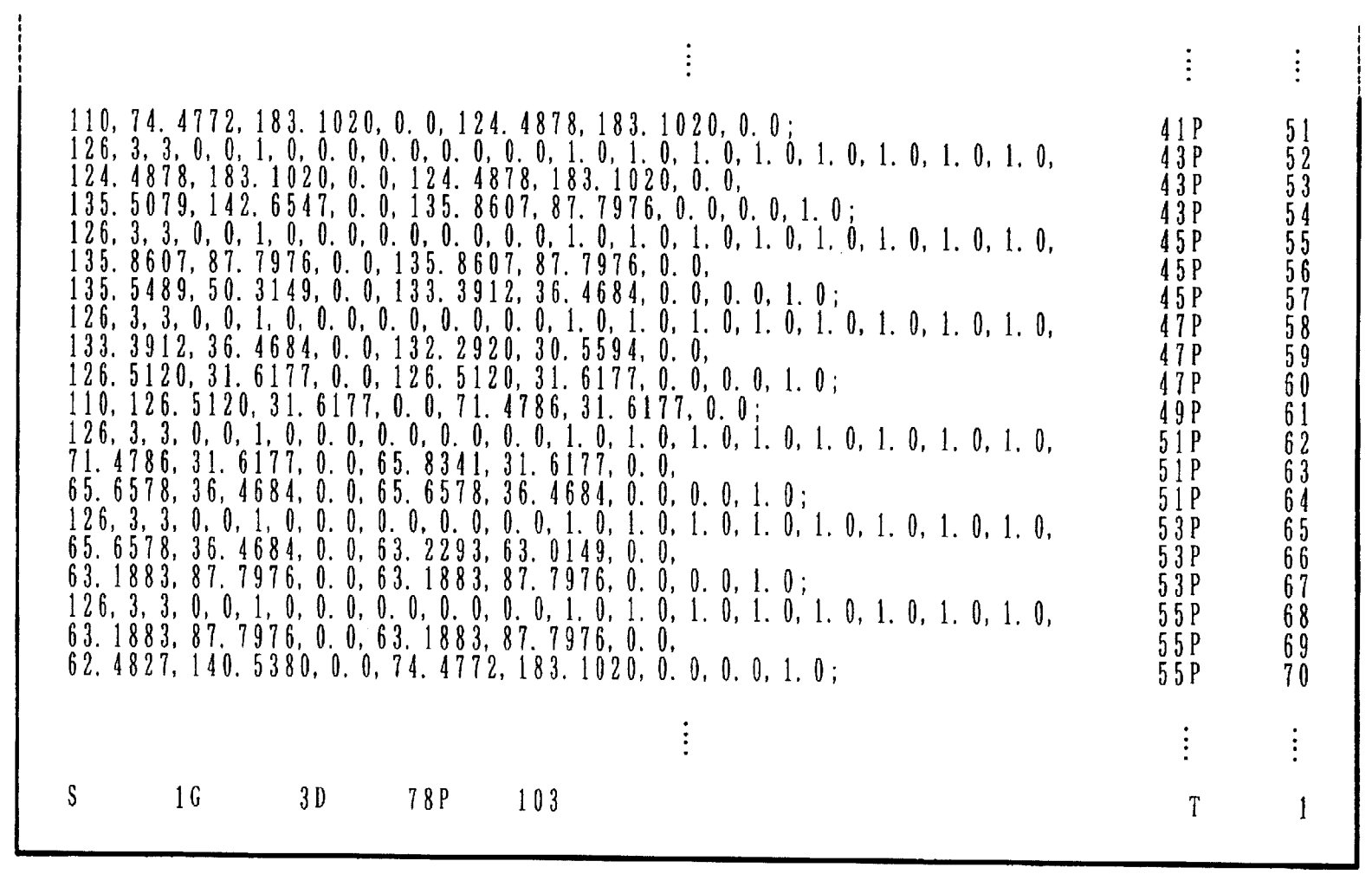

FIGS. 9, 10 and 11 show an example of an IGES data file. This IGES data file is obtained by converting the EPSF data file shown in FIGS. 5, 6 and 7.

The IGES data file is composed of a starting section (S), a global section (G), a directory section (D), a parameter section (P) and a terminal section (T).

Comments and the like are described in the starting section. The starting section is represented by S in the 73rd column.

Precision, units and the like are described in the global section. The global section is represented by G in the 73rd column.

A number representing the type of geometric element (line: TYPE 110; rational B-spline function: TYPE 126), level and line width, etc., are described, per each geometric element (line or rational B-spline function), in the directory section. The directory section is represented by D in the 73rd column.

Geometric elements are described in formats that differ from one another in the parameter section. The 73rd column of the parameter section is P, and the numerical value preceding it represents the line number in the directory section.

The parameters relating to a line contain the coordinates of the initial point and the coordinates of the final point of the line.

The parameters relating to a rational B-spline function include knot vectors, weight vectors, control points, etc. By selecting knot and weight vectors appropriately, a cubic Bézier curve in the EPSF data file can be expressed correctly by a rational B-spline function. The degree of a rational B-spline function and the degree of a Bézier curve are identical, and the control points of a rational B-spline function and the control points of a cubic Bézier curve are equivalent.

The initial and final points of a line and the control points of a rational B-spline function are represented by x, y and z coordinates. Since coordinate data is represented solely by x and y coordinates in an EPSF data file, the z Coordinates are all "0.0" in the IGES data file. Since different unit systems are used in the EPSF and IGES data files, the numerical values of the x and y coordinates are different.

The numbers of records (number of lines) of the starting section, directory section and parameter section are described in the terminal section (T). In the IGES data file shown in FIGS. 9 through 11, the number S of records in the starting section is "1", the number G of records of the global section is "3", the number D of records of the directory section is "78" and the number of records P of the parameter section is "103".

The IGES data file converted by the IGES data converting process 12 is supplied from the simple CAD system 10 to the design-supporting CAD system 20.

4. Design-supporting CAD system

Figure 12:
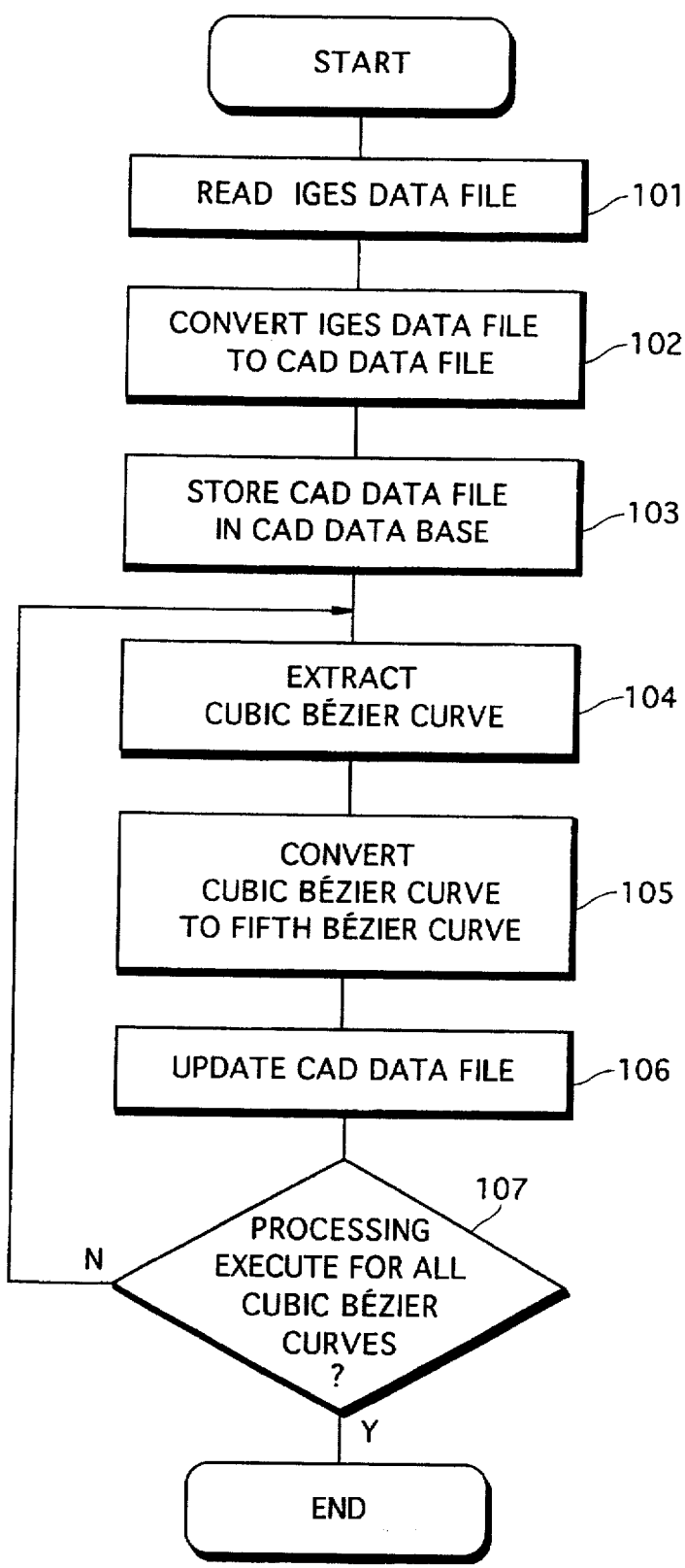
FIG. 12 is a flowchart showing the overall procedure of processing for change of degree in a design-supporting CAD system.

The processing procedure relating to the data conversion in the design-supporting CAD system 20 will now be described. FIG. 12 illustrates the overall processing procedure in the design-supporting CAD system 20.

The IGES data file outputted by the simple CAD system 10 is accepted (step 101) and the file is converted to a CAD data file by the CAD data converting process 21 (step 102). Rational B-spline functions are converted to cubic Bézier curves by this conversion. The converted CAD data file is stored in the CAD data base 22 (step 103).

The control-point data defining a cubic Bézier curve is extracted, element by element, from the CAD data file stored in the CAD data base 22 (step 104) and the control-point data defining the cubic Bézier curve is converted by the change-of-degree process 23 to control-point data defining a fifth Bézier curve (step 105). Four items of control-point data defining the extracted cubic Bézier curve in the CAD data file is updated to six items of control-point data defining the converted fifth Bézier curve (step 106). The processing of steps 104~106 is executed with regard to all cubic Bézier curves contained in the CAD data file (step 107).

4.1 CAD data file

FIG. 13 illustrates an example of a CAD data file. This is a CAD data file obtained as a result of converting the IGES data file of FIGS. 9~11 by the CAD data converting process 21.

The CAD data file contains element numbers, element types and the coordinate data thereof.

The element numbers are for identifying elements.

The type of element indicates that an element is a straight line (LINE) or free-form curve (CRVE). A free-form curve is a fifth Bézier curve, as mentioned above. The types of elements are not limited to two, namely straight lines and free-form curves, for circles and circular arcs may be used as well, in which cases symbols representing these types are used.

The coordinate data is coordinate data of the initial and final points of a straight line if the type is LINE and the coordinate data of control points if the type is CRVE.

In the CAD data conversion, the coordinate data of initial and final points in the parameter section relating to a geometric element of TYPE 110 (straight line) in the IGES data file is used as is as the coordinate data of a straight line (LINE), and the coordinate data of control points in the parameter section relating to the geometric element of a rational B-spline function of TYPE 126 in the IGES data file is used as is as the coordinate data of a free-form curve (CRVE) (of the control points of a cubic Bézier curve).

Figure 14A:
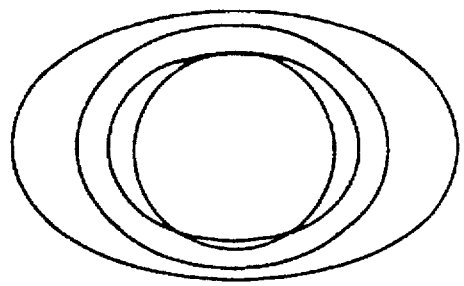
FIGS. 14a and 14b show an article, represented by a CAD data file, displayed in a design-supporting CAD system.
Figure 14B:
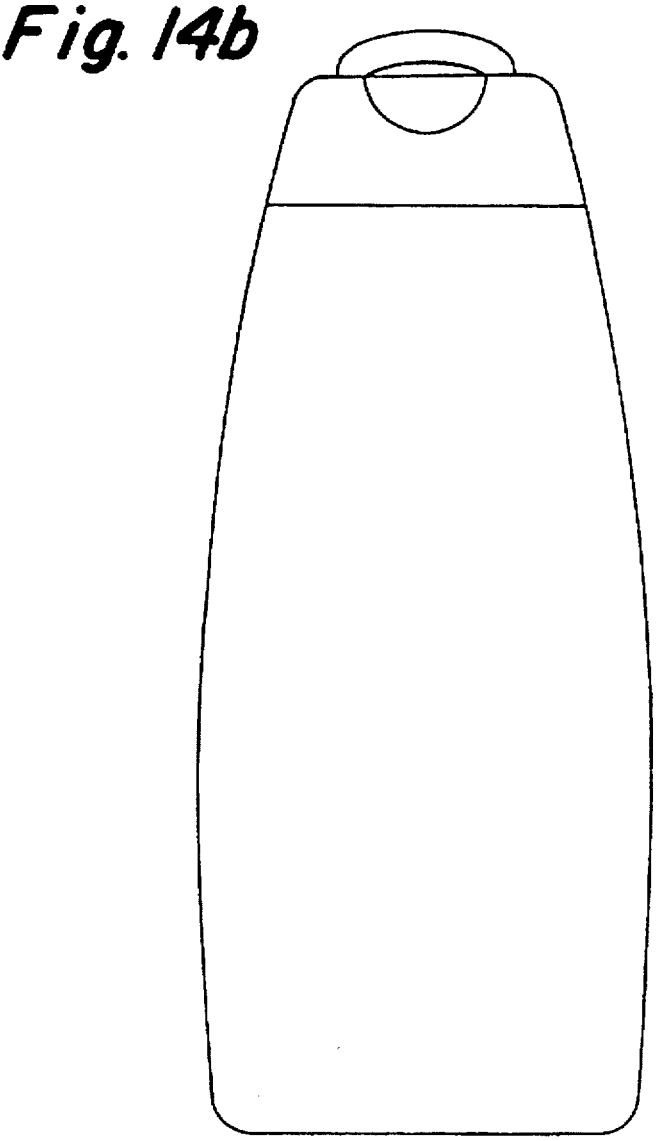

FIGS. 14a and 14b are a drawing of an article represented by the CAD data file shown in FIG. 13. This diagram is equivalent to that which would be obtained by eliminating color from the illustration of the bottle depicted in FIGS. 4a and 4b. (Information relating to color vanishes when the conversion is made from the EPSF data file to the IGES data file.)

Figure 15A:
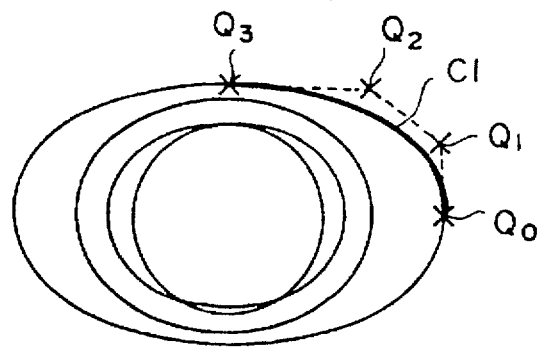
FIGS. 15a and 15b show control points regarding some geometric elements in a diagram representing the article of FIGS. 14a and 14b.
Figure 15B:
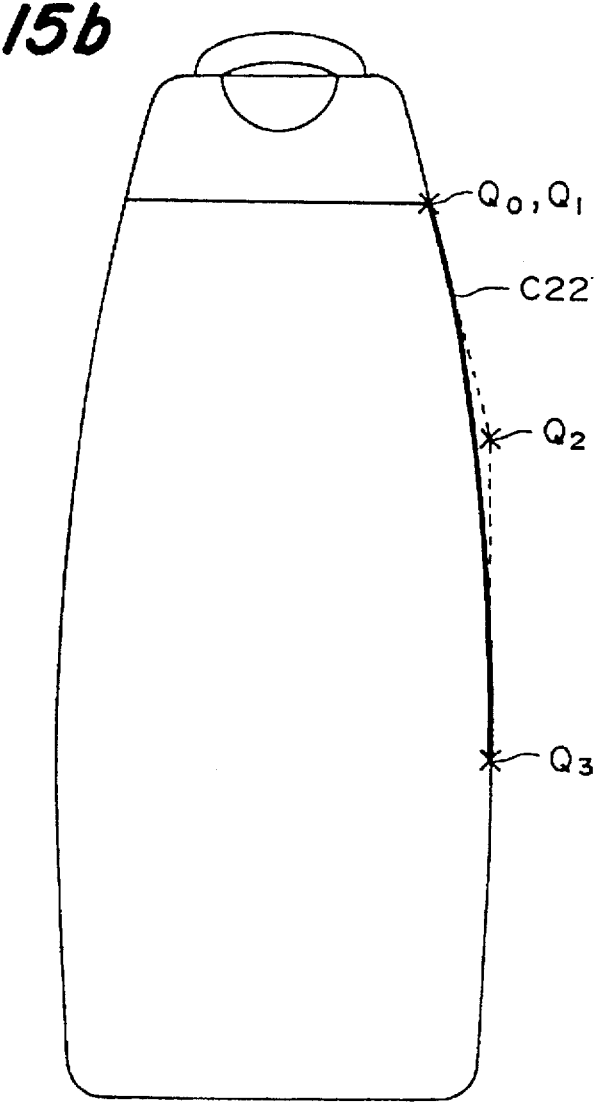

FIGS. 15a and 15b are a diagram in which control points (indicated by "x") are displayed with regard to elements C1 and C22, which are cubic Bézier curves. Since the element C1 has not degenerated, four control points exist. Since the initial point of the element C22 has degenerated, only three apparent control points exist.

4.2 Change of degree from cubic Bézier curve to fifth Bézier curve (without degeneration)

Processing executed in the change-of-degree process 23 (FIG. 12; step 105) to convert a cubic Bézier curve to a fifth Bézier curve will now be described in detail. Processing in the change-of-degree process 23 is also capable of being implemented, all or in part, by special-purpose arithmetic circuitry (hardware).

Free-form curves are cubic Bézier curves in the simple CAD system 10 and fifth Bézier curves in the design-supporting CAD system 20, as mentioned above.

The shape of the illustration of the article created by the simple CAD system 10 and the shape of the article represented by the data obtained by the change-of-degree process 23 in the design-supporting CAD system 20 must be identical.

In order to meet this requirement, the change of degree from the cubic Bézier curve to the fifth Bézier curve is performed in such a manner that the tangent vectors at the initial and final points of the cubic Bézier curve are each preserved in the fifth Bézier curve and the fifth Bézier curve takes on substantially the same shape as that of the cubic Bézier curve. In other words, on the basis of the four control points $Q_i$ ($i=0\sim3$) defining the cubic Bézier curve, six control points defining the fifth Bézier curve are obtained in such a manner that the tangent vectors at the initial and final points of the cubic Bézier curve are each preserved in the fifth Bézier curve and the fifth Bézier curve takes on substantially the same shape as that of the cubic Bézier curve.

Let the six control points defining the fifth Bézier curve be $K_0$, $K_1$, $K_2$, $K_3$, $K_4$ and $K_5$. The control points of the fifth Bézier curve are represented by $K_i$ ($i=0, 1, \ldots, 5$), where $K_i=(a_i,b_i,c_i)$ holds. The initial and final points of the fifth Bézier curve coincide with the initial and final points, respectively, of the cubic Bézier curve.

Figure 16:
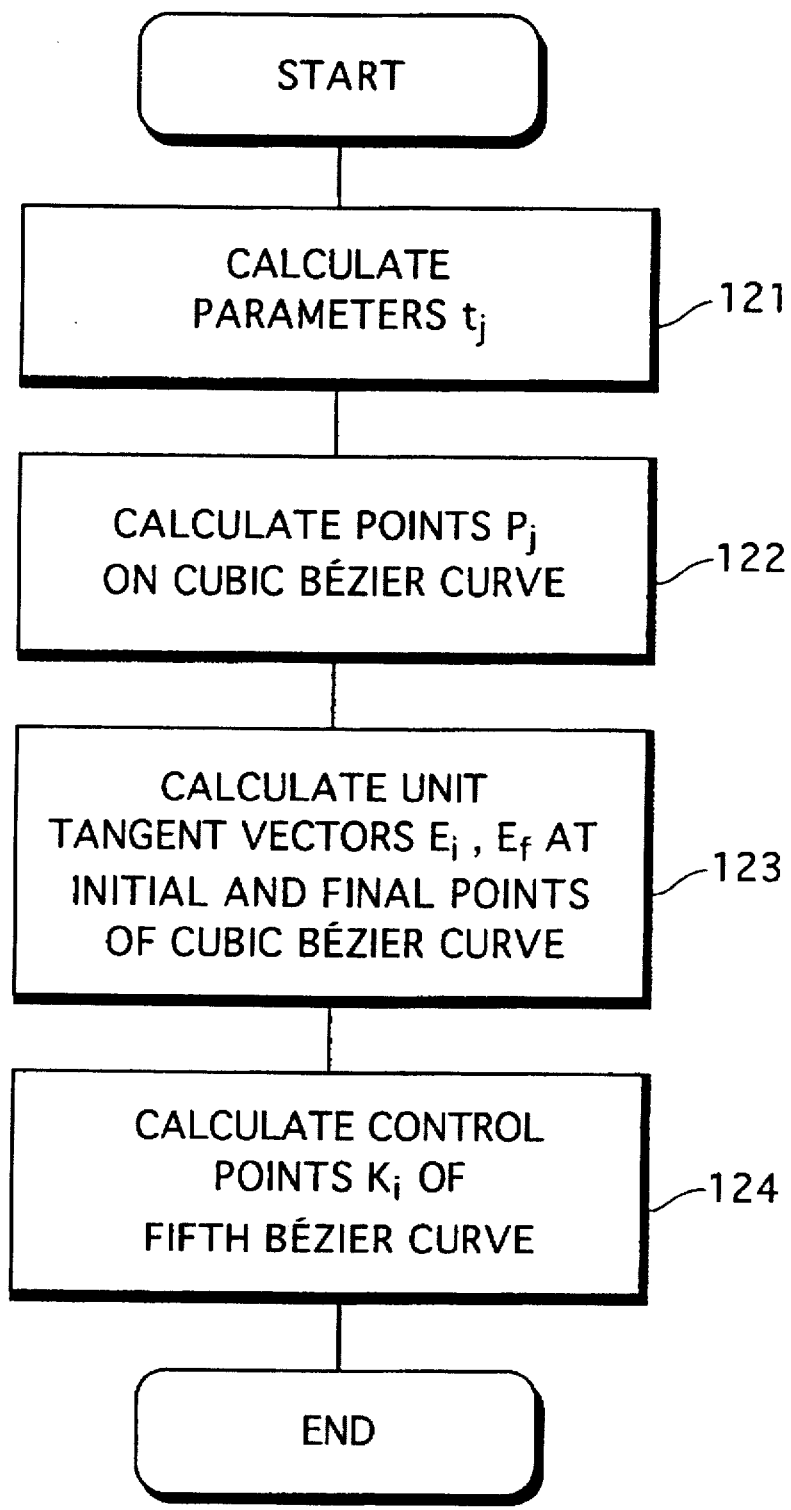
FIG. 16 is a flowchart showing the procedure of processing for change of degree from a cubic Bézier curve to a fifth Bézier curve.
Figure 17A:
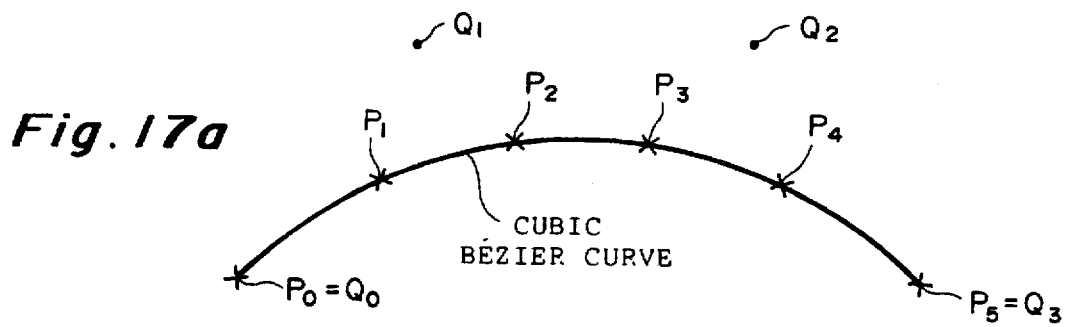
Figure 17B:
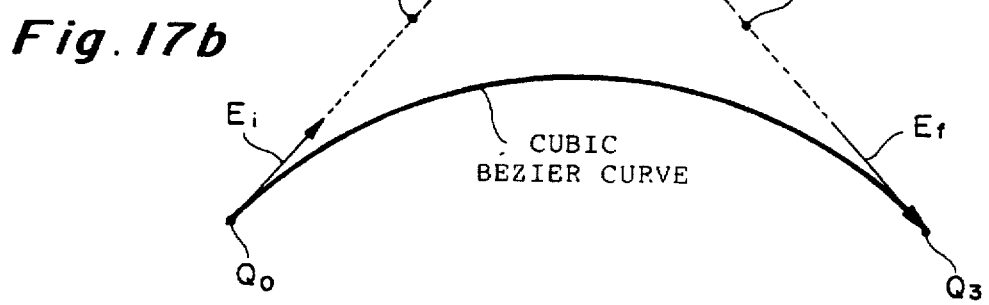
Figure 17C:
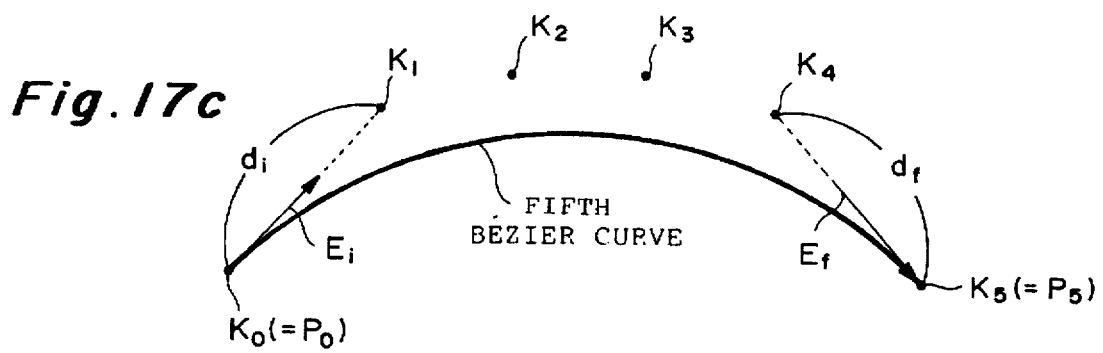

FIG. 16 illustrates the procedure for converting a cubic Bézier curve to a fifth Bézier curve. FIGS. 17a~17c are diagrams for describing the change of degree from a cubic Bézier curve to a fifth Bézier curve.

4.2.1 Calculation of parameters (FIG. 16; step 121)

It is necessary to specify six points on a cubic Bézier curve in order to calculate, on the basis of four control points $Q_i$ ($i=0\sim3$) defining the cubic Bézier curve, six control points $K_i$ ($i=0\sim5$) defining a fifth Bézier curve in such a manner that the tangent vectors at the initial and final points of the cubic Bézier curve are each preserved in the fifth Bézier curve and the fifth Bézier curve takes on substantially the same shape as that of the cubic Bézier curve. In order to calculate the six points on the cubic Bézier curve, six parameters giving these points are required.

Six parameters $t_0$, $t_1$, $t_2$, $t_3$, $t_4$ and $t_5$ are calculated by dividing the segment from $t=0$ (the initial point of the cubic Bézier curve) to $t=1$ (the final point of the cubic Bézier curve) into five equal portions. The six parameters giving the points on the cubic Bézier curve are represented by the following equation:

$$t_j = j/5 \quad (j=0, 1, \ldots, 5) \tag{11}$$

The six calculated parameters $t_j=(j=0\sim5)$ are stored temporarily in a memory with which the change-of-degree process 23 is provided.

4.2.2 Calculation of points on cubic Bézier curve (FIG. 16; step 122)

Next, six points on the cubic Bézier curve are calculated using the six calculated parameters $t_j=(j=0\sim5)$ (see FIG. 17a).

Let $P_j$ [$=(x_j,y_j,z_j)$] stand for a point on the cubic Bézier curve at $t=t_j$. The point Pj is represented by the following equation on the basis of Equation (3):

$$P_j = P(t_j) \tag{12}$$
$$= \sum_{i=0}^{3} \{B_{i,3}(t_j)Q_i\}$$

Calculating the point $P_j$ ($j=0\sim5$) using Equation (12) entails an enormous amount of calculation and the calculations required an extended period of time. For this reason, $P_j$ ($j=0\sim5$) is calculated by the forward difference method. Since $B_{i,3}(t_j)$ ($i=0\sim3$, $j=0\sim5$) is a constant, these may be calculated in advance and $P_j$ ($j=0\sim5$) may be calculated in accordance with Equation (12). The backward difference method may be used instead of the forward difference method or some other method may be used.

In the forward difference method, a difference $P_0$ of zero order, a difference $\Delta P_0$ of first order, a difference $\Delta^2 P_0$ of second order and a difference $\Delta^3 P_0$ of third order at the initial value ($t=t_0=0$) are calculated. These are represented by the following equations using the four control points $Q_i$ ($i=0\sim3$) defining the cubic Bézier curve, where $\delta$ represents the forward difference.

$$\delta = \tfrac{1}{5} \tag{13}$$
$$P_0 = P(0) \tag{14}$$
$$= Q_0$$
$$\Delta P_0 = \Delta P(0) \tag{15}$$
$$= P(\delta) - P(0)$$
$$= (-Q_0 + 3Q_1 - 3Q_2 + Q_3)\delta^3 +$$
$$(3Q_0 - 2Q_1 + Q_2)\delta^2 +$$
$$(-Q_0 + Q_1)\delta$$
$$\Delta^2 P_0 = \Delta^2 P(0) \tag{16}$$
$$= \Delta P(\delta) - \Delta P(0)$$
$$= 6(-Q_0 + 3Q_1 - 3Q_2 + Q_3)\delta^3 +$$
$$6(Q_0 - 2Q_1 + Q_2)\delta^2$$
$$\Delta^3 P_0 = \Delta^3 P(0) \tag{17}$$
$$= \Delta^2 P(\delta) - \Delta^2 P(0)$$
$$= 6(-Q_0 + 3Q_1 - 3Q_2 + Q_3)\delta^3$$

A difference $P_j$ of zero order, a difference $\Delta P_j$ of first order, a difference $\Delta^2 P_j$ of second order and a difference $\Delta^3 P_j$ of third order at $t=t_j$ ($j=1\sim5$) are represented by the following equations using a difference $P_{j-1}$ of zero order, a difference $\Delta P_{j-1}$ of first order, a difference $\Delta^2 P_{j-1}$ of second order and a difference $\Delta^3 P_{j-1}$ of third order at $t=t_{j-1}$:

$$\Delta^3 P_j = \Delta^3 P_{j-1} \tag{18}$$
$$\Delta^2 P_j = \Delta^2 P_{j-1} + \Delta^3 P_j \tag{19}$$
$$\Delta P_j = \Delta P_{j-1} + \Delta^2 P_j \tag{20}$$
$$P_j = P_{j-1} + \Delta P_j \tag{21}$$

Since point $P_5$ is the final point of the cubic Bézier curve, we have $P_5=P(1)=Q_3$ from Equation (7). Accordingly, point $P_5$ can be calculated from $P_5=Q_3$ rather than being calculated based upon the forward difference method.

Figure 18:
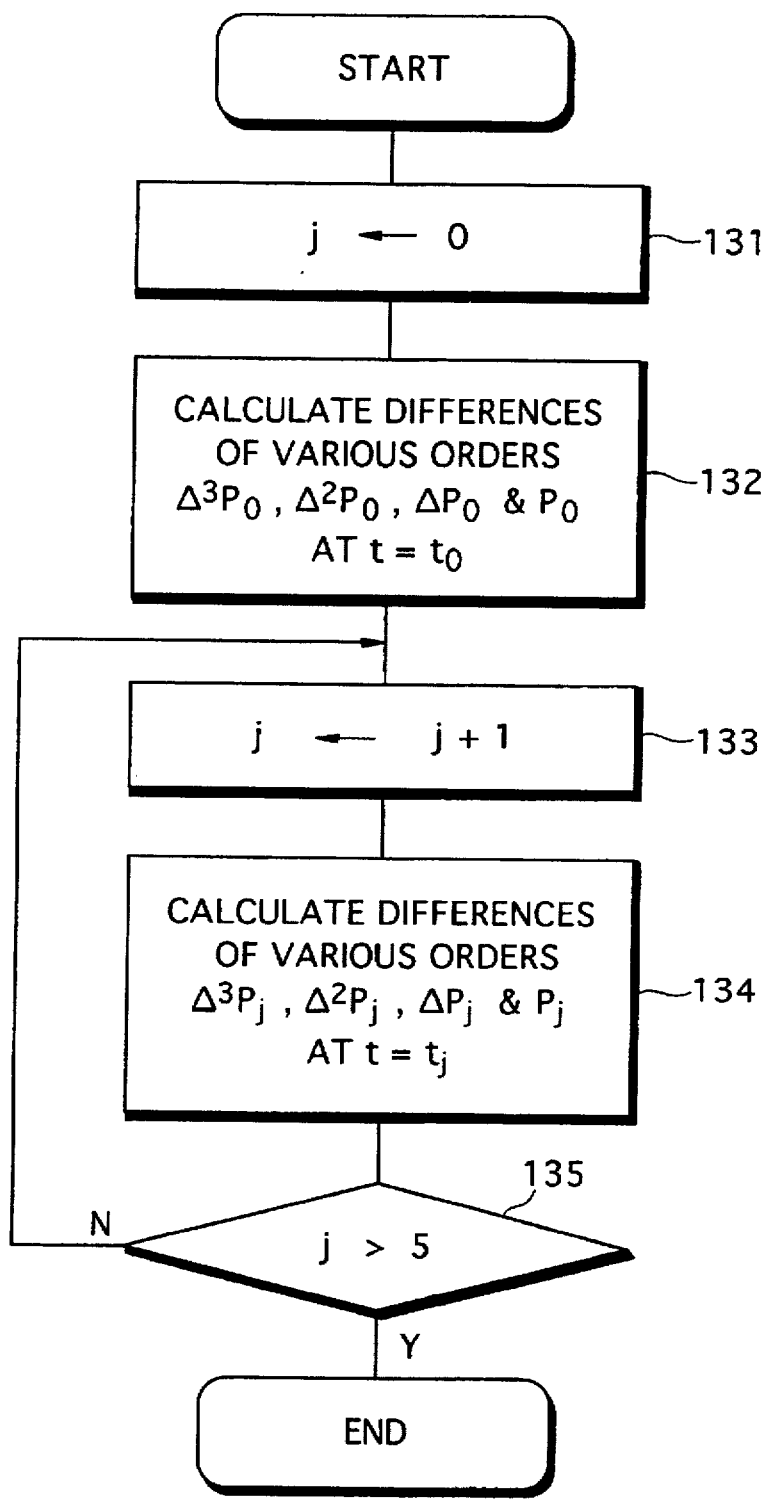
FIG. 18 is a flowchart showing a processing procedure for calculating points on a cubic Bézier curve.

FIG. 18 illustrates a procedure for calculating six points $P_j$ ($j=0\sim5$) on a cubic Bézier curve according to the forward difference method.

First, j is initialized to 0 (step 131) and the difference $P_0$ of zero order, the difference $\Delta P_0$ of first order, the difference $\Delta^2 P_0$ of second order and the difference $\Delta^3 P_0$ of third order at $t=t_0$ are calculated in accordance with Equations (13)~(17), respectively (step 132).

Next, j is incremented (step 133) and the difference $P_j$ of zero order, the difference $\Delta P_j$ of first order, the difference $\Delta^2 P_j$ of second order and the difference $\Delta^3 P_j$ of third order at $t=t_j$ are calculated in accordance with Equations (18)~(21), respectively (step 134).

The processing of steps 133, 134 is repeated until j becomes equal to 5 (step 135).

The values of the differences $P_0$, $P_1$, $P_2$, $P_3$, $P_4$ and $P_5$ of zero order calculated by the forward difference method thus become values which represent respective ones of six points on the cubic Bézier curve. The points $P_0$, . . . , $P_5$ obtained are stored temporarily in the memory with which the change-of-degree process 23 is provided.

4.2.3 Calculation of unit tangent vectors at initial and final points (FIG. 16; step 123)

In order to satisfy the requirement that the tangent vectors at the initial and final points of the cubic Bézier curve be preserved in the change of degree from the cubic Bézier curve to the fifth Bézier curve, a unit tangent vector $E_i$ at the initial point of the cubic Bézier curve and a unit tangent vector $E_f$ at the final point are calculated (see FIG. 17b).

Since the tangent vector at the initial point of the cubic Bézier curve is given by Equation (9), the unit tangent vector $E_i$ is represented by the following equation using the coordinate data of control points $Q_0$ and $Q_1$:

$$E_i = (E_{i,x}, E_{i,y}, E_{i,z}) = \quad (22)$$

$$\frac{(Q_{1,x} - Q_{0,x}, Q_{1,y} - Q_{0,y}, Q_{1,z} - Q_{0,z})}{\{(Q_{1,x} - Q_{0,x})^2 + (Q_{1,y} - Q_{0,y})^2 + (Q_{1,z} - Q_{0,z})^2\}^{1/2}}$$

Since the tangent vector at the final point of the cubic Bézier curve is given by Equation (10), the unit tangent vector $E_f$ is represented by the following equation using the coordinate data of control points $Q_2$ and $Q_3$:

$$E_f = (E_{f,x}, E_{f,y}, E_{f,z}) = \quad (23)$$

$$\frac{(Q_{3,x} - Q_{2,x}, Q_{3,y} - Q_{2,y}, Q_{3,z} - Q_{2,z})}{\{(Q_{3,x} - Q_{2,x})^2 + (Q_{3,y} - Q_{2,y})^2 + (Q_{3,z} - Q_{2,z})^2\}^{1/2}}$$

Thus, the unit tangent vector $E_i$ at the initial point of the cubic Bézier curve and the unit tangent vector $E_f$ at the final point are calculated. The unit tangent vectors $E_i$ and $E_f$ calculated are stored in the memory with which the change-of-degree process 23 is provided.

4.2.4 Calculation of control points of fifth Bézier curve (FIG. 16; step 124)

On the basis of the six parameters $t_j$ (j=0~5) giving points on the cubic Bézier curve, the six points $P_j$ (j=0~5) on the cubic Bézier curve and the two unit tangent vectors $E_i$ and $E_f$, six control points $K_i$ (i=0~5) defining a fifth Bézier curve are calculated in accordance with the requirement that the tangent vectors at the initial and final points of the cubic Bézier curve must be preserved and that the fifth Bézier curve must have substantially the same shape as that of the cubic Bézier curve (see FIG. 17c).

In order to satisfy the requirement that the fifth Bézier curve must be made to have a shape substantially the same as that of the cubic Bézier curve, the six control points $K_i$ (i=0~5) of the fifth Bézier curve are decided in such a manner that the fifth Bézier curve will pass through the six points $P_j$ (j=0~5) of the cubic Bézier curve or in the vicinity of these points. More specifically, control points $K_i$ (i=0~5) are calculated so as to minimize the error (distance) between a point on the fifth Bézier curve at $t=t_j$ [point $P(t_j)$ when n=5 is substituted into Equation (1)] and point $P_j$ on the cubic Bézier curve.

The error r between point $P(t_j)$ on the fifth Bézier curve at $t=t_j$ (j=0~5) and point $P_j$ on the cubic Bézier curve is represented by the following equation:

$$r = \sum_{j=0}^{5} \left| \sum_{i=0}^{5} \{B_{i,5}(t_j) K_i\} - P_j \right|^2 \quad (24)$$

In order to make the initial point and final point of the fifth Bézier curve coincide with the initial point $P_0$ and final point $P_5$ of the cubic Bézier curve, the six control points $K_i$ (i=0~5) of the fifth Bézier curve are decided in such a manner that the following equations will hold:

$$\sum_{i=0}^{5} \{B_{i,5}(t_0) K_i\} - P_0 = 0 \quad (25)$$

$$\sum_{i=0}^{5} \{B_{i,5}(t_5) K_i\} - P_5 = 0 \quad (26)$$

Arranging Equation (24) using Equations (25) and (26) gives the following equation:

$$r = \sum_{j=1}^{4} \left| \sum_{i=0}^{5} \{B_{i,5}(t_j) K_i\} - P_j \right|^2 \quad (27)$$

Control points $K_1$ and $K_4$ of the fifth Bézier curve are obtained as follows utilizing the requirement that the unit tangent vector at the initial point $K_0$ of the fifth Bézier curve and the unit tangent vector $E_i$ at the at the initial point of the cubic Bézier curve will be identical and that the unit tangent vector at the final point $K_5$ of the fifth Bézier curve will be the same as the unit tangent vector $E_f$ at the final point $P_5$ of the cubic Bézier curve.

In order to arrange it so that the unit tangent vector at the initial point of the fifth Bézier curve will be the same as that at the initial point of the cubic Bézier curve, it is required that the control point $K_1$ lie on an extension line obtained by extending the unit tangent vector $E_i$ with the control point $K_0$ serving as the initial point. If we let $d_i$ represent the distance between the control points $K_0$ and $K_1$, the control point $K_1$ will be represented by the following equation using the control point $K_0$, the unit tangent vector $E_i$ and the distance $d_i$:

$$K_1 = K_0 + d_i E_i \quad (28)$$

Similarly, with regard to control point $K_4$, if we let $d_f$ represent the distance between the control points $K_5$ and $K_4$, the control point $K_4$ will be represented by the following equation using the control point $K_5$, the unit tangent vector $E_f$ and the distance $d_f$:

$$K_4 = K_5 + d_f E_f \quad (29)$$

Further, the following equations hold from the requirement that the initial point $P_0$ and final point $P_5$ of the cubic Bézier curve be made to coincide with the initial point and final point, respectively, of the fifth Bézier curve and that the initial point and final point of the fifth Bézier curve be made to coincide with the control points $K_0$ and $K_5$, respectively:

$$K_0 = P_0 \quad (30)$$

$$K_5 = P_5 \quad (31)$$

When Equation (30) is substituted into Equation (28) and Equation (31) is substituted in Equation (29), the control points $K_1$ and $K_4$ of the fifth Bézier curve are represented by the following equations, respectively:

$$K_1 = P_0 + d_i E_i \tag{32}$$

$$K_4 = P_5 + d_f E_f \tag{33}$$

In Equation (27), the terms relating to i=0, 1, 4 and 5 among the terms within the summation $\Sigma$ are taken out of the summation $\Sigma$ and Equations (32) and (33) are substituted, whereupon the following equation is obtained:

$$r = \sum_{j=1}^{4} \left| \sum_{i=2}^{3} \{B_{i,5}(t_j)K_i\} + B_{1,5}(t_j)[P_0 + d_i E_i] + B_{4,5}(t_j)[P_5 + d_f E_f] + B_{0,5}(t_j)P_0 + B_{5,5}(t_j)P_5 - P_j \right|^2 \tag{34}$$

The following equation is obtained when $P_j = (x_j, y_j, z_j)$, $K_i = (a_i, b_i, c_i)$, $E_i = (E_{i,x}, E_{i,y}, E_{i,z})$ and $E_f = (E_{f,x}, E_{f,y}, E_{f,x})$ are substituted into Equation (34):

$$r = \sum_{j=1}^{4} \Bigg[ \bigg| \sum_{i=2}^{3} \{B_{i,5}(t_j)a_i\} + B_{1,5}(t_j)[x_0 + d_i E_{i,x}] + B_{4,5}(t_j)[x_5 + d_f E_{f,x}] + B_{0,5}(t_j)x_0 + B_{5,5}(t_j)x_5 - x_j \bigg|^2 + \bigg| \sum_{i=2}^{3} \{B_{i,5}(t_j)b_i\} + B_{1,5}(t_j)[y_0 + d_i E_{i,y}] + B_{4,5}(t_j)[y_5 + d_f E_{f,y}] + B_{0,5}(t_j)y_0 + B_{5,5}(t_j)y_5 - y_j \bigg|^2 + \bigg| \sum_{i=2}^{3} \{B_{i,5}(t_j)c_i\} + B_{1,5}(t_j)[z_0 + d_i E_{i,z}] + B_{4,5}(t_j)[z_5 + d_f E_{f,z}] + B_{0,5}(t_j)z_0 + B_{5,5}(t_j)z_5 - z_j \bigg|^2 \Bigg] \tag{35}$$

In Equation (35), the unknowns are $d_i$, $d_f$, $a_2$, $a_3$, $b_2$, $b_3$, $c_2$ and $c_3$.

The requirement that the error r be minimized is represented by letting 0 stand for each partial differential value obtained by partially differentiating the error r with respect to each unknown.

$$\frac{\partial r}{\partial d_i} = 0 \tag{36}$$

$$\frac{\partial r}{\partial d_f} = 0 \tag{37}$$

$$\frac{\partial r}{\partial a_2} = 0 \tag{38}$$

$$\frac{\partial r}{\partial a_3} = 0 \tag{39}$$

$$\frac{\partial r}{\partial b_2} = 0 \tag{40}$$

$$\frac{\partial r}{\partial b_3} = 0 \tag{41}$$

$$\frac{\partial r}{\partial c_2} = 0 \tag{42}$$

$$\frac{\partial r}{\partial c_3} = 0 \tag{43}$$

When the error r represented by Equation (35) is partially differentiated with respect to the unknown $d_i$, the following equation is obtained:

$$\frac{\partial r}{\partial d_i} = 2 \sum_{j=1}^{4} \Bigg[ B_{1,5}(t_j) \cdot \bigg\{ E_{i,x} \bigg( \sum_{i=2}^{3} \{B_{i,5}(t_j)a_i\} + B_{1,5}(t_j)[x_0 + d_i E_{i,x}] + B_{4,5}(t_j)[x_5 + d_f E_{f,x}] + B_{0,5}(t_j)x_0 + B_{5,5}(t_j)x_5 - x_j \bigg) + E_{i,y} \bigg( \sum_{i=2}^{3} \{B_{i,5}(t_j)b_i\} + B_{1,5}(t_j)[y_0 + d_i E_{i,y}] + B_{4,5}(t_j)[y_5 + d_f E_{f,y}] + B_{0,5}(t_j)y_0 + B_{5,5}(t_j)y_5 - y_j \bigg) + E_{i,z} \bigg( \sum_{i=2}^{3} \{B_{i,5}(t_j)c_i\} + B_{1,5}(t_j)[z_0 + d_i E_{i,z}] + B_{4,5}(t_j)[z_5 + d_f E_{f,z}] + B_{0,5}(t_j)z_0 + B_{5,5}(t_j)z_5 - z_j \bigg) \bigg\} \Bigg] \tag{44}$$

The following equation is obtained when Equation (44) is rearranged:

$$\frac{\partial r}{\partial d_i} = 2 \sum_{j=1}^{4} [B_{1,5}(t_j) \cdot \{E_{i,x}(E_{i,x}B_{1,5}(t_j)d_i + E_{f,x}B_{4,5}(t_j)d_f + B_{2,5}(t_j)a_2 + B_{3,5}(t_j)a_3 + [B_{0,5}(t_j) + B_{1,5}(t_j)]x_0 + [B_{4,5}(t_j) + B_{5,5}(t_j)]x_5 - x_j)\} + E_{i,y}(E_{i,y}B_{1,5}(t_j)d_i + B_{f,y}B_{4,5}(t_j)d_f + B_{2,5}(t_j)b_2 + B_{3,5}(t_j)b_3 + [B_{0,5}(t_j) + B_{1,5}(t_j)]y_0 + [B_{4,5}(t_j) + B_{5,5}(t_j)]y_5 - y_j)\} + E_{i,z}(E_{i,z}B_{1,5}(t_j)d_i + E_{f,z}B_{4,5}(t_j)d_f + B_{2,5}(t_j)c_2 + B_{3,5}(t_j)c_3 + [B_{0,5}(t_j) + B_{1,5}(t_j)]z_0 + [B_{4,5}(t_j) + B_{5,5}(t_j)]z_5 - z_j)\}] \tag{45}$$

When the error r represented by Equation (35) is partially differentiated with respect to the unknown $d_f$, the following equation is obtained:

$$\frac{\partial r}{\partial d_f} = 2 \sum_{j=1}^{4} \Bigg[ B_{4,5}(t_j) \cdot \bigg\{ E_{f,x} \bigg( \sum_{i=2}^{3} \{B_{i,5}(t_j)a_i\} + B_{1,5}(t_j)[x_0 + d_i E_{i,x}] + B_{4,5}(t_j)[x_5 + d_f E_{f,x}] + B_{0,5}(t_j)x_0 + B_{5,5}(t_j)x_5 - x_j \bigg) + E_{f,y} \bigg( \sum_{i=2}^{3} \{B_{i,5}(t_j)b_i\} + B_{1,5}(t_j)[y_0 + d_i E_{i,y}] + B_{4,5}(t_j)[y_5 + d_f E_{f,y}] + B_{0,5}(t_j)y_0 + B_{5,5}(t_j)y_5 - y_j \bigg) + E_{f,z} \bigg( \sum_{i=2}^{3} \{B_{i,5}(t_j)c_i\} + B_{1,5}(t_j)[z_0 + d_i E_{i,z}] + B_{4,5}(t_j)[z_5 + d_f E_{f,z}] + B_{0,5}(t_j)z_0 + B_{5,5}(t_j)z_5 - z_j \bigg) \bigg\} \Bigg] \tag{46}$$

The following equation is obtained when Equation (46) is rearranged:

$$\frac{\partial r}{\partial d_f} = 2 \sum_{j=1}^{4} [B_{1,5}(t_j) \cdot \tag{47}$$

-continued
$$\{E_{f,x}(E_{i,x}B_{1,s}(t_j)d_i + E_{f,x}B_{4,s}(t_j)d_f +$$
$$B_{2,s}(t_j)a_2 + B_{3,s}(t_j)a_3 +$$
$$[B_{0,s}(t_j) + B_{1,s}(t_j)]x_0 +$$
$$[B_{4,s}(t_j) + B_{5,s}(t_j)]x_5 - x_j)\} +$$
$$E_{f,y}(E_{i,y}B_{1,s}(t_j)d_i + B_{f,y}B_{4,s}(t_j)d_f +$$
$$B_{2,s}(t_j)b_2 + B_{3,s}(t_j)b_3 +$$
$$[B_{0,s}(t_j) + B_{1,s}(t_j)]y_0 +$$
$$[B_{4,s}(t_j) + B_{5,s}(t_j)]y_5 - y_j)\} +$$
$$(E_{i,z}B_{1,s}(t_j)d_i + E_{f,z}B_{4,s}(t_j)d_f +$$
$$B_{2,s}(t_j)c_2 + B_{3,s}(t_j)c_3 +$$
$$[B_{0,s}(t_j) + B_{1,s}(t_j)]z_0 +$$
$$[B_{4,s}(t_j) + B_{5,s}(t_j)z_5 - z_j)\}]$$

Since the unit tangent vectors $E_i$ and $E_f$ are unit vectors, the following equations are established:

$$|E_i|=(E_{i,x}^2+E_{i,y}^2+E_{i,z}^2)^{1/2}=1 \qquad (48)$$

$$|E_f|=(E_{f,x}^2+E_{f,y}^2+E_{f,z}^2)^{1/2}=1 \qquad (49)$$

If we let θ stand for the angle at the intersection between a straight line obtained by extending the unit tangent vector $E_i$ and a straight line obtained by extending the unit tangent vector $E_f$ in the opposite direction, as shown in FIG. 17b, the following equation is established:

$$\begin{aligned} E_i \cdot E_f &= E_{i,x}E_{f,x} + E_{i,y}E_{f,y} + E_{i,z}E_{f,z} \\ &= |E_i||E_f|\cos\theta \\ &= \cos\theta \end{aligned} \qquad (50)$$
$$\therefore \cos\theta = E_{i,x}E_{f,x} + E_{i,y}E_{f,y} + E_{i,z}E_{f,z}$$

Arranging Equations (42) and (43) using Equations (48), (49) and (50) gives us the following equations, respectively:

$$\frac{\partial r}{\partial d_i} = 2\sum_{j=1}^{4}[B_{1,s}(t_j)\cdot \qquad (51)$$
$$\{B_{1,s}(t_j)d_i + \cos\theta B_{4,s}(t_j)d_f +$$
$$E_{i,x}(B_{2,s}(t_j)a_2 + B_{3,s}(t_j)a_3 +$$
$$[B_{0,s}(t_j) + B_{1,s}(t_j)]x_0 +$$
$$[B_{4,s}(t_j) + B_{5,s}(t_j)]x_5 - x_j) +$$
$$E_{i,y}(B_{2,s}(t_j)b_2 + B_{3,s}(t_j)b_3 +$$
$$B_{0,s}(t_j) + B_{1,s}(t_j)]y_0 +$$
$$[B_{4,s}(t_j) + B_{5,s}(t_j)]y_5 - y_j) +$$
$$E_{i,z}(B_{2,s}(t_j)c_2 + B_{3,s}(t_j)c_3 +$$
$$[B_{0,s}(t_j) + B_{1,s}(t_j)]z_0 +$$
$$[B_{4,s}(t_j) + B_{5,s}(t_j)]z_5 - z_j)\}]$$

$$\frac{\partial r}{\partial d_f} = 2\sum_{j=1}^{4}[B_{4,s}(t_j)\cdot \qquad (52)$$
$$\{\cos\theta B_{1,s}(t_j)d_i + B_{4,s}(t_j)d_f +$$
$$E_{f,x}(B_{2,s}(t_j)a_2 + B_{3,s}(t_j)a_3 +$$
$$[B_{0,s}(t_j) + B_{1,s}(t_j)]x_0 +$$
$$[B_{4,s}(t_j) + B_{5,s}(t_j)]x_5 - x_j) +$$
$$E_{f,y}(B_{2,s}(t_j)b_2 + B_{3,s}(t_j)b_3 +$$
$$B_{0,s}(t_j) + B_{1,s}(t_j)]y_0 +$$
$$[B_{4,s}(t_j) + B_{5,s}(t_j)]y_5 - y_j) +$$
$$E_{f,z}(B_{2,s}(t_j)c_2 + B_{3,s}(t_j)c_3 +$$
$$[B_{0,s}(t_j) + B_{1,s}(t_j)]z_0 +$$
$$[B_{4,s}(t_j) + B_{5,s}(t_j)]z_5 - z_j)\}]$$

When the error r represented by Equation (35) is partially differentiated with respect to the unknowns $a_2$, $a_3$, $b_2$, $b_3$, $c_2$ and $c_3$, the following equations are obtained, respectively:

$$\frac{\partial r}{\partial a_2} = 2\sum_{j=1}^{4}\Bigg[B_{2,s}(t_j) \cdot \qquad (53)$$
$$\Bigg\{\sum_{i=2}^{3}\{B_{i,s}(t_j)a_i\} +$$
$$B_{1,s}(t_j)[x_0 + d_iE_{i,x}] +$$
$$B_{4,s}(t_j)[x_5 + d_fE_{f,x}] +$$
$$B_{0,s}(t_j)x_0 + B_{5,s}(t_j)x_5 - x_j\Bigg\}\Bigg]$$
$$= 2\sum_{j=1}^{4}[[B_{2,s}(t_j)\cdot$$

-continued
$$\{E_{i,x}B_{1,s}(t_j)d_i + E_{f,x}B_{4,s}(t_j)d_f +$$
$$B_{2,s}(t_j)a_2 + B_{3,s}(t_j)a_3 +$$
$$[B_{0,s}(t_j)]x_0 +$$
$$[B_{4,s}(t_j) + B_{5,s}(t_j)]x_5 - x_j\}]$$

$$\frac{\partial r}{\partial a_3} = 2\sum_{j=1}^{4}\Bigg[B_{3,s}(t_j) \cdot \qquad (54)$$
$$\Bigg\{\sum_{i=2}^{3}\{B_{i,s}(t_j)a_i\} +$$
$$B_{1,s}(t_j)[x_0 + d_iE_{i,x}] +$$
$$B_{4,s}(t_j)[x_5 + d_fE_{f,x}] +$$
$$B_{0,s}(t_j)x_0 + B_{5,s}(t_j)x_5 - x_j\Bigg\}\Bigg]$$
$$= 2\sum_{j=1}^{4}[[B_{3,s}(t_j)\cdot$$
$$\{E_{i,x}B_{1,s}(t_j)d_i + E_{f,x}B_{4,s}(t_j)d_f +$$
$$B_{2,s}(t_j)a_2 + B_{3,s}(t_j)a_3 +$$
$$[B_{0,s}B_{1,s}(t_j)]x_0 +$$
$$[B_{4,s}(t_j) + B_{5,s}(t_j)]x_5 - x_j\}]$$

$$\frac{\partial r}{\partial b_2} = 2\sum_{j=1}^{4}\Bigg[B_{2,s}(t_j) \cdot \qquad (55)$$
$$\Bigg\{\sum_{i=2}^{3}\{B_{i,s}(t_j)b_i\} +$$
$$B_{1,s}(t_j)[y_0 + d_iE_{i,y}] +$$
$$B_{4,s}(t_j)[y_5 + d_fE_{f,y}] +$$
$$B_{0,s}(t_j)y_0 + B_{5,s}(t_j)y_5 - y_j\Bigg\}\Bigg]$$
$$= 2\sum_{j=1}^{4}[[B_{2,s}(t_j)\cdot$$
$$\{E_{i,y}B_{1,s}(t_j)d_i + E_{f,y}B_{4,s}(t_j)d_f +$$
$$B_{2,s}(t_j)b_2 + B_{3,s}(t_j)b_3 +$$
$$[B_{0,s}t_j]y_0 +$$
$$[B_{4,s}(t_j) + B_{5,s}(t_j)]y_5 - y_j\}]$$

$$\frac{\partial r}{\partial b_3} = 2\sum_{j=1}^{4}\Bigg[B_{3,s}(t_j) \cdot \qquad (56)$$
$$\Bigg\{\sum_{i=2}^{3}\{B_{i,s}(t_j)b_i\} +$$
$$B_{1,s}(t_j)[y_0 + d_iE_{i,y}] +$$
$$B_{4,s}(t_j)[y_5 + d_fE_{f,y}] +$$
$$B_{0,s}(t_j)y_0 + B_{5,s}(t_j)y_5 - y_j\Bigg\}\Bigg]$$
$$= 2\sum_{j=1}^{4}[[B_{3,s}(t_j)\cdot$$
$$\{E_{i,y}B_{1,s}(t_j)d_i + E_{f,y}B_{4,s}(t_j)d_f +$$
$$B_{2,s}(t_j)b_2 + B_{3,s}(t_j)b_3 +$$
$$[B_{0,s}t_j]y_0 +$$
$$[B_{4,s}(t_j) + B_{5,s}(t_j)]y_5 - y_j\}]$$

$$\frac{\partial r}{\partial c_2} = 2\sum_{j=1}^{4}\Bigg[B_{2,s}(t_j) \cdot \qquad (57)$$
$$\Bigg\{\sum_{i=2}^{3}\{B_{i,s}(t_j)c_i\} +$$
$$B_{1,s}(t_j)[z_0 + d_iE_{i,z}] +$$
$$B_{4,s}(t_j)[z_5 + d_fE_{f,z}] +$$
$$B_{0,s}(t_j)z_0 + B_{5,s}(t_j)z_5 - z_j\Bigg\}\Bigg]$$
$$= 2\sum_{j=1}^{4}[[B_{2,s}(t_j)\cdot$$
$$\{E_{i,z}B_{1,s}(t_j)d_i + E_{f,z}B_{4,s}(t_j)d_f +$$
$$B_{2,s}(t_j)c_2 + B_{3,s}(t_j)c_3 +$$
$$[B_{0,s}t_j]z_0 +$$
$$[B_{4,s}(t_j) + B_{5,s}(t_j)]z_5 - z_j\}]$$

$$\frac{\partial r}{\partial c_3} = 2\sum_{j=1}^{4}\Bigg[B_{3,s}(t_j) \cdot \qquad (58)$$
$$\Bigg\{\sum_{i=2}^{3}\{B_{i,s}(t_j)c_i\} +$$
$$B_{1,s}(t_j)[z_0 + d_iE_{i,z}] +$$
$$B_{4,s}(t_j)[z_5 + d_fE_{f,z}] +$$
$$B_{0,s}(t_j)z_0 + B_{5,s}(t_j)z_5 - z_j\Bigg\}\Bigg]$$

-continued $$= 2 \sum_{j=1}^{4} [[B_{3,5}(t_j) \cdot \{E_{i,z}B_{1,5}(t_j)d_i + E_{f,z}B_{4,5}(t_j)d_f + B_{2,5}(t_j)c_2 + B_{3,5}(t_j)c_3 + [B_{0,5}(t_j)]z_0 + [B_{4,5}(t_j) + B_{5,5}(t_j)]z_5 - z_j\}]$$

If the constant terms in Equations (51)–(58) are replaced as shown in Equations (59)–(61) and these are rearranged using Equations (36)–(43), the Equations (62)–(69) are obtained:

$$h_{j,x} = [B_{0,5}(t_j) + B_{1,5}(t_j)]x_0 + [B_{4,5}(t_j) + B_{5,5}(t_j)]x_5 - x_j \quad (59)$$

$$h_{j,y} = [B_{0,5}(t_j) + B_{1,5}(t_j)]y_0 + [B_{4,5}(t_j) + B_{5,5}(t_j)]y_5 - y_j \quad (60)$$

$$h_{j,z} = [B_{0,5}(t_j) + B_{1,5}(t_j)]z_0 + [B_{4,5}(t_j) + B_{5,5}(t_j)]z_5 - z_j \quad (61)$$

$$\sum_{j=1}^{4} [B_{1,5}(t_j) \{B_{1,5}(t_j)d_i + \cos\theta B_{4,5}(t_j)d_f + E_{i,x}(B_{2,5}(t_j)a_2 + B_{3,5}(t_j)a_3 + h_{j,x}) + E_{i,y}(B_{2,5}(t_j)b_2 + B_{3,5}(t_j)b_3 + h_{j,y}) + E_{i,z}(B_{2,5}(t_j)c_2 + B_{3,5}(t_j)c_3 + h_{j,z})\}] = 0 \quad (62)$$

$$\sum_{j=1}^{4} [B_{4,5}(t_j) \{\cos\theta B_{1,5}(t_j)d_i + B_{4,5}(t_j)d_f + E_{f,x}(B_{2,5}(t_j)a_2 + B_{3,5}(t_j)a_3 + h_{j,x}) + E_{f,y}(B_{2,5}(t_j)b_2 + B_{3,5}(t_j)b_3 + h_{j,y}) + E_{f,z}(B_{2,5}(t_j)c_2 + B_{3,5}(t_j)c_3 + h_{j,z})\}] = 0 \quad (63)$$

$$\sum_{j=1}^{4} [B_{2,5}(t_j) \{E_{i,x}B_{1,5}(t_j)d_i + E_{f,x}B_{4,5}(t_j)d_f + B_{2,5}(t_j)a_2 + B_{3,5}(t_j)a_3 + h_{j,x}\}] = 0 \quad (64)$$

$$\sum_{j=1}^{4} [B_{3,5}(t_j) \{E_{i,x}B_{1,5}(t_j)d_i + E_{f,x}B_{4,5}(t_j)d_f + B_{2,5}(t_j)a_2 + B_{3,5}(t_j)a_3 + h_{j,x}\}] = 0 \quad (65)$$

$$\sum_{j=1}^{4} [B_{2,5}(t_j) \{E_{i,y}B_{1,5}(t_j)d_i + E_{f,y}B_{4,5}(t_j)d_f + B_{2,5}(t_j)b_2 + B_{3,5}(t_j)b_3 + h_{j,y}\}] = 0 \quad (66)$$

$$\sum_{j=1}^{4} [B_{3,5}(t_j) \{E_{i,y}B_{1,5}(t_j)d_i + E_{f,y}B_{4,5}(t_j)d_f + B_{2,5}(t_j)b_2 + B_{3,5}(t_j)b_3 + h_{j,y}\}] = 0 \quad (67)$$

$$\sum_{j=1}^{4} [B_{2,5}(t_j) \{E_{i,z}B_{1,5}(t_j)d_i + E_{f,z}B_{4,5}(t_j)d_f + B_{2,5}(t_j)c_2 + B_{3,5}(t_j)c_3 + h_{j,z}\}] = 0 \quad (68)$$

$$\sum_{j=1}^{4} [B_{3,5}(t_j) \{E_{i,z}B_{1,5}(t_j)d_i + E_{f,z}B_{4,5}(t_j)d_f + B_{2,5}(t_j)c_2 + B_{3,5}(t_j)c_3 + h_{j,z}\}] = 0 \quad (69)$$

The unknowns $d_i$, $d_f$, $a_2$, $a_3$, $b_2$, $b_3$, $c_2$ and $c_3$ are expressed by a vector in the following manner:

$$X = \begin{bmatrix} d_i \\ d_f \\ a_2 \\ a_3 \\ b_2 \\ b_3 \\ c_2 \\ c_3 \end{bmatrix} \quad (70)$$

Further, when Equations (62)–(69) are consolidated and expressed by a vector equation, we can write the following equation in which A and B are matrices of constants:

$$AX = B \quad (71)$$

The matrix A of constants is expressed as follows:

$$A = \{A(i,k)\} \quad (72)$$

$$= \sum_{j=1}^{4} \{C_j(i)A_0(i,k)C_j(k)\}$$

$$A_0 = \{A_0(i,k)\} \quad (73)$$

$$= \begin{bmatrix} 1 & \cos\theta & E_{i,x} & E_{i,x} & E_{i,y} & E_{i,y} & E_{i,z} & E_{i,z} \\ \cos\theta & 1 & E_{f,x} & E_{f,x} & E_{f,y} & E_{f,y} & E_{f,z} & E_{f,z} \\ E_{i,x} & E_{f,x} & 1 & 1 & 0 & 0 & 0 & 0 \\ E_{i,x} & E_{f,x} & 1 & 1 & 0 & 0 & 0 & 0 \\ E_{i,y} & E_{f,y} & 0 & 0 & 1 & 1 & 0 & 0 \\ E_{i,y} & E_{f,y} & 0 & 0 & 1 & 1 & 0 & 0 \\ E_{i,z} & E_{f,z} & 0 & 0 & 0 & 0 & 1 & 1 \\ E_{i,z} & E_{f,z} & 0 & 0 & 0 & 0 & 1 & 1 \end{bmatrix}$$

$$C_j = \{C_j(k)\} \quad (74)$$
$$= [B_{1,5}(t_j) B_{4,5}(t_j) B_{2,5}(t_j) B_{3,5}(t_j) B_{2,5}(t_j) B_{3,5}(t_j) B_{2,5}(t_j) B_{3,5}(t_j)]$$

Here $A(i,k)$ represents a element of i-th row and k-th column of a matrix A, and $A_0(i,k)$ represents a element of i-th row and k-th column of a matrix $A_0$. Further, $C_j(i)$ represents the elements of an i-th column of a matrix $C_j$, and $C_j(k)$ represents the elements of the k-th column of a matrix $C_j$.

Further, the matrix B of constants is expressed as follows:

$$B = \{B(i)\} \quad (75)$$

$$= \sum_{j=1}^{4} \{B_j C_j\}$$

$$B_j = - \begin{bmatrix} -E_{i,x}h_{j,x} + E_{i,y}h_{j,y} + E_{i,z}h_{j,z} \\ E_{f,x}h_{j,x} + E_{f,y}h_{j,y} + E_{f,z}h_{j,z} \\ h_{j,x} \\ h_{j,x} \\ h_{j,y} \\ h_{j,y} \\ h_{j,z} \\ h_{j,z} \end{bmatrix} \quad (76)$$

Since the matrices A and B of constants are already known, the unknown vector X is calculated by applying Gauss's elimination method to the Equations represented by the Equations (71)–(76). More specifically, the distance $d_i$ between the control points $K_0$ and $K_1$, the distance $d_f$ between the control points $K_3$ and $K_4$, and the control points $K_2 = (a_2, b_2, c_2)$ and $K_3 = (a_3, b_3, c_3)$ are calculated.

A specific process (software) for executing Gauss's elimination method using a computer (a digital computer) is known generally. For example, such a method is described in "Fundamentals: C Language Edition", *Handbook of Scientific and Technical Calculation by UNIX Work Stations*, pp. 148–151, Science Company.

The control points $K_1$ and $K_4$ are calculated in accordance with Equations (32) and (33), respectively, using the calculated distances $d_i$ and $d_f$.

Figure 19:
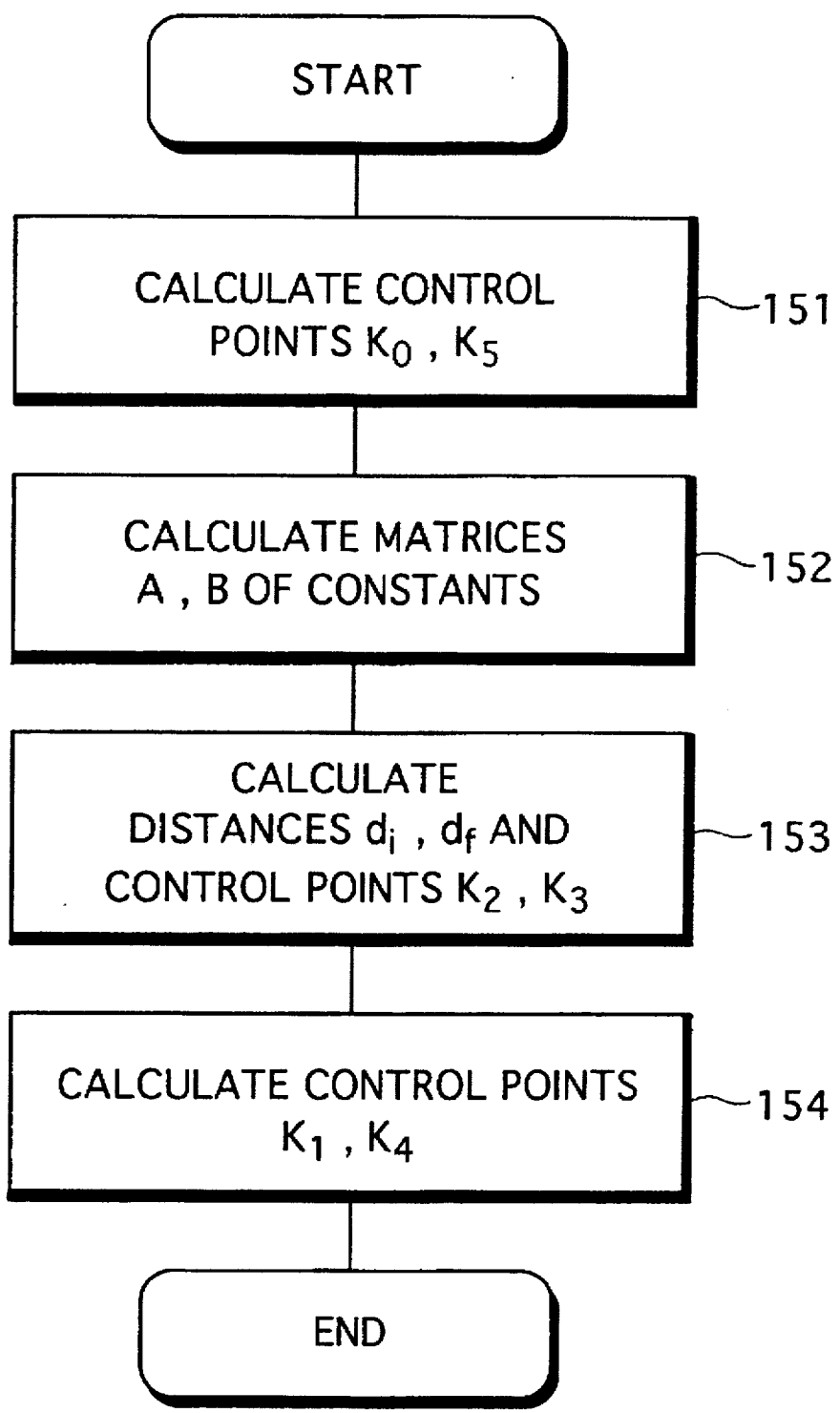
FIG. 19 is a flowchart showing a processing procedure for calculating six control points defining a fifth Bézier curve.

FIG. 19 illustrates a procedure for calculating the controls points that define a fifth Bézier curve.

This calculation procedure will be described as processing in which the calculation of the control-point data of the fifth Bézier curve is executed by computer. All or part of this calculation processing can also be implemented by special-purpose arithmetic circuitry (hardware).

The coordinate data of the initial point $P_0$ and final point $P_5$ is read out of memory and the control points $K_0$ and $K_5$ are calculated by Equations (30) and (31) (step 151).

The parameter $t_j$ (j=0~5), the point $P_j$ (j=0~5) and the unit tangent vector $E_i$ and $E_f$ are read out of memory, the matrix of constants A is calculated in accordance with Equations (72)~(74) and the matrix B of constants is calculated in accordance with Equations (75) and (76) (step 152).

The unknown vector X (the distances $d_i$ and $d_f$ and the control points $K_2$ and $K_3$) are calculated by executing Gauss's elimination method using the calculated matrices A and B of constants (step 153).

On the basis of the calculated distances $d_i$ and $d_f$, the control points $K_1$ and $K_4$ are calculated using Equations (32) and (33), respectively, (step 154).

The six control points $K_i$ (i=0~5) defining the fifth Bézier curve are calculated in the manner described above.

Figure 21A:
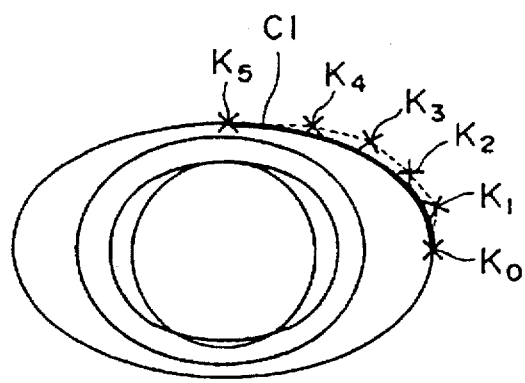
FIGS. 21a and 21b show control points of a Bézier curve obtained by changing the degree of a cubic Bézier curve which does not degenerate.
Figure 21B:
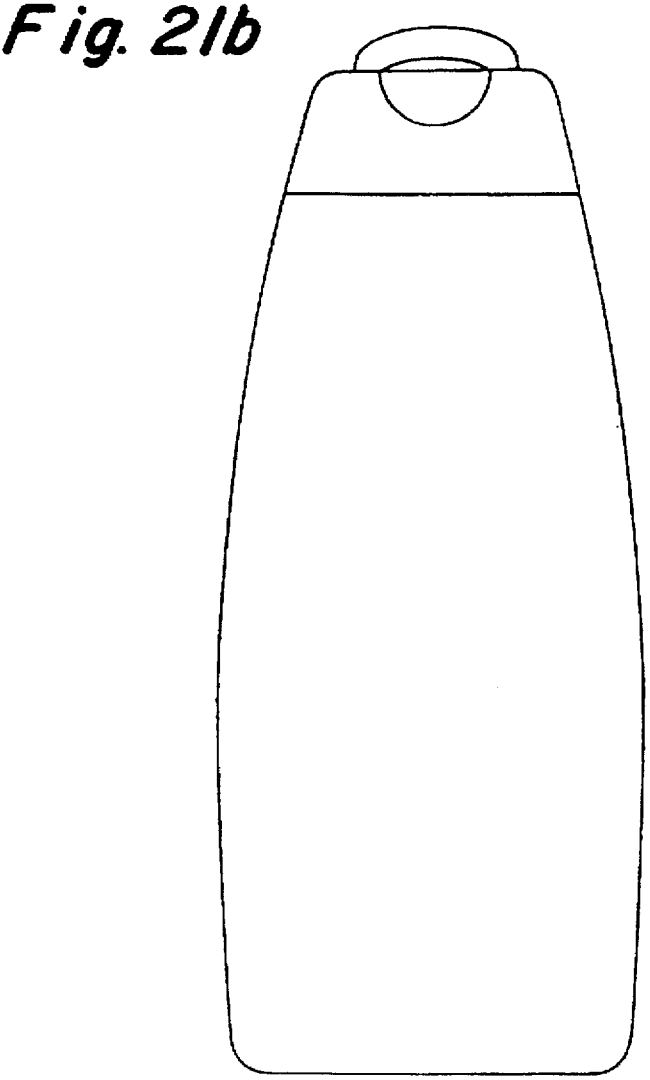

For example, when a change of degree is performed with regard to element C1 in the CAD data file shown in FIG. 13, the coordinate data of the control points shown in FIG. 20 is obtained. The control points $K_0$~$K_5$ obtained by the change of degree with regard to element C1 are as shown in FIGS. 21a and 21b.

4.3 Change of degree from cubic Bézier curve to fifth Bézier curve (with degeneration; part 1)

4.3.1 Approximate calculation of unit tangent vectors at initial and final points When control points have degenerated at the initial point of a cubic Bézier curve, $Q_1=Q_0$ holds. As a result, we have $P(0)/dt=0$ and the unit tangent vector $E_i$ at the initial point cannot be calculated. Similarly, when control points have degenerated at the final point of a cubic Bézier curve, $Q_2=Q_3$ holds. As a result, we have $P(1)/dt=0$ and the unit tangent vector $E_f$ at the final point cannot be calculated.

Since the unit tangent vectors $E_i$ and $E_f$ at the starting and final points are not obtained when degeneration has occurred, the control points of the fifth Bézier curve cannot be calculated, i.e., a change of degree from the cubic Bézier curve to the fifth Bézier curve cannot be performed, in accordance with the method of the above-described section "4.2.4 Calculation of control points of fifth Bézier curve".

When control points have degenerated at the initial point or final point of a cubic Bézier curve, the unit tangent vectors are calculated by approximation in the following manner:

When control points have degenerated at the initial point $P_0$ of a cubic Bézier curve, $Q_1=Q_0$ holds and therefore the following equation is obtained by making the substitution $Q_1=Q_0$ in Equation (8):

$$\frac{P(t)}{dt} = 3(2Q_0 - 3Q_2 + Q_3)t^2 + 6(-Q_0 + Q_2)t \quad (77)$$

When t→0 is assumed to hold in Equation (8), the first term (the $t^2$ term) is negligible in comparison with the second term (the t term) and therefore the coefficient $6(-Q_0+Q_2)$ of the second term can be considered representing a tangent vector. Accordingly, the unit tangent vector $E_i$ at the initial point can be calculated by approximation in accordance with the following equation using the coordinate data of the control points $Q_0$ and $Q_2$:

$$E_i = \frac{(Q_{2,x} - Q_{0,x}, Q_{2,y} - Q_{0,y}, Q_{2,z} - Q_{0,z})}{\{(Q_{2,x} - Q_{0,x})^2 + (Q_{2,y} - Q_{0,y})^2 + (Q_{2,z} - Q_{0,z})^2\}^{1/2}} \quad (78)$$

When control points have degenerated at the final point of a cubic Bézier curve, the unit tangent vector $E_f$ at the final point is calculated by approximation in accordance with the following equation using the coordinate data of the control points $Q_1$ and $Q_3$ in the same manner as in the case of the initial point:

$$E_f = \frac{(Q_{3,x} - Q_{1,x}, Q_{3,y} - Q_{1,y}, Q_{3,z} - Q_{1,z})}{\{(Q_{3,x} - Q_{1,x})^2 + (Q_{3,y} - Q_{1,y})^2 + (Q_{3,z} - Q_{1,z})^2\}^{1/2}} \quad (79)$$

Thus, the unit tangent vector $E_i$ at the initial point of the cubic Bézier curve and the unit tangent vector $E_f$ at the final point are calculated by approximation.

Figure 22:
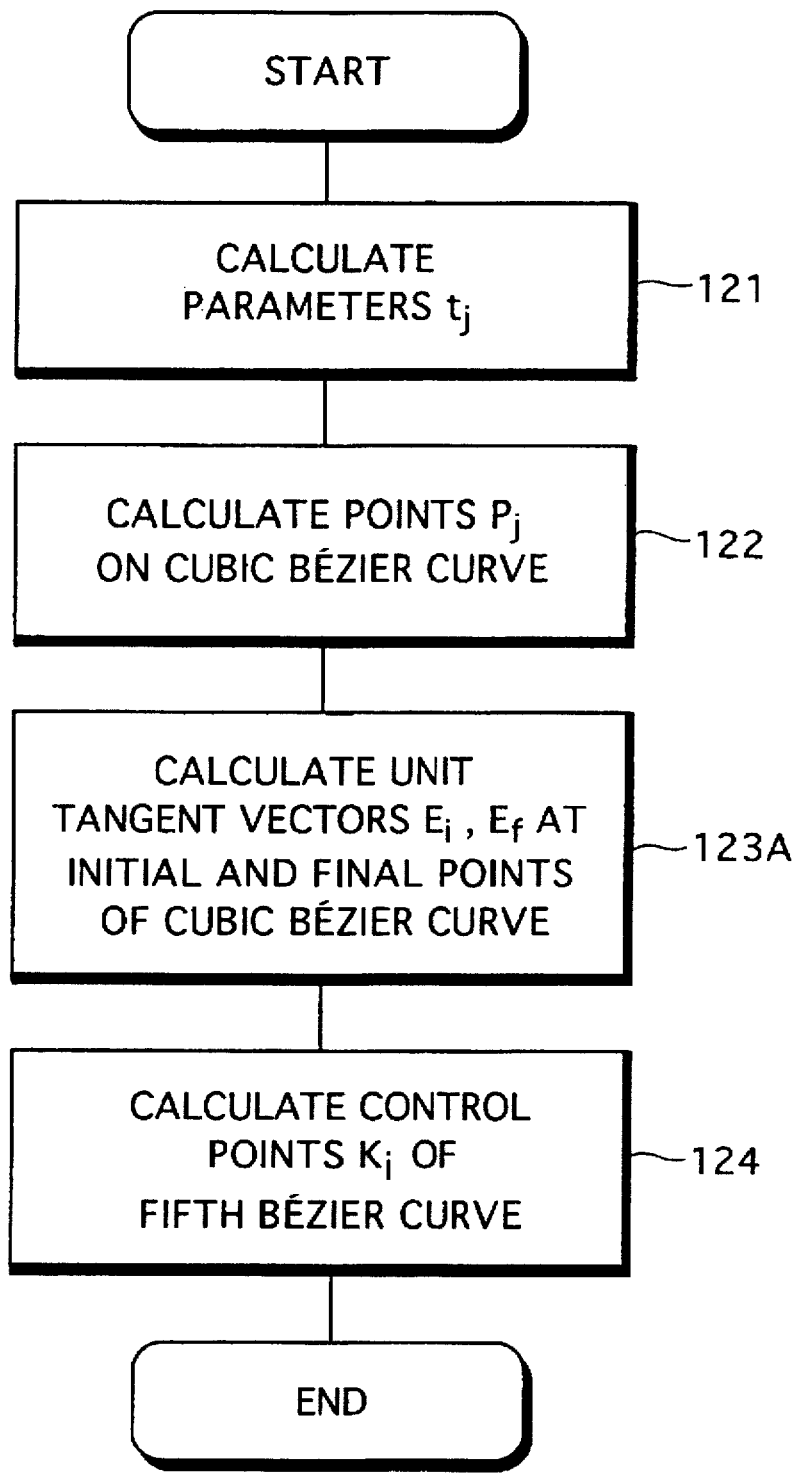
FIG. 22 is a flowchart showing the procedure of processing for change of degree from a cubic Bézier curve to a fifth Bézier curve in a case where control points have degenerated at the initial point or final point of a cubic Bézier curve.

FIG. 22 illustrates the procedure of processing for change of degree from a cubic Bézier curve to a fifth Bézier curve when control points have degenerated. Processing steps in FIG. 22 that are identical with those shown in FIG. 16 are designated by like step numbers and are not described again. The only difference from FIG. 16 is the processing of step 123A, at which the unit tangent vectors at the initial and final points of the cubic Bézier curve are calculated by approximation.

Figure 23:
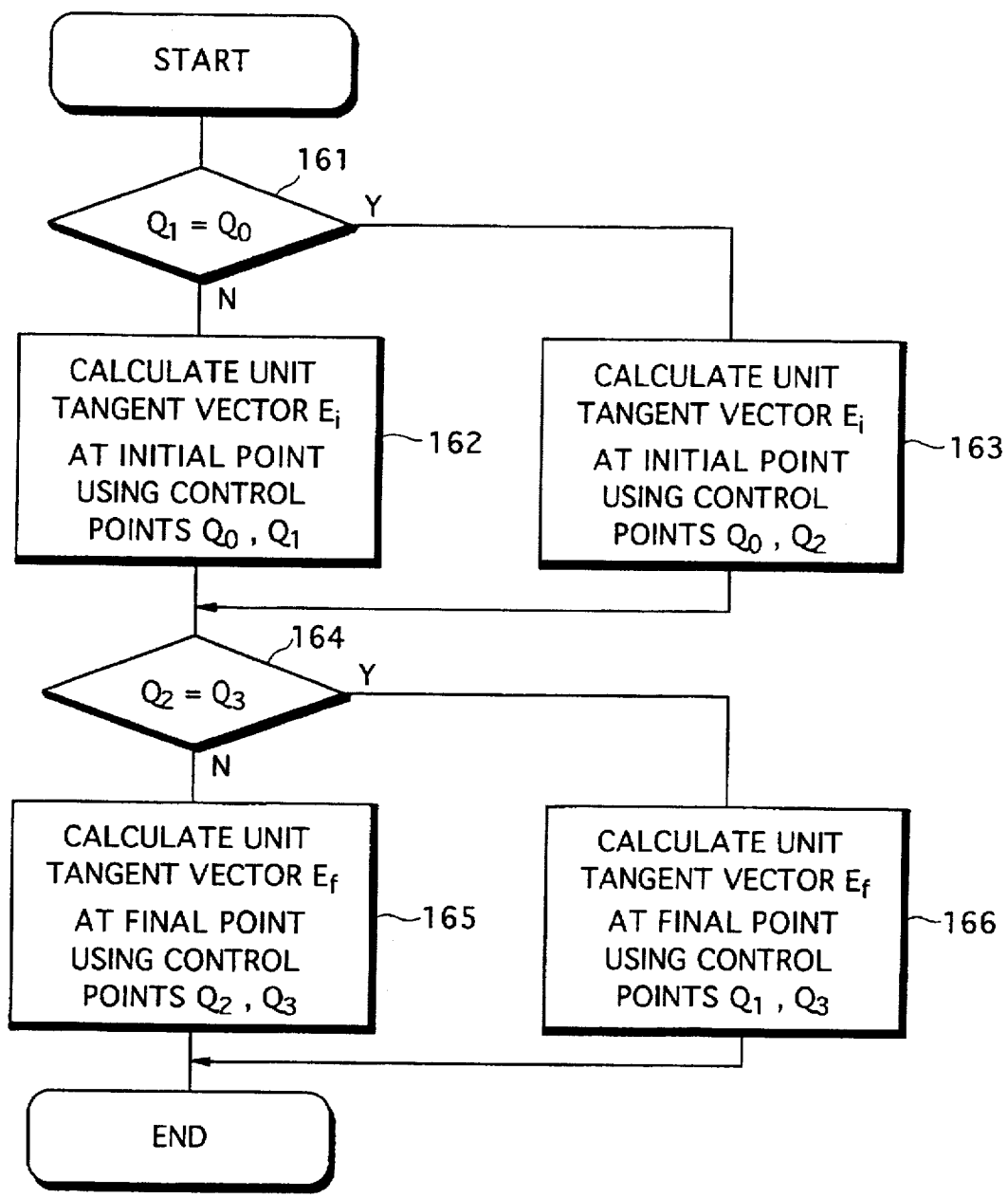
FIG. 23 is a flowchart showing the procedure of processing for calculating unit tangent vectors at an initial point and final point in a case where control points have degenerated at the initial point or final point of a cubic Bézier curve.

FIG. 23 illustrates the procedure of processing for calculating the unit tangent vectors at step 123A.

It is determined whether the control points $Q_0$ and $Q_1$ coincide, namely whether the control points have degenerated at the initial point (step 161).

When $Q_0 \neq Q_1$ holds (NO at step 161), the initial point has not degenerated and therefore the unit tangent vector $E_i$ is calculated in accordance with Equation (22) using the coordinate data of the control points $Q_0$ and $Q_1$ (step 162).

When $Q_0=Q_1$ holds (YES at step 161), the initial point has degenerated and therefore the unit tangent vector $E_i$ is calculated by approximation in accordance with Equation (78) using the coordinate data of the control points $Q_0$ and $Q_2$ (step 163).

It is determined whether the control points $Q_2$ and $Q_3$ coincide, namely whether the control point has degenerated at the final point (step 164).

When $Q_2 \neq Q_3$ holds (NO at step 164), the final point has not degenerated and therefore the unit tangent vector $E_f$ is calculated in accordance with Equation (23) using the coordinate data of the control points $Q_2$ and $Q_3$ (step 165).

When $Q_2=Q_3$ holds (YES at step 164), the final point has degenerated and therefore the unit tangent vector $E_f$ is calculated by approximation in accordance with Equation (79) using the coordinate data of the control points $Q_1$ and $Q_3$ (step 166).

Thus, the unit tangent vector $E_i$ at the initial point of the cubic Bézier curve and the unit tangent vector $E_f$ at the final point are calculated.

By using the unit tangent vectors $E_i$ and $E_f$ thus calculated, a change of degree from a cubic Bézier curve to a fifth Bézier curve can be performed even if control points degenerate.

Figure 25A:
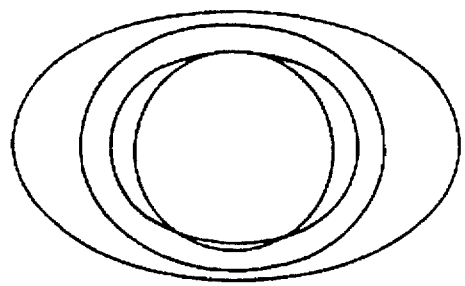
FIGS. 25a and 25b show control points of a fifth Bézier curve obtained by changing the degree of a cubic Bézier curve which exhibits degeneration.
Figure 25B:
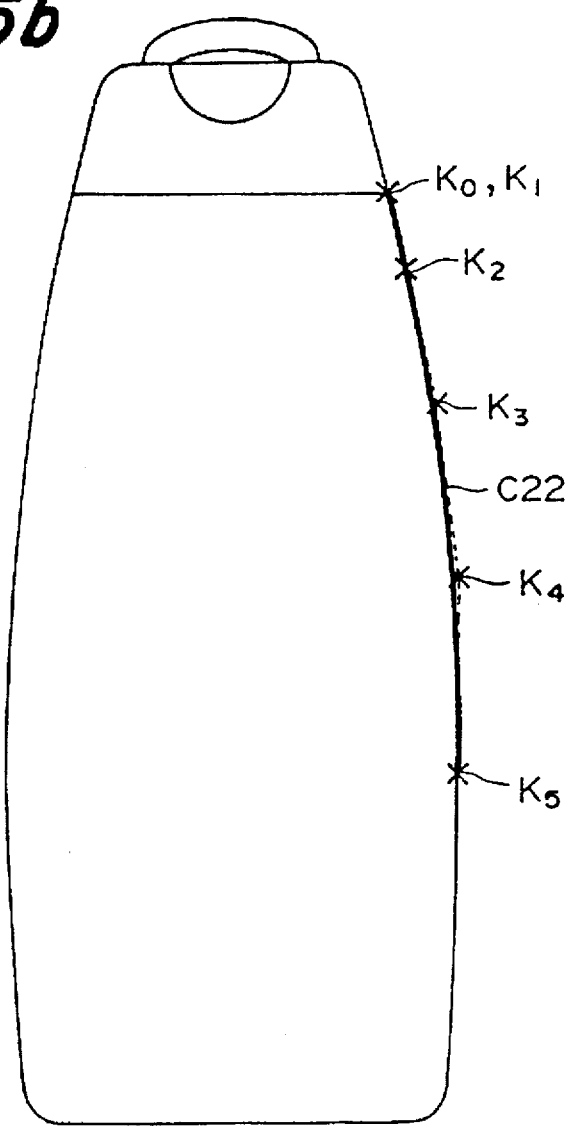

For example, when a change of degree is performed with regard to the element C22 at which the initial point has degenerated in the CAD data file shown in FIG. 20, the coordinate data illustrated in FIG. 24 is obtained. The control points $K_0$~$K_5$ obtained by this change of degree with regard to element C22 are as shown in FIGS. 25a and 25b. As will be understood from FIGS. 25a, 25b and 24, the initial points $K_0$, $K_1$ remain degenerated, in the same manner as the cubic Bézier curve before the change of degree, on the fifth Bézier curve of element C22.

4.4 Change of degree from cubic Bézier curve to fifth Bézier curve (with degeneration; part 2)

In a case where control points have degenerated at the initial point or final point of a cubic Bézier curve, a change of degree from the cubic Bézier curve to the fifth Bézier curve can be performed by calculating, through approximation, the unit tangent vector at the degenerated point, as described above in the section "4.3. Change of degree from cubic Bézier curve to fifth Bézier curve (with degeneration; part 1)".

However, when control points have degenerated at the initial point of the cubic Bézier curve ($Q_0=Q_1$), the control points $K_1$ and $K_0$ among the control points $K_i$ (i=0~5) of the fifth Bézier curve obtained take on identical or nearly identical values and degeneration is not eliminated even after the conversion. The same is true when control points have degenerated at the final point of a cubic Bézier curve ($Q_2=Q_3$).

Figure 26:
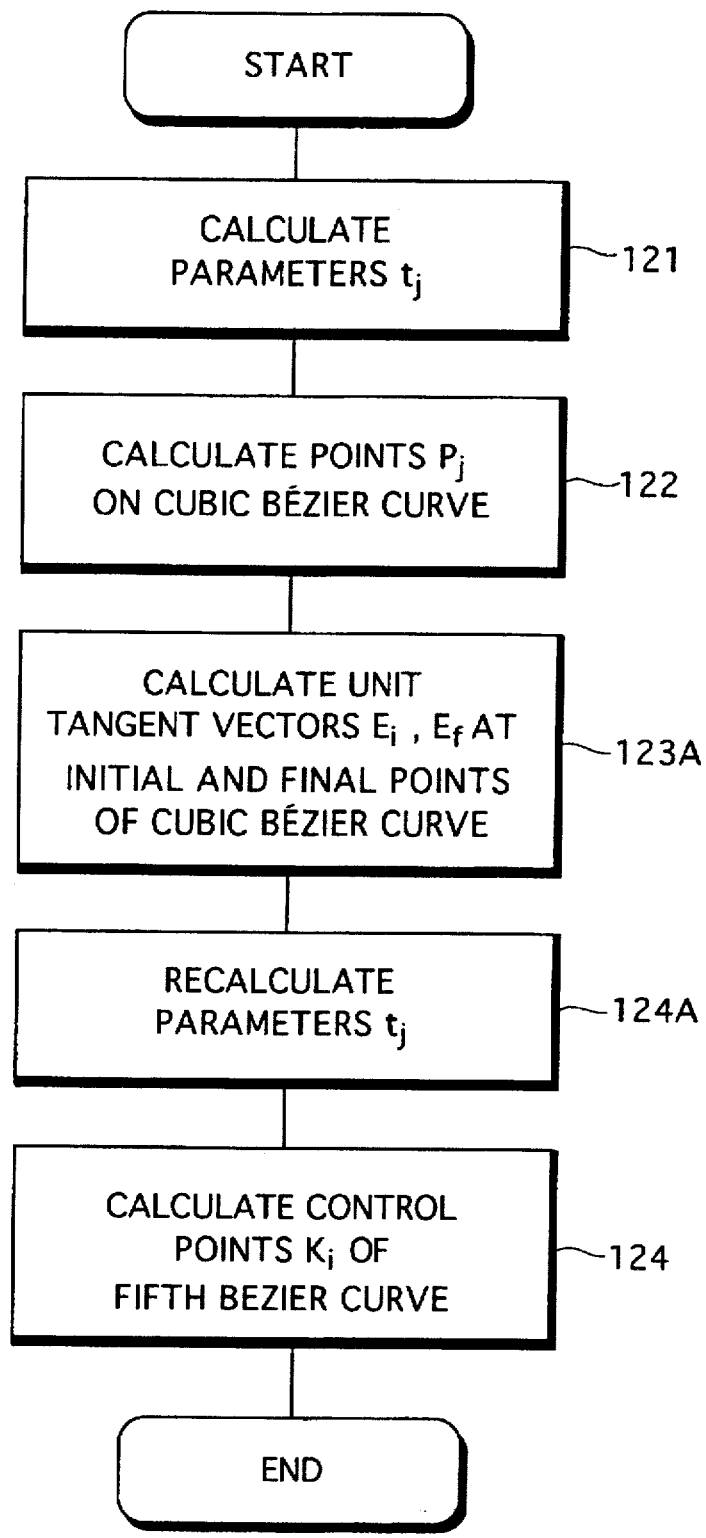
FIG. 26 is a flowchart showing the procedure of processing for change of degree from a cubic Bézier curve to a fifth Bézier curve in a case where control points have degenerated at the initial point or final point of a cubic Bézier curve.

FIG. 26 shows the procedure of processing for a change of degree in which the degeneration of control points can be eliminated. Processing steps in FIG. 26 that are identical with those shown in FIG. 22 are designated by like step numbers and are not described again. The processing of a step 124A has been added to the flowchart of FIG. 26. According to this processing, the parameters $t_j$ (j=0~5) set at equal intervals on the axis of parameter t at step 121 are recalculated to eliminate the degeneration of control points.

4.4.1 Recalculation of parameters

The parameters $t_j$ are recalculated by normalizing the lengths from the initial point $P_0$ of the cubic Bézier curve to points $P_j$ on the curve using the total length from the initial point $P_0$ to the final point $P_5$.

By recalculating the parameters $t_j$, the control points $K_j$ (j=0~5) can be dispersed substantially equally between the initial and final points of the fifth Bézier curve. As a result, degeneration of control points $K_j$ after the change of degree can be eliminated.

Figure 27:
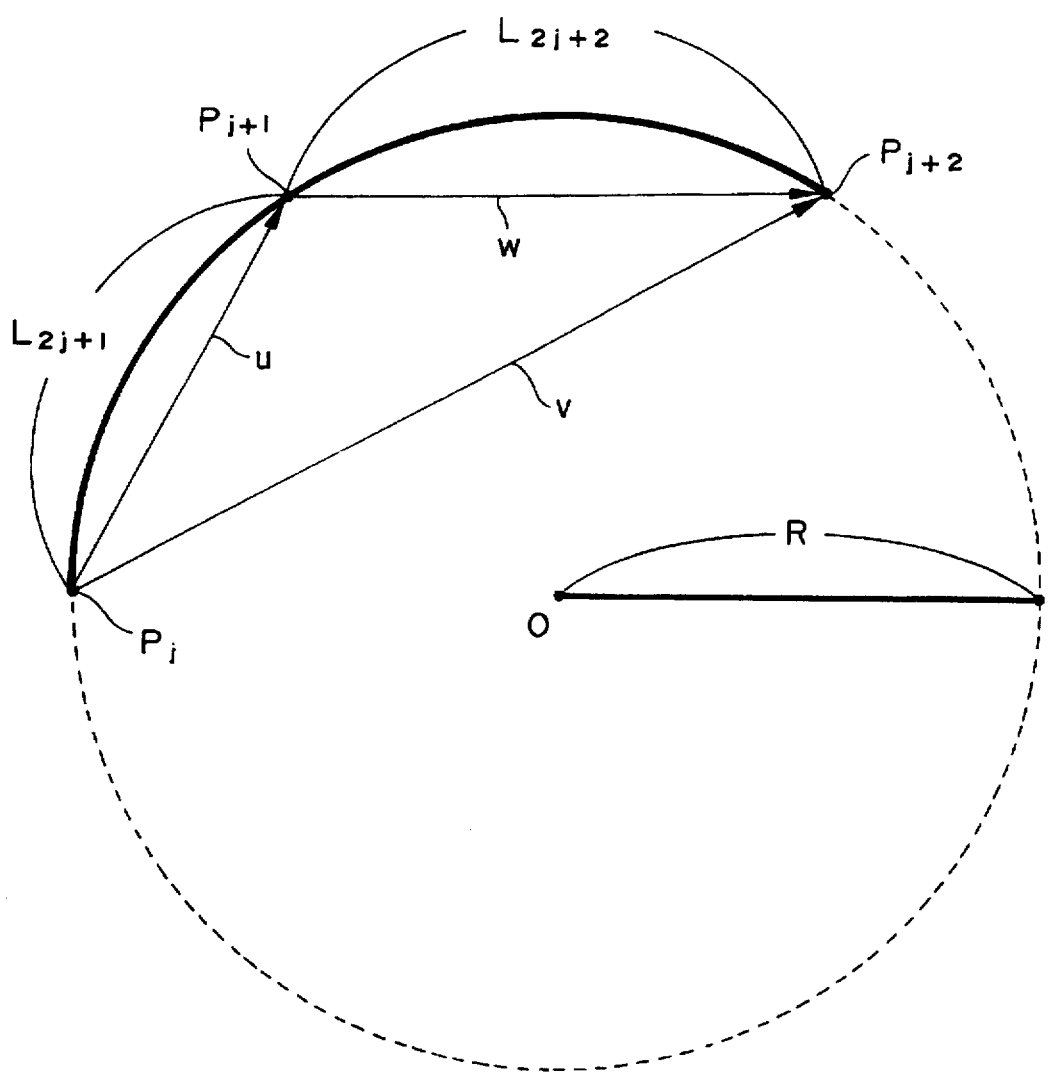
FIG. 27 is a diagram for describing re-calculation of parameters giving points on a fifth Bézier curve.

The approximation of a cubic Bézier curve as a circle passing through the three points $P_j$, $P_{j+1}$, $P_{j+2}$ (j=0~3) is as shown in FIG. 27.

When the vectors representing the line segments $P_jP_{j+1}$, $P_{j+1}P_{j+2}$ and $P_jP_{j+2}$ are replaced by u, v and w, respectively, these vectors are expressed by the following equations:

$$u=(x_{j+1}-x_j, y_{j+1}-y_j, z_{j+1}-z_j) \quad (80)$$

$$v=(x_{j+2}-x_j, y_{j+2}-y_j, z_{j+2}-z_j) \quad (81)$$

$$w=(x_{j+2}-x_{j+1}, y_{j+2}-y_{j+1}, z_{j+2}-z_{j+1}) \quad (82)$$

The radius R of the circle passing through the three points $P_j$, $P_{j+1}$, $P_{j+2}$ is represented by the following equation using the vectors u, v and w:

$$R = \frac{|u||v||w|}{2|u \times v|} \quad (83)$$

Here, "×" represents an outer product of vectors, and "| |" represents a size (length) of a vector.

The arc length $L_{2j+1}$ of the arc $P_jP_{j+1}$ and the arc length $L_{2j+2}$ of the arc $P_{j+1}P_{j+2}$ are given by the following equations:

$$L_{2j+1}=2R \cdot \arcsin(|u|/2R) \quad (84)$$

$$L_{2j+2}=2R \cdot \arcsin(|w|/2R) \quad (85)$$

Arc lengths $L_1$~$L_8$ are calculated while incrementing j from 0 to 3.

Lengths $M_j$ (j=1~5) from point $P_0$ to points $P_j$ (j=1~5) when the cubic Bézier curve is approximated by a circle are calculated in accordance with the following equations:

$$M_1 = L_1 \quad (86)$$

$$M_2 = L_1 + (L_2 + L_3)/2 \quad (87)$$

-continued $$= M_1 + (L_2 + L_3)/2$$

$$M_3 = L_1 + (L_2 + L_3)/2 + (L_4 + L_5)/2 \quad (88)$$
$$= M_2 + (L_4 + L_5)/2$$

$$M_4 = L_1 + (L_2 + L_3)/2 + (L_4 + L_5)/2 + (L_6 + L_7)/2 \quad (89)$$
$$= M_3 + (L_6 + L_7)/2$$

$$M_5 = L_1 + (L_2 + L_3)/2 + (L_4 + L_5)/2 + (L_6 + L_7)/2 + L_8 \quad (90)$$
$$= M_4 + L_8$$

In Equations (86)~(90), ($L_2+L_3$)/2 represents the length of the curve from point $P_1$ to point $P_2$ on the cubic Bézier curve and is the average value of the arc length $L_2$ of arc $P_1P_2$ when j=0 holds and the arc length $L_3$ of arc $P_1P_2$ when j=1 holds. Similarly, ($L_4+L_5$)/2 represents the length of the curve from point $P_2$ to point $P_3$ on the cubic Bézier curve and is the average value of the arc length $L_4$ of arc $P_2P_3$ when j=1 holds and the arc length $L_5$ of arc $P_2P_3$ when j=2 holds, and ($L_6+L_7$)/2 represents the length of the curve from point $P_3$ to point $P_4$ on the cubic Bézier curve and is the average value of the arc length $L_6$ of arc $P_3P_4$ when j=2 holds and the arc length $L_7$ of arc $P_3P_4$ when j=3 holds.

Since recalculation of the parameters $t_j$ involves normalizing the lengths $M_j$ (j=1~5) of the cubic Bézier curve from point $P_0$ to points $P_j$ (j=0~5) by the total length $M_5$, the calculation is represented by the following equations:

$$t_0=0 \quad (91)$$

$$t_1=M_1/M_5 \quad (92)$$

$$t_2=M_2/M_5 \quad (93)$$

$$t_3=M_3/M_5 \quad (94)$$

$$t_4=M_4/M_5 \quad (95)$$

$$t_5=1 \quad (96)$$

New parameters $t_j$ (j=0~5) are thus obtained.

Figure 28:
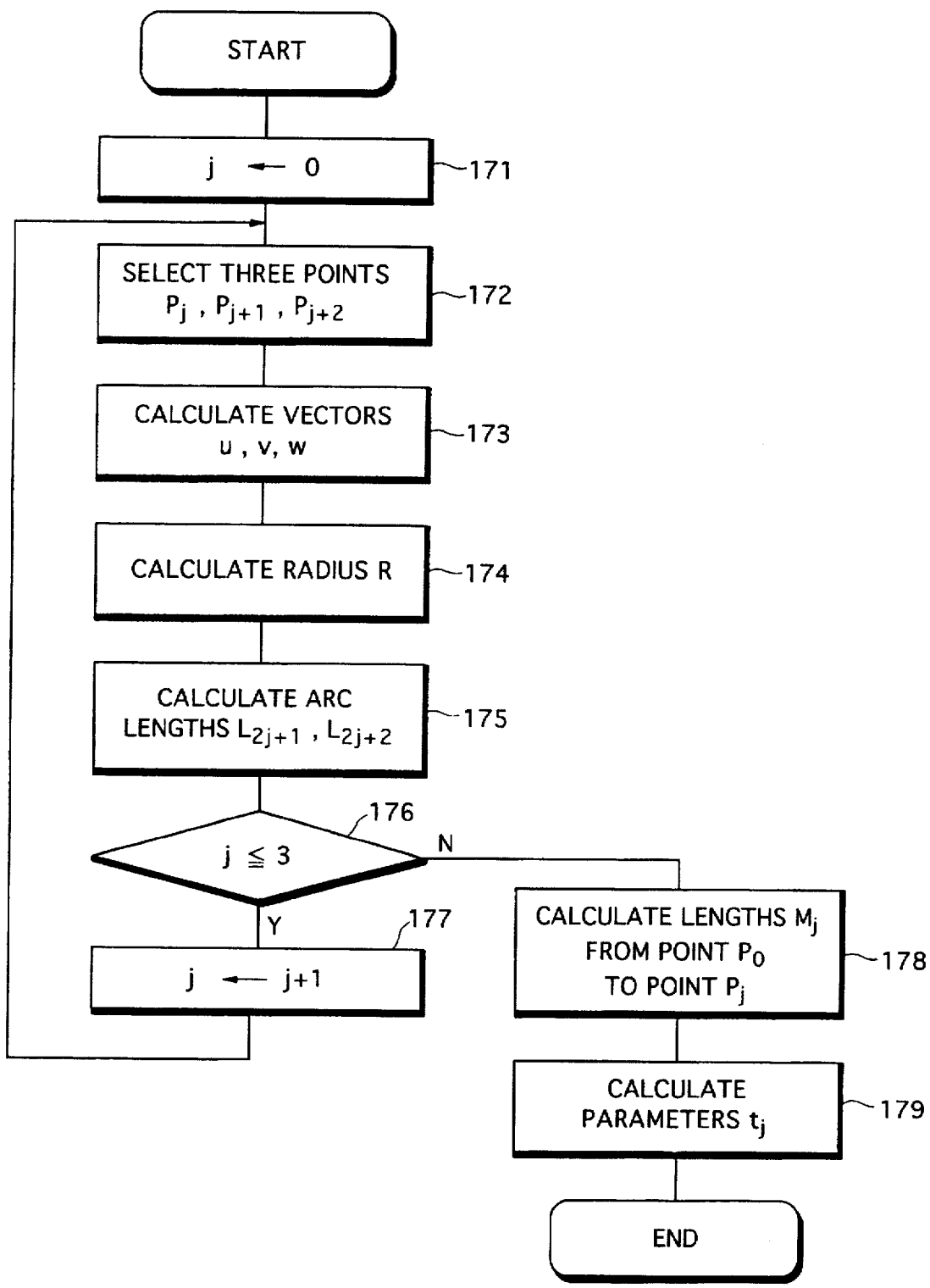
FIG. 28 is a flowchart showing the procedure of processing for re-calculation of parameters giving points on a fifth Bézier curve.

FIG. 28 illustrates the procedure of processing for recalculating the parameters at step 124A.

First, j is initialized (step 171) and the three points $P_j$, $P_{j+1}$, $P_{j+2}$ are selected (step 172). The vectors u, v and w are calculated in accordance with Equations (80), (81) and (82) using the coordinate data of the three selected points (step 173).

The radius R of the circle passing through the three points $P_j$, $P_{j+1}$, $P_{j+2}$ is calculated in accordance with Equation (83) using the calculated vectors u, v and w (step 174). The arc length $L_{2j+1}$ of the arc $P_jP_{j+1}$ and the arc length $L_{2j+2}$ of the arc $P_{j+1}P_{j+2}$ are calculated in accordance with Equations (84) and (85) using the calculated radius R and the vectors u and w (step 175).

While j is incremented (step 177), the processing of steps 172~175 is repeatedly executed until j exceeds 3. If j=3 is established, the calculation of the arc lengths $L_{2j+1}$, $L_{2j+2}$ necessary for calculating the lengths $M_j$ from point $P_0$ to points $P_j$ (j=1~5) is concluded.

When j=4 is established (NO at step 176), the lengths $M_j$ (j=1~5) from point $P_0$ to points $P_j$ are calculated in accordance with Equations (86)~(90) (step 178). New parameters $t_j$ (j=0~5) are obtained by normalizing the lengths $M_j$ up to each of the calculated points $P_j$ by the total length (length $M_5$) of the cubic Bézier curve from point $P_0$ to point $P_5$ (step 179).

The parameters $t_j$ (j=0~5) are thus recalculated.

At the processing of step 124 in FIG. 26, the control points $K_i$ (i=1~5) of the fifth Bézier curve are calculated using the parameters $t_j$ recalculated at step 124A.

Figure 29:
FIG. 29 shows a CAD data file obtained by a change of degree from a cubic Bézier curve to a fifth Bézier curve.
Figure 30A:
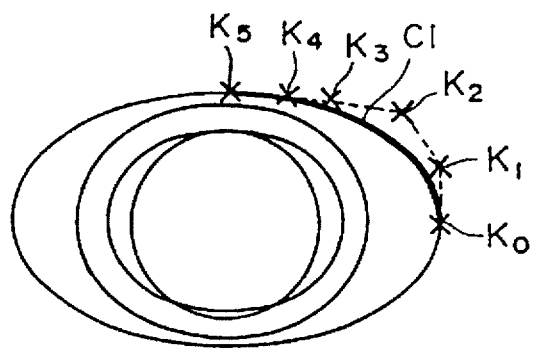
FIGS. 30a and 30b show the shape of an article represented by a CAD data file obtained by a change of degree from a cubic Bézier curve to a fifth Bézier curve.
Figure 30B:
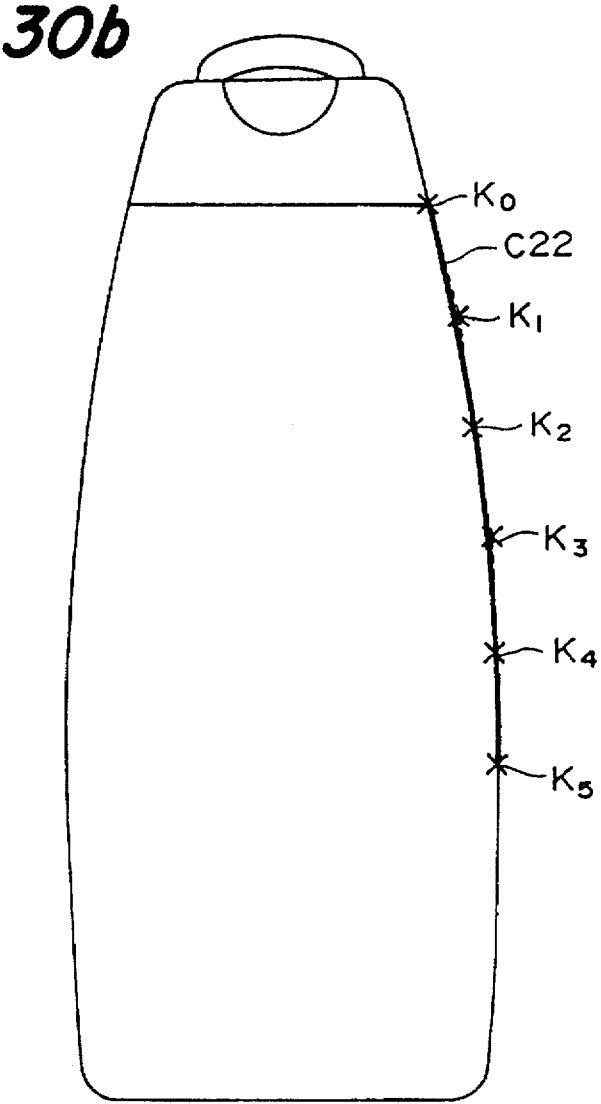

For example, when a change of degree is performed with regard to the element C22 at which the initial point has degenerated in the CAD data file shown in FIG. 13, the coordinate data illustrated in FIG. 29 is obtained. The control points after the change of degree with regard to the element C22 are as shown in FIGS. 30a and 30b. As will be understood from a comparison between FIGS. 25a–b and 30a–b, the control points of the fifth Bézier curve of element C22 remain degenerated at the initial point before the recalculation of the parameters $t_j$, as shown in FIGS. 25a and 25b. After the recalculation, however, as shown in FIGS. 30a and 30b, the degeneration is eliminated and the six control points $K_0$–$K_5$ appear at positions different from each other.

4.5 Change of degree from n-th degree Bézier curve to m-th degree Bézier curve

The conversion from the cubic Bézier curve to the fifth Bézier curve can be applied generally to a change of degree from an n-th degree Bézier curve to an m-th degree Bézier curve. Here n and m are integers of 3 or greater.

The change of degree can be from a lower degree to a higher degree (n<m), from a higher degree to a lower degree (n>m) or a change within the same degree (n=m).

The change of degree from a lower degree to a higher degree is a case in which a data file is transferred from the above-described simple CAD system to the design-supporting CAD system, by way of example. The change of degree from a higher degree to a lower degree is a case in which a data file is transferred from the design-supporting CAD system to the simple CAD system. The change within the same degree is performed in a case where degeneration of control points is eliminated.

Conversion from an n-th degree Bézier curve to an m-th degree Bézier curve will now be described.

When a change of degree is made from an n-th degree Bézier curve to an m-th degree Bézier curve, (m+1)-number of control points $K_i$ (i=0, 1, ..., n, ..., m) are calculated using (n+1)-number of control points $Q_i$ (i=0, 1, ..., n).

Since the n-th degree Bézier curve is converted to the m-th degree Bézier curve, (m+1)-number of points on the n-th degree Bézier curve are required, so that (m+1)-number of parameters $t_j$ (j=0~m) are calculated in accordance with the following equation at equal intervals 1/m between 0 and 1:

$$t_j = j/m \qquad (97)$$

When $P_j$ is substituted for points on the n-th degree Bézier curve at $t=t_j$, the points $P_j$ are represented by the following equation based upon Equation (1):

$$P_j = P(t_j) \qquad (98)$$
$$= \sum_{i=0}^{n} \{B_{i,n}(t_j)Q_i\}$$

When the coordinates of (m+1)-number of points $P_j$ (j=0~m) are calculated using Equation (98), the amount of processing is enormous and the processing takes time. It will suffice, therefore, to calculate the coordinates of the point $P_j$ in order from point $P_0$ by the forward difference method. The forward difference method is the same as that used when the change of degree is made from the cubic Bézier curve to the fifth Bézier curve.

The coordinates of the (m+1)-number of points $P_j$ (j=0~m) on the n-th degree Bézier curve are calculated and the lengths $M_j$ (j=1~m) from the initial point $P_0$ of the n-th degree Bézier curve to each of the points $P_j$ on the curve are calculated by approximation. The parameters $t_j$ (j=0~m) are recalculated by normalizing the lengths $M_j$ (j=1~m–1) to each of the approximately calculated points $P_j$ (j=0~m–1) using the total length $M_m$ of the n-th degree Bézier curve. This recomputation of the parameters is the same as that performed for the change of degree from the cubic Bézier curve to the fifth Bézier curve.

When control points have not degenerated at the initial point or final point of an n-th degree Bézier curve, the unit tangent vectors $E_i$ and $E_f$ at the initial and final points are calculated by the following equations using the coordinate data of control points $Q_0$, $Q_1$ and the coordinate data of control points $Q_{n-1}$, $Q_n$, respectively:

$$E_i = \frac{(Q_{1,x} - Q_{0,x}, Q_{1,y} - Q_{0,y}, Q_{1,z} - Q_{0,z})}{\{(Q_{1,x} - Q_{0,x})^2 + (Q_{1,y} - Q_{0,y})^2 + (Q_{1,z} - Q_{0,z})^2\}^{1/2}} \qquad (99)$$

$$E_f = \frac{(Q_{n,x} - Q_{n-1,x}, Q_{n,y} - Q_{n-1,y}, Q_{n,z} - Q_{n-1,z})}{\{(Q_{n,x} - Q_{n-1,x})^2 + (Q_{n,y} - Q_{n-1,y})^2 + (Q_{n,z} - Q_{n-1,z})^2\}^{1/2}} \qquad (100)$$

When control points have degenerated at the initial point of an n-th degree Bézier curve, $Q_0=Q_1$ holds, so that the unit tangent vector $E_i$ at the initial point of the n-th degree Bézier curve is given by the following equation using the control points $Q_0$ and $Q_2$:

$$E_i = \frac{(Q_{2,x} - Q_{0,x}, Q_{2,y} - Q_{0,y}, Q_{2,z} - Q_{0,z})}{\{(Q_{2,x} - Q_{0,x})^2 + (Q_{2,y} - Q_{0,y})^2 + (Q_{2,z} - Q_{0,z})^2\}^{1/2}} \qquad (101)$$

When control points have degenerated at the final point of an n-th degree Bézier curve, $Q_n=Q_{n-1}$ holds, so that the unit tangent vector $E_f$ at the final point of the n-th degree Bézier curve is given by the following equation using the control points $Q_n$ and $Q_{n-2}$:

$$E_f = \frac{(Q_{n,x} - Q_{n-2,x}, Q_{n,y} - Q_{n-2,y}, Q_{n,z} - Q_{n-2,z})}{\{(Q_{n,x} - Q_{n-2,x})^2 + (Q_{n,y} - Q_{n-2,y})^2 + (Q_{n,z} - Q_{n-2,z})^2\}^{1/2}} \qquad (102)$$

In view of the requirement that the m-th degree Bézier curve pass through points $P_j$ (j=0~m) on the n-th degree Bézier curve or in the vicinity of these points, the error r between points on the m-th degree Bézier curve and points $P_j$ on the n-th degree Bézier curve is represented by the following equation:

$$r = \sum_{j=0}^{m} \left| \sum_{i=0}^{m} \{B_{i,m}(t_j)K_i\} - P_j \right|^2 \qquad (103)$$

The initial point and final point of the m-th degree Bézier curve coincide with the initial point $P_0$ and final point $P_m$ of the n-th degree Bézier curve and therefore the following equations are obtained:

$$\sum_{i=0}^{m} \{B_{i,m}(t_0)K_i\} - P_0 = 0 \qquad (104)$$

$$\sum_{i=0}^{m} \{B_{i,m}(t_m)K_i\} - P_m = 0 \qquad (105)$$

The following equation results when the Equations (104), (105) are substituted into Equation (103):

$$r = \sum_{j=1}^{m-1} \left| \sum_{i=0}^{m} \{B_{i,m}(t_j)K_i\} - P_j \right|^2 \qquad (106)$$

Since the initial point $P_0$ and final point $P_m$ of the m-th degree Bézier curve coincide with the control points $K_0$ and $K_m$, respectively, the following equations hold:

$$K_0 = P_0 \qquad (107)$$

$$K_m = P_m \qquad (108)$$

Led $d_i$ stand for the distance between the control points $K_0$ and $K_1$, and let $d_f$ stand for the distance between the control points $K_m$ and $K_{m-1}$. In view of the requirement that the unit tangent vector $E_i$ at the initial point and the unit tangent vector $E_f$ at the final point each be preserved, the control points $K_1$, $K_{m-1}$ of the m-th degree Bézier curve are represented by the following equations, respectively:

$$K_1 = K_0 + d_i E_i \quad (109)$$

$$K_{m-1} = K_m + d_f E_f \quad (110)$$

Substituting Equations (107) and (108) into Equations (109) and (110), respectively, results in the following equations:

$$K_1 = P_0 + d_i E_i \quad (111)$$

$$K_{m-1} = P_m + d_f E_f \quad (112)$$

Substituting Equations (111) and (112) into Equation (106) results in the following equation:

$$r = \sum_{j=1}^{m-1} \left| \sum_{i=2}^{m-2} \{B_{i,m}(t_j)K_i\} + B_{1,m}(t_j)[P_0 + d_i E_i] + B_{m-1,m}(t_j)[P_m + d_f E_f] + B_{0,m}(t_j)P_0 + B_{m,m}(t_j)P_m - P_j \right|^2 \quad (113)$$

Furthermore, substituting $P_j=(x_j,y_j,x_j)$, $K_i=(a_i,b_i,c_i)$, $E_i=(E_{i,x},E_{i,y},E_{i,z})$ and $E_f=(E_{f,x},E_{f,y},E_{f,z})$ into Equation (113), the following equation is obtained:

$$r = \sum_{j=1}^{m-1} \Bigg[ \left| \sum_{i=2}^{m-2} \{B_{i,m}(t_j)a_i\} + B_{1,m}(t_j)[x_0 + d_i E_{i,x}] + B_{m-1,m}(t_j)[x_m + d_f E_{f,x}] + B_{0,m}(t_j)x_0 + B_{m,m}(t_j)x_m - x_j \right|^2 +$$

$$\left| \sum_{i=2}^{m-2} \{B_{i,m}(t_j)b_i\} + B_{1,m}(t_j)[y_0 + d_i E_{i,y}] + B_{m-1,m}(t_j)[y_m + d_f E_{f,y}] + B_{0,m}(t_j)y_0 + B_{m,m}(t_j)y_m - y_j \right|^2 +$$

$$\left| \sum_{i=2}^{m-2} \{B_{i,m}(t_j)c_i\} + B_{1,m}(t_j)[z_0 + d_i E_{i,z}] + B_{m-1,m}(t_j)[z_m + d_f E_{f,z}] + B_{0,m}(t_j)z_0 + B_{m,m}(t_j)z_m - z_j \right|^2 \Bigg] \quad (114)$$

The unknowns in Equation (114) are $d_i$, $d_f$, $a_2$, $a_3$, ..., $a_{m-2}$, $b_2$, $b_3$, ..., $b_{m-2}$, $c_2$, $c_3$, ..., $c_{m-2}$. As in the conversion from the cubic Bézier curve to the fifth Bézier curve, the error $r$ in Equation (112) is partially differentiated with respect to each of the unknowns, the results are replaced by 0 and the vector equations obtained as a result are solved by executing Gauss's elimination method, whereby the unknowns are found.

The distanced $d_i$, $d_f$ and the control points $K_2$~$K_{m-2}$ are thus obtained. The control points $K_1$ and $K_{m-1}$ are obtained from Equations (109) and (110) using the obtained distances $d_i$ and $d_f$. The control points $K_0$ and $K_m$ are obtained from Equations (107) and (108).

The description given above covers the approximate calculation of unit tangent vectors and the recalculation of parameters. However, this processing can be eliminated if the control points have not degenerated.

Thus, a change of degree from an n-th degree Bézier curve to an m-th degree Bézier curve is performed by calculating (m+1)-number of control points $K_0$~$K_m$ of the m-th degree Bézier curve from (n+1)-number of control points $Q_0$~$Q_n$ of the n-th degree Bézier curve.

5. Drawing of Bézier curves

Data representing a fifth Bézier curve is thus obtained in the design-supporting CAD system 20. Processing through which a Bézier curve is drawn on the screen of a CRT using this data will now be described.

5.1 Hardware configuration

Figure 31:
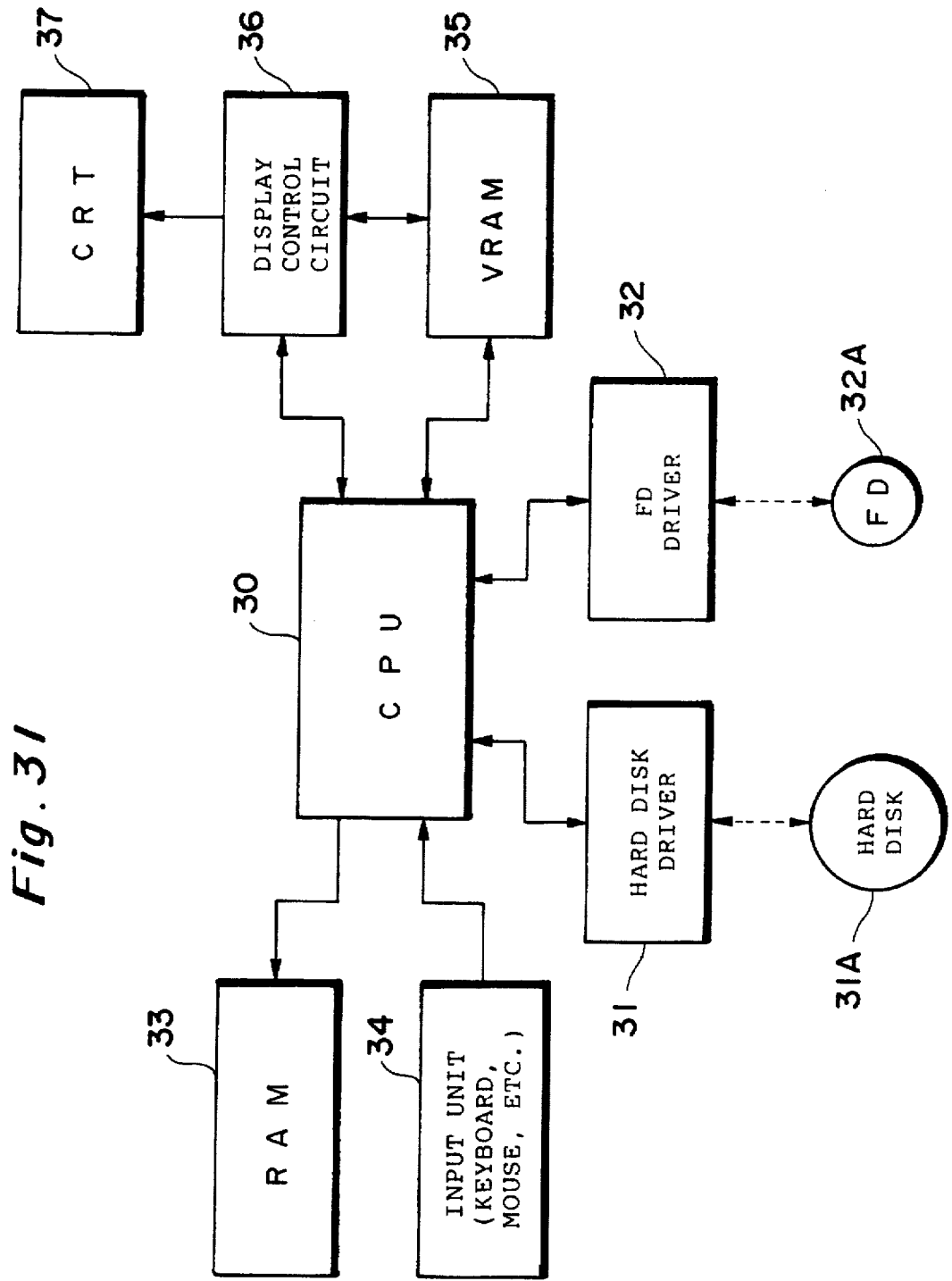
FIG. 31 is a block diagram showing the hardware configuration of a design-supporting CAD system.

FIG. 31 is a shows the hardware configuration of the design-supporting CAD system 20.

The design-supporting CAD system 20 is constituted by a computer system, as set forth above, and has a CPU 30. A hard disk driver 31, an FD (floppy disk) driver 32, a RAM 33, an input unit 34, a VRAM 35 and a display control circuit 36, etc., are connected to the CPU 30 via the required interfaces (not shown).

The hard disk driver 31 writes data (inclusive of a program) to a hard disk 31A or reads data from the hard disk 31A. The hard disk 31A is used as the above-mentioned CAD data base 22 (see FIG. 1). A program which controls the CPU 30 also is stored in the hard disk 31A in order that the CPU 30 may execute the CAD data converting process 21, change-of-degree converting process 23 and display processing described later, etc..

The FD driver 32 write data to the FD 32A or read data from the FD 32A. The CAD data base 22 may be implemented by the FD 32A. The computer programs for the CAD data converting process 21, change-of-degree converting process 23 and display processing, etc., may also be stored in the FD 32A.

The RAM 33 is used as a working memory for temporarily storing the data produced in the CAD data converting process 21 and change-of-degree converting process 23 and for other purposes as well.

The input unit 34, which includes a keyboard, mouse and the like, is used to enter commands and data for a series of operations in the design-supporting CAD system 20.

The VRAM 35 is used as a bitmap memory and stores, for each pixel of the display screen on a CRT display unit 37, data representing an image (a design drawing of an article of the kind shown in FIGS. 30a and 30b) displayed on the CRT display unit 37.

The display control circuit 36 generates to output a video signal for displaying a figure representing an article on the CRT display unit 37 on the basis the image data stored in the VRAM 35 under the control of the CPU 30.

5.2 Processing for displaying Bézier curves

When the substitution n=5 is made in Equations (1) and (2) and the results are rearranged, the Bézier curve P(t) is presented by the following equation (where $K_i$ is substituted for the symbol $Q_i$ of the control points):

$$P(t) = (1 - 5t - 10t^2 - 10t^3 + 5t^4 + t^5)K_0 + \quad (115)$$
$$5(t - 4t^2 + 6t^3 - 4t^4 + t^5)K_1 +$$
$$10(t^2 - 3t^3 + 3t^4 + t^5)K_2 +$$
$$10(3t^3 - 2t^4 + t^5)K_3 +$$
$$5(t^4 - t^5)K_4 + t^5 K_5$$

where $0 \leq t \leq 1$ holds.

Figure 32:
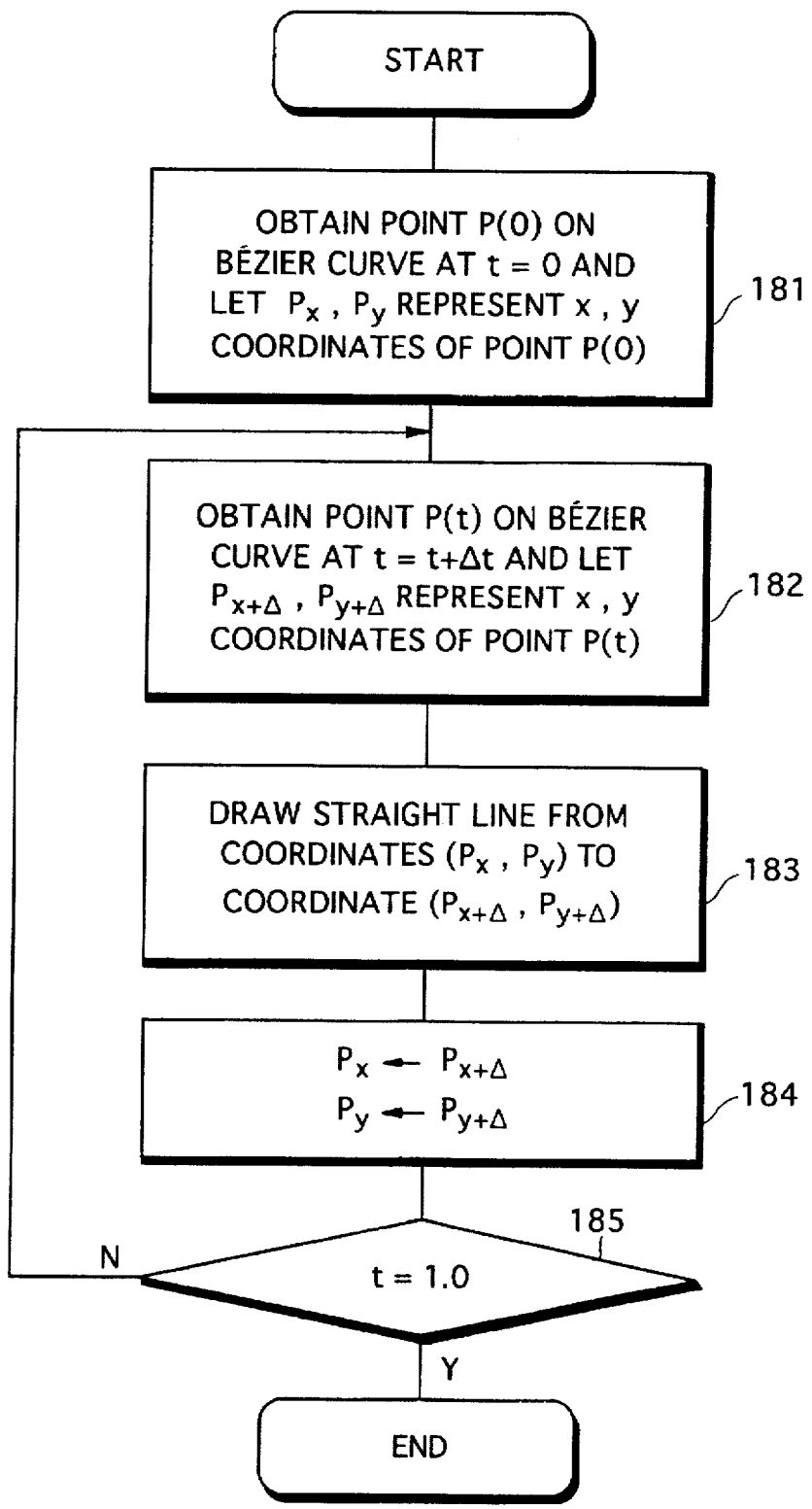
FIG. 32 is a flowchart showing the procedure of processing for displaying a Bézier curve.

If curve C1 shown in FIGS. 30a and 30b are considered as an example of a fifth Bézier curve after conversion, then the coordinate data representing the control points $K_i$ (i=0~5) will be as shown in FIG. 29 (the data of CRVE1). This is as follows:

$K_0 = (K_{0,x}, K_{0,y}, K_{0,z})$
$\quad = (136.1315, 248, 0133, 0.0)$
$K_1 = (136.1315, 248, 3959, 0.0)$
$K_2 = (129.0745, 266.662, 0.0)$
$K_3 = (117.4764, 268.6526, 0.0)$
$K_4 = (109.691, 269.6551, 0.0)$
$K_5 = (99.8779, 269.6551, 0.0)$ FIG. 32 illustrates a display processing procedure executed by the CPU 30 for the purpose of displaying the fifth Bézier curve, which is represented by Equation (115), on the CRT display unit 37. In order to simplify the description, the data representing the fifth Bézier curve is not subjected to enlargement, reduction or parallel transferring processing. Rather, processing through which the fifth Bézier curve represented by this data is displayed as is will be described. Further, in the coordinate data shown in FIG. 29, the Z coordinates are all 0.0 and therefore the display is presented in a two-dimensional plane.

The processing for displaying a Bézier curve involves calculating the coordinates of the Bézier curve in accordance with Equation (115) while varying the parameter t in small increments, and drawing a straight line between mutually adjacent coordinates. Accordingly, the smaller the amount of change in the parameter t, the greater the number of straight line segments used to represent the curve and, hence, the smoother the display of the curve can be made.

First, Equation (115) is calculated upon making the substitution t=0 and the coordinates of the initial point P(0) are obtained. Let $P_x$, $P_y$ represent the x,y coordinates of the point P(0) (step 181).

Next, Equation (115) is calculated upon substituting t+Δt for t and the coordinates of point P(t+Δt) on the Bézier curve defined by t+Δt are obtained. Let $P_{x+\Delta}$, $P_{y+\Delta}$ represent the x, y coordinates of the point P(t+Δt) (step 182). It will suffice if Δt is decided in conformity with the resolution (or enlargement ratio) of the image. For example, Δt=0.02.

A straight line is drawn between the two points thus obtained, namely from the point $(P_x, P_y)$ to the point $(P_{x+\Delta}, P_{y+\Delta})$ (the straight line is displayed on the display screen of the CRT display unit 37) (step 183).

Hardware which draws a straight line between two points when the data representing the coordinates of the two points has been provided is known. If the display control circuit 36 includes this hardware, the drawing of a straight line can be achieved by providing this hardware with the calculated coordinate data of the two points. An example in which the processing of step 183 is implemented by software will be described later.

Next, $P_{x+\Delta}$ is replaced by $P_x$ and $P_{y+\Delta}$ is replaced by $P_y$ (step 184).

Thereafter, the program returns to step 182, the previous t+Δt is replaced by a new t and $P_{x+\Delta}$, $P_{y+\Delta}$ are calculated using the new parameter (t+Δt) obtained by adding Δt to this new t.

The processing of steps 182~184 is repeated until t=1.0 is established.

This display can be presented in the same manner also in the case of a three-dimensional Bézier curve. In this case, calculation is performed in accordance with Equation (115) with regard to the Z coordinate as well. If the coordinates in three-dimensional space are projected upon a two-dimensional plane, data for display is obtained.

In a case where a Bézier curve is displayed upon being enlarged, reduced or transferred in parallel, it will suffice to execute the display processing of FIG. 32 after the coordinate data (the data shown in FIG. 29) within the CAD data file is subjected to an enlargement, reduction or transferring operation. In the case of enlargement and reduction, the amount of change Δt in the parameter t is changed appropriately. For example, when the enlargement magnification is raised, it is preferred that the amount of change Δt be made reduced.

It is possible to draw the Bézier curve in similar not only by displaying it on the screen of the CRT display unit 37 but also by drawing it using another output device (a printer, for example).

Processing for displaying a straight line by software (step 183) will now be described.

Figure 33:
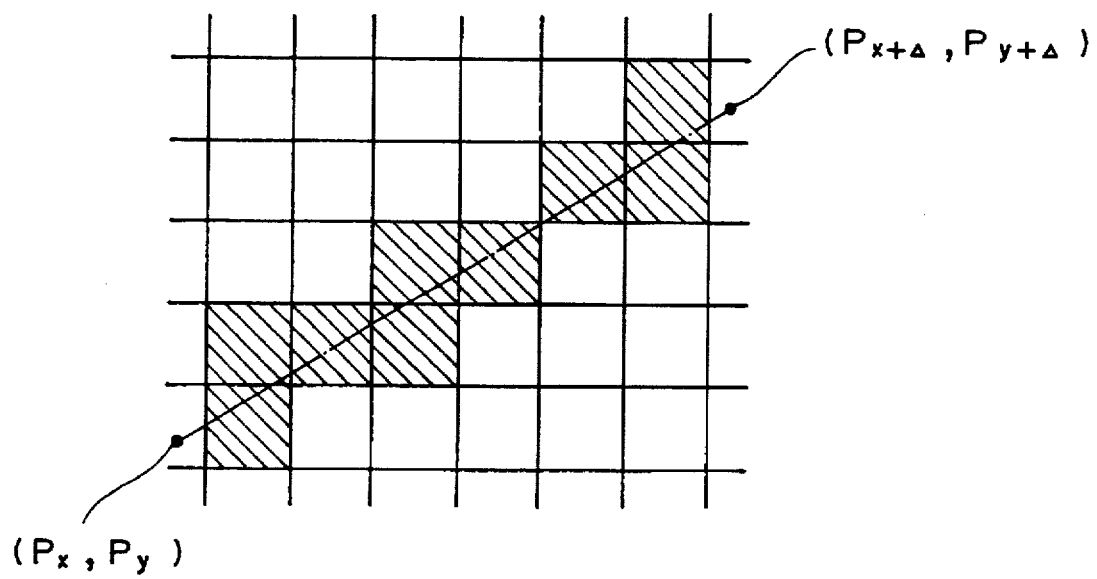
FIG. 33 shows the manner in which a straight line is drawn on a display screen.

The resolving power or resolution (number of pixels) of the display screen on a CRT display unit 37 is decided in conformity with the unit. FIG. 33 schematically illustrates the structure of a CRT display screen. The grid points here are the centers of pixels. In a case where a straight line connecting two points $(P_x, P_y)$ and $(P_{x+\Delta}, P_{y+\Delta})$ spaced apart by more than one pixel is displayed, the pixels (indicated by hatching) traversed by this straight line (indicated by the broken line) connecting the two points are lit.

Figure 34:
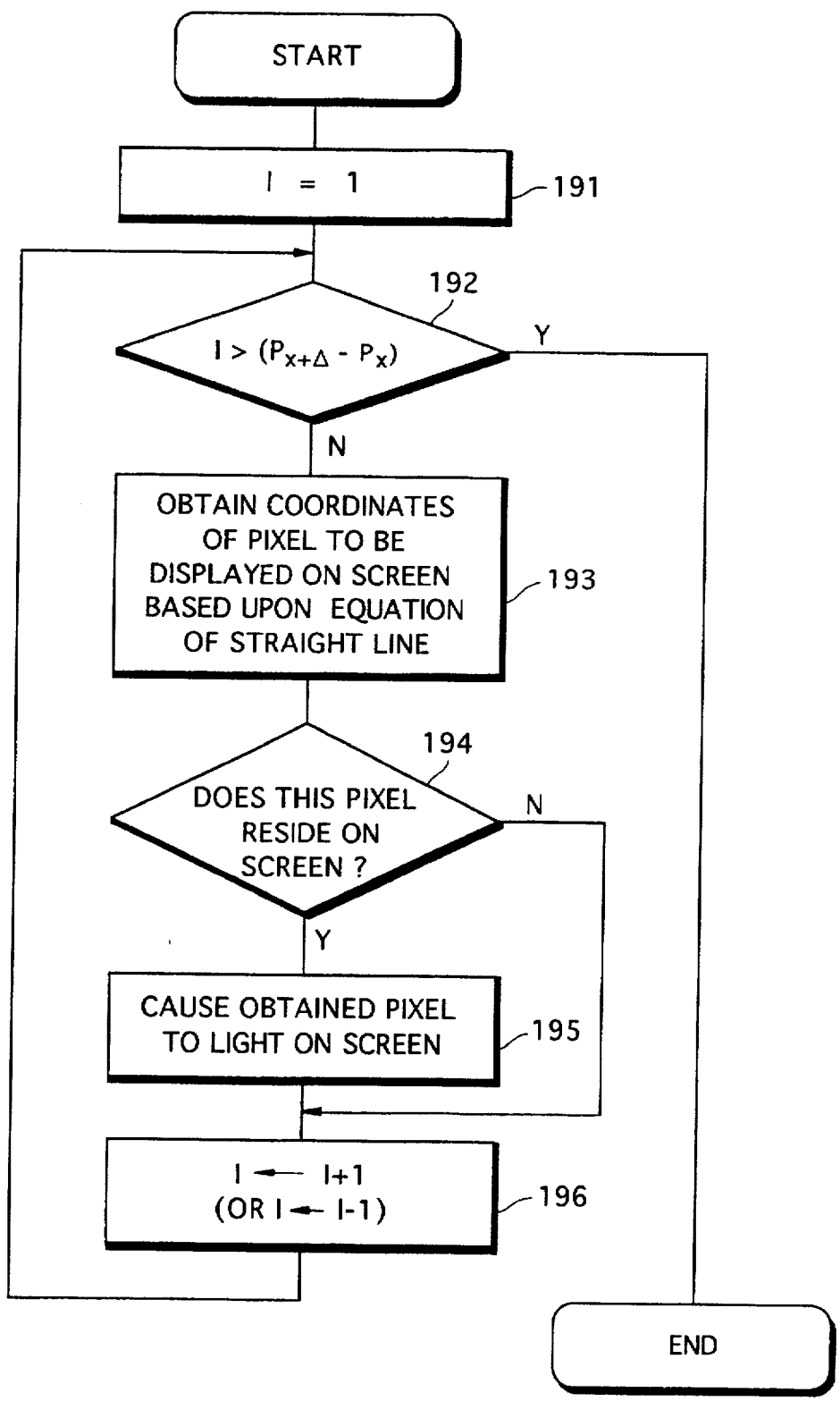
FIG. 34 is a flowchart showing the procedure of processing for drawing a straight line.

FIG. 34 illustrates a processing routine for displaying the straight line. The routine will be described in simple terms since it is already known in the art. It will be assumed that two points $(P_x, P_y)$, $(P_{x+\Delta}, P_{y+\Delta})$ are given. An equation representing the straight line connecting these two points is created.

A parameter I decides a position on the X axis serving as the basis of calculation for obtaining the pixels to be displayed. (In a case where the scale of the coordinates of the display screen and the scale of the coordinates of the data agree, the pixels on the display screen are incremented one by one along the X axis by the parameter I.) The parameter I is set to 1 (step 191).

On the basis of the equation of the straight line, the coordinates (x,y) of a pixel to be displayed (lit) on the screen are found in the set parameter I (step 193). There is a case in which one pixel is to be displayed and a case in which two pixels are to be displayed.

If a pixel thus obtained resides on the display screen (YES at step 194), then this pixel is lit (step 195). If the pixel obtained does not reside on the display screen, this pixel is not displayed.

Thereafter, the parameter I is incremented (in case of $P_{x+\Delta} > P_x$) or decremented (in case of $P_x > P_{x+\Delta}$) (step 196) and the program returns to step 192. The processing of steps 193~196 is repeated until the parameter I becomes larger than $(P_{x+\Delta} - P_x)$ (step 192).

The processing (step 195) for lighting a pixel on the display screen is achieved by making "1" (in case of a monochromatic display) the bit of the storage location corresponding to this pixel in the VRAM 35. The bitmap image data in the VRAM 35 is reflected in what appears on the display screen of the CRT display unit 37 under the control of the display control circuit 36.

In general, a bitmap memory has a storage location corresponding to each pixel of the display unit 37. The CPU 30 writes the image data to be displayed in the storage location corresponding to the pixel on the display screen. In case of a color display, one pixel of image data generally is composed of a plurality of bits of R, G, B data of the three primary colors. In case of a grayscale display, one pixel of image data is composed of image data of a plurality of bits. In case of a monochromatic display, image data is expressed by one bit per pixel.

A monochromatic bitmap display will be described in simple terms with reference to FIG. 35.

Assume that the size of the display screen is 640×480 pixels. XY coordinates are established with the upper left corner of the screen serving as the origin (x=0~639, y=479).

Let A000 be the leading address of the VRAM 35 (bitmap memory). Eight-bit data (namely eight pixels of display data) can be stored at a storage location designated by one address. The addresses of the VRAM 35 are set up so as to grow successively larger as the screen is scanned horizontally and vertically.

The position of each pixel on the display screen corresponds to a bit position within a storage area designated by the address of the VRAM 35. For example, a point P (x,y)=(0,12) on the display screen corresponds to the fifth bit at the address A0001 of VRAM 35.

When the data of the the pixel to be displayed on the display screen has been obtained, the CPU 30 calculates the address of the VRAM 35 and the bit position within this address corresponding to this pixel and writes the one-bit data "1" in this bit position. This is the processing of step 195 in FIG. 34.

As many apparently widely different embodiments of the present invention can be made without departing from the spirit and scope thereof, it is to be understood that the invention is not limited to the specific embodiments thereof except as defined in the appended claims.

What is claimed is:

1. A CAD system in a design system including a first CAD system and a second CAD system;

said first CAD system having a first data file and first converting means;

said first data file being a collection of data representing an illustration of an article having a curve, and including control-point data defining a cubic Bézier curve representing the curve;

said first converting means converting said first data file to a common data file having a data format common to CAD systems of a plurality of types;

said second CAD system having second converting means and a CAD data base;

said second converting means converting the common data, which has been transferred from said first CAD system, to a CAD data file having a data format unique to said second CAD system; and said CAD data base storing said converted CAD data file, which includes control-point data defining a cubic Bézier curve;

wherein said second CAD system in said design system further includes data converting means for converting control-point data defining a cubic Bézier curve to control-point data defining a fifth Bézier curve, and display control means for displaying an image representing an article on a display device based upon a CAD data file converted by said data converting means;

said data converting means having:

Bézier curve extracting means for extracting data representing the cubic Bézier curve from the CAD data file that has been stored in said CAD data base;

first parameter determining means for determining six first parameters, which give respective ones of six points on the cubic Bézier curve, at equal intervals within a predetermined range;

coordinate determining means for determining coordinate data, which represents the six points on the cubic Bézier curve, using the six first parameters determined by said first parameter determining means and the control-point data defining the cubic Bézier curve;

tangent-vector determining means for determining two unit tangent vectors, which respectively represent gradients of the cubic Bézier curve at an initial point and a final point thereof, using the control-point data defining the cubic Bézier curve, wherein these unit tangent vectors are determined by approximation when control points have degenerated at the initial point or final point of the cubic Bézier curve;

second parameter determining means for determining six second parameters, which conform to lengths of the cubic Bézier curve from the initial point to respective points thereof, using the coordinate data representing the six points on the cubic Bézier curve determined by said coordinate determining means; and control-point determining means for determining control-point data, which defines the fifth Bézier curve, so as to preserve the gradients of the cubic Bézier curve at the initial point and final point thereof and in such a manner that the fifth Bézier curve will pass through points, or in the vicinity thereof, on the cubic Bézier curve based upon the six second parameters determined in conformity with the lengths of the cubic Bézier curve, the coordinate data representing the six points on the cubic Bézier curve and the two unit tangent vectors at respective ones of the initial point and final point of the cubic Bézier curve;

said display control means having:

means for creating display data for displaying the article based upon CAD data containing the control-point data, which defines the fifth Bézier curve, resulting from the conversion by said data converting means; and means for generating the display data in a bitmap memory;

wherein the image of the article represented by data obtained by generating said display data in said bitmap memory is displayed on said display device.

2. A CAD system having a CAD data base for storing a CAD data file that includes control-point data defining a cubic Bézier curve, data converting means for converting the control-point data defining the cubic Bézier curve to control-point data defining a fifth Bézier curve, and display control means for displaying an image representing an article on a display device based upon a CAD data file converted by said data converting means;

said data converting means comprising:

Bézier-curve extracting means for extracting data representing the cubic Bézier curve from the CAD data file that has been stored in said CAD data base;

first parameter determining means for determining six first parameters, which give respective ones of six points on the cubic Bézier curve, at equal intervals within a predetermined range;

coordinate determining means for determining coordinate data, which represents the six points on the cubic Bézier curve, using the six first parameters determined by said first parameter determining means and the control-point data defining the cubic Bézier curve;

tangent-vector determining means for determining two unit tangent vectors, which respectively represent gradients of the cubic Bézier curve at an initial point and a final point thereof, using the control-point data defining the cubic Bézier curve, wherein these unit tangent vectors are determined by approximation when control points have degenerated at the initial point or final point of the cubic Bézier curve;

second parameter determining means for determining six second parameters, which conform to lengths of the cubic Bézier curve from the initial point to respective points thereof, using the coordinate data representing the six points on the cubic Bézier curve determined by said coordinate determining means; and control-point determining means for determining control-point data, which defines the fifth Bézier curve, so as to preserve the gradients of the cubic Bézier curve at the initial point and final point thereof and in such a manner that the fifth Bézier curve will pass through points, or in the vicinity thereof, on the cubic Bézier curve based upon the six second parameters determined in conformity with the lengths of the cubic Bézier curve, the coordinate data representing the six points on the cubic Bézier curve and the two unit tangent vectors at respectively ones of the initial point and final point of the cubic Bézier curve;

said display control means comprising:

means for creating display data for displaying the article based upon CAD data containing the control-point data, which defines the fifth Bézier curve, resulting from the conversion by said data converting means; and means for generating the display data in a bitmap memory;

wherein the image of the article represented by data obtained by generating said display data in said bitmap memory is displayed on said display unit.

3. A CAD system in a design system including a first CAD system and a second CAD system;

said first CAD system having a first data file and first converting means;

said first data file being a collection of data representing an illustration of an article having a curve, and including control-point data defining an n-th degree Bézier curve representing the curve;

said first converting means converting said first data file to a common data file having a data format common to CAD systems of a plurality of types;

said second CAD system having second converting means and a CAD data base;

said second converting means converting the common data, which has been transferred from said first CAD system, to a CAD data file having a data format unique to said second CAD system; and said CAD data base storing said converted CAD data file, which includes control-point data defining an n-th degree Bézier curve;

wherein said second CAD system in said design system further includes data converting means for converting control-point data defining an n-th degree Bézier curve to control-point data defining an m-th degree Bézier curve, and display control means for displaying an image representing an article on a display device based upon a CAD data file converted by said data converting means;

said data converting means having:

Bézier-curve extracting means for extracting data representing the n-th degree Bézier curve from the CAD data file that has been stored in said CAD data base;

first parameter determining means for determining (m+1)-number of first parameters, which give respective ones of (m+1)-number of points on the n-th degree Bézier curve, at equal intervals within a predetermined range;

coordinate determining means for determining coordinate data, which represents the (m+1)-number of points on the n-th degree Bézier curve, using the (m+1)-number of first parameters determined by said first parameter determining means and the control-point data defining the n-th degree Bézier curve;

tangent-vector determining means for determining two unit tangent vectors, which respectively represent gradients of the n-th degree Bézier curve at an initial point and a final point thereof, using the control-point data defining the n-th degree Bézier curve, wherein these unit tangent vectors are determined by approximation when control points have degenerated at the initial point or final point of the n-th degree Bézier curve;

second parameter determining means for determining (m+1)-number of second parameters, which conform to lengths of the n-th degree Bézier curve from the initial point to respective points thereof, using the coordinate data representing the (m+1)-number of points on the n-th degree Bézier curve determined by said coordinate determining means; and control-point determining means for determining control-point data, which defines the m-th degree Bézier curve, so as to preserve the gradients of the n-th degree Bézier curve at the initial point and final point thereof and in such a manner that the m-th degree Bézier curve will pass through points, or in the vicinity thereof, on the n-th degree Bézier curve based upon the (m+1)-number of second parameters determined in conformity with the lengths of the n-th degree Bézier curve, the coordinate data representing the (m+1)-number of points on the n-th degree Bézier curve and the two unit tangent vectors at respective ones of the initial point and final point of the n-th degree Bézier curve;

said display control means having:

means for creating display data for displaying the article based upon CAD data containing the control-point data, which defines the m-th degree Bézier curve, resulting from the conversion by said data converting means; and means for generating the display data in a bitmap memory;

wherein the image of the article represented by data obtained by generating said display data in said bitmap memory is displayed on said display device.

4. A CAD system having a CAD data base for storing a CAD data file that includes control-point data defining an n-th degree Bézier curve, data converting means for converting the control-point data defining the an n-th degree Bézier curve to control-point data defining an m-th degree Bézier curve, and display control means for displaying an image representing an article on a display device based upon a CAD data file converted by said data converting means;

said data converting means having:

Bézier-curve extracting means for extracting data representing the n-th degree Bézier curve from the CAD data file that has been stored in said CAD data base;

first parameter determining means for determining (m+1)-number of parameters, which give respective ones of (m+1)-number of points on the n-th degree Bézier curve, at equal intervals within a predetermined range;

coordinate determining means for determining coordinate data, which represents the (m+1)-number of points on the n-th degree Bézier curve, using the (m+1)-number of first parameters determined by said first parameter determining means and the control-point data defining the n-th degree Bézier curve;

tangent-vector determining means for determining two unit tangent vectors, which respectively represent gradients of the n-th degree Bézier curve at an initial point and a final point thereof, using the control-point data defining the n-th degree Bézier curve, wherein these unit tangent vectors are determined by approximation when control points have degenerated at the initial point or final point of the n-th degree Bézier curve;

second parameter determining means for determining (m+1)-number of second parameters, which conform to lengths of the n-th degree Bézier curve from the initial point to respective points thereof, using the coordinate data representing the (m+1)-number of points on the n-th degree Bézier curve determined by said coordinate determining means; and control-point determining means for determining control-point data, which defines the m-th degree Bézier curve, so as to preserve the gradients of the n-th degree Bézier curve at the initial point and final point thereof and in such a manner that the m-th degree Bézier curve will pass through points, or in the vicinity thereof, on the n-th degree Bézier curve based upon the (m+1)-number of second parameters determined in conformity with the lengths of the n-th degree Bézier curve, the coordinate data representing the (m+1)-number of points on the n-th degree Bézier curve and the two unit tangent vectors at respective ones of the initial point and final point of the n-th degree Bézier curve;

said display control means having:

means for creating display data for displaying the article based upon CAD data containing the control-point data, which defines the m-th degree Bézier curve, resulting from the conversion by said data converting means; and means for generating the display data in a bitmap memory;

wherein the image of the article represented by data obtained by generating said display data in said bitmap memory is displayed on said display device.

5. A data converting apparatus in a CAD system equipped with a CAD data base for storing a CAD data file that includes control-point data defining an n-th degree Bézier curve representing the curve of an article, wherein said CAD data file is a file of basic data necessary in order to generate data, which represents an image of the article, in a bitmap memory for the purpose of displaying the image, said data converting apparatus converting the control-point data defining the n-th degree Bézier curve to control-point data defining the m-th degree Bézier curve and comprising:

Bézier-curve extracting means for extracting data representing the n-th degree Bézier curve from the CAD data file that has been stored in said CAD data base;

first parameter determining means for determining (m+1)-number of parameters, which give respective ones of (m+1)-number of points on the n-th degree Bézier curve, at equal intervals within a predetermined range over which the parameters take on values;

coordinate determining means for determining coordinate data, which represents the (m+1)-number of points on the n-th degree Bézier curve, using the (m+1)-number of parameters determined by said first parameter determining means and the control-point data defining the n-th degree Bézier curve;

tangent-vector determining means for determining two unit tangent vectors, which respectively represent gradients of the n-th degree Bézier curve at an initial point and a final point thereof, using the control-point data defining the n-th degree Bézier curve; and control-point determining means for determining control-point data, which defines the m-th degree Bézier curve, so as to preserve the gradients of the n-th degree Bézier curve at the initial point and final point thereof and in such a manner that the m-th degree Bézier curve will pass through points, or in the vicinity thereof, on the n-th degree Bézier curve based upon the (m+1)-number of parameters giving the respective (m+1)-number of points on the n-th degree Bézier curve, the coordinate data representing the (m+1)-number of points on the n-th degree Bézier curve and the two unit tangent vectors at respective ones of the initial point and final point of the n-th degree Bézier curve.

6. The apparatus according to claim 5, wherein said tangent-vector determining means determines the unit tangent vectors by approximation when control points have degenerated at the initial point or final point of the n-th degree Bézier curve.

7. The apparatus according to claim 6, further comprising second parameter determining means for determining (m+1)-number of second parameters, which conform to lengths of the n-th degree Bézier curve from the initial point to respective points thereof, using the coordinate data representing the (m+1)-number of points on the n-th degree Bézier curve determined by said coordinate determining means;

said control point determining means determining said control-point data using the parameters determined in conformity with the lengths of the n-th degree Bézier curve by said second parameter determining means instead of the parameters determined at equal intervals by said first parameter determining means.

8. The apparatus according to claim 5, further comprising means for creating display data, which is for displaying the article, based upon CAD data which includes the control-point data defining the m-th degree Bézier curve, and generating this display data in a bitmap memory;

wherein the image of the article represented by the data generated in said bitmap memory is displayed on said display device.

9. The apparatus according to claim 5, wherein n=3 and m=5 hold.

10. A Bézier-curve data converting apparatus in a CAD system equipped with a CAD data base for storing a CAD data file that includes control-point data defining an n-th degree Bézier curve representing the curve of an article, wherein said CAD data file is a file of basic data necessary in order to generate data, which represents an image of the article, in a bitmap memory for the purpose of displaying the image, said data converting apparatus converting the control-point data defining the n-th degree Bézier curve to control-point data defining the m-th degree Bézier curve, comprising:

means for determining control-point data, which defines an m-th degree Bézier curve, so as to preserve gradients of the n-th degree Bézier curve at the initial point and final point thereof and in such a manner that the m-th degree Bézier curve will pass through points, or in the vicinity thereof, on the n-th degree Bézier curve, based upon parameters giving points on the n-th degree Bézier curve, coordinate data representing points on the n-th degree Bézier curve and two tangent vectors representing gradients at respective ones of the initial point and final point of the n-th degree Bézier curve; and means for storing the determined control-point data in said CAD data base.

11. A data conversion method in a CAD system equipped with a CAD data base for storing a CAD data file that includes control-point data defining an n-th degree Bézier curve representing the curve of an article, wherein said CAD data file is a file of basic data necessary in order to generate data, which represents an image of the article, in a bitmap memory for the purpose of displaying the image, said method of converting the control-point data defining the n-th degree Bézier curve to control-point data defining the m-th degree Bézier curve, comprising the steps of:

extracting data representing the n-th degree Bézier curve from the CAD data file that has been stored in the CAD data base;

determining (m+1)-number of parameters, which give respective (m+1)-number of points on the n-th degree Bézier curve, at equal intervals within a predetermined range over which the parameters take on values;

determining coordinate data, which represents the (m+1)-number of points on the n-th degree Bézier curve, using the (m+1)-number of parameters and the control-point data defining the n-th degree Bézier curve;

determining two unit tangent vectors, which respectively represent gradients of the n-th degree Bézier curve at an initial point and a final point thereof, using the control-point data defining the n-th degree Bézier curve; and determining control-point data, which defines an m-th degree Bézier curve, so as to preserve gradients of the n-th degree Bézier curve at the initial point and final point thereof and in such a manner that the m-th degree Bézier curve will pass through points, or in the vicinity thereof, on the n-th degree Bézier curve based upon the (m+1)-number of parameters giving the respective (m+1)-number of points on the n-th degree Bézier curve, the coordinate data representing the (m+1)-number of points on the n-th degree Bézier curve and the two unit tangent vectors at respective ones of the initial point and final point of the n-th degree Bézier curve.

12. The data converting method according to claim 11, comprising the step of determining the unit tangent vectors by approximation when control points have degenerated at the initial point or final point of the n-th degree Bézier curve.

13. The data converting method according to claim 12, further comprising the steps of:

determining (m+1)-number of parameters, which conform to lengths of the n-th degree Bézier curve from the initial point to respective points thereof, using the coordinate data representing the (m+1)-number of points on the n-th degree Bézier curve; and determining said control-point data using the parameters determined in conformity with the lengths of the n-th degree Bézier curve instead of the parameters determined at equal intervals.

14. The data converting method according to claim 11, further comprising steps of creating display data, which is for displaying the article, based upon CAD data which includes the control-point data defining the m-th degree Bézier curve, and generating this display data in a bitmap memory.

15. The data converting method according to claim 11, wherein n=3 and m=5 hold.

16. A Bézier-curve data converting method in a CAD system equipped with a CAD data base for storing a CAD data file that includes control-point data defining an n-th degree Bézier curve representing the curve of an article, wherein said CAD data file is a file of basic data necessary in order to generate data, which represents an image of the article, in a bitmap memory for the purpose of displaying the image, said data converting method of converting the control-point data defining the n-th degree Bézier curve to control-point data defining the m-th degree Bézier curve, comprising the steps of:

determining control-point data, which defines an m-th degree Bézier curve, so as to preserve gradients of the n-th degree Bézier curve at the initial point and final point thereof and in such a manner that the m-th degree Bézier curve will pass through points, or in the vicinity thereof, on the n-th degree Bézier curve based upon parameters giving points on the n-th degree Bézier curve, coordinate data representing points on the n-th degree Bézier curve and two tangent vectors respectively representing gradients at the initial point and final point of the n-th degree Bézier curve; and storing the determined control-point data in said CAD data base.

17. A recording medium used in a CAD system equipped with a CAD data base and a computer, said CAD data base storing a CAD data file necessary to generate data, which represents an image of an article, in a bitmap memory for the purpose of displaying the image;

said recording medium having a computer-readable program recorded therein, said program including a data conversion program for converting control-point data defining an n-th degree Bézier curve representing a curve of an article to control-point data defining an m-th degree Bézier curve;

wherein the data conversion program comprises:

a set of Bézier-curve extraction codes which cause said computer to execute processing to extract data representing an n-th degree Bézier curve from the CAD data file that has been stored in said CAD data base;

a set of first parameter determination codes which cause said computer to execute processing to determine (m+1)-number of first parameters, which give respective ones of (m+1)-number of points on the n-th degree Bézier curve, at equal intervals within a predetermined range;

a set of coordinate determination codes which cause said computer to execute processing to determine coordinate data, which represents the (m+1)-number of points on the n-th degree Bézier curve, using the (m+1)-number of first parameters determined by the first parameter determination processing and the control-point data defining the n-th degree Bézier curve;

a set of tangent-vector determination codes which cause said computer to execute processing to determine two unit tangent vectors, which respectively represent gradients of the n-th degree Bézier curve at an initial point and a final point thereof, using the control-point data defining the n-th degree Bézier curve;

a set of second parameter determination codes which cause said computer to execute processing to determine (m+1)-number of second parameters, which conform to lengths of the n-th degree Bézier curve from the initial point to respective points thereof, using the coordinate data representing the (m+1)-number of points on the n-th degree Bézier curve determined by the coordinate determination processing; and a set of control-point determination codes which cause said computer to execute processing to determine control-point data, which defines the m-th degree Bézier curve, so as to preserve the gradients of the n-th degree Bézier curve at the initial point and final point thereof and in such a manner that the m-th degree Bézier curve will pass through points, or in the vicinity thereof, on the n-th degree Bézier curve, based upon the (m+1)-number of second parameters determined in conformity with the lengths of the n-th degree Bézier curve, the coordinate data representing the (m+1)-number of points on the n-th degree Bézier curve and the two unit tangent vectors at respective ones of the initial point and final point of the n-th degree Bézier curve.

18. A recording medium used in a CAD system equipped with a CAD data base and a computer, said CAD data base storing a CAD data file necessary to generate data, which represents an image of an article, in a bitmap memory for the purpose of displaying the image;

said recording medium having a computer-readable program recorded therein, said program implementing a method of converting control-point data defining an n-th degree Bézier curve representing a curve of an article to control-point data defining an m-th degree Bézier curve, said method comprising the steps of:

extracting data representing the n-th degree Bézier curve from the CAD data file that has been stored in the CAD data base;

determining (m+1)-number of parameters, which give respective (m+1)-number of points on the n-th degree Bézier curve, within a predetermined range over which the parameters take on values;

determining coordinate data, which represents the (m+1)-number of points on the n-th degree Bézier curve, using the (m+1)-number of parameters and the control-point data defining the n-th degree Bézier curve;

determining two unit tangent vectors, which respectively represent gradients of the n-th degree Bézier curve at an initial point and a final point thereof, using the control-point data defining the n-th degree Bézier curve; and determining control-point data, which defines an m-th degree Bézier curve, so as to preserve gradients of the n-th degree Bézier curve at the initial point and final point thereof and in such a manner that the m-th degree Bézier curve will pass through points, or in the vicinity thereof, on the n-th degree Bézier curve based upon the (m+1)-number of parameters giving the respective (m+1)-number of points on the n-th degree Bézier curve, the coordinate data representing the (m+1)-number of points on the n-th degree Bézier curve and the two unit tangent vectors at respective ones of the initial point and final point of the n-th degree Bézier curve.

* * * * *